US008407613B2

(12) United States Patent
Hope

(10) Patent No.: US 8,407,613 B2
(45) Date of Patent: Mar. 26, 2013

(54) DIRECTORY MANAGEMENT ON A PORTABLE MULTIFUNCTION DEVICE

(75) Inventor: Eric Hope, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 611 days.

(21) Appl. No.: 12/502,183

(22) Filed: Jul. 13, 2009

(65) Prior Publication Data

US 2011/0010672 A1    Jan. 13, 2011

(51) Int. Cl.
*G06F 3/048* (2006.01)
(52) U.S. Cl. .................. 715/769; 715/764; 715/770
(58) Field of Classification Search .......... 715/763–767, 715/769–770, 775, 783, 788, 790, 792, 798, 715/799, 810, 835–838, 841, 845, 846, 853–855, 715/861, 863, 866
See application file for complete search history.

(56) References Cited

U.S. PATENT DOCUMENTS

| | | | | |
|---|---|---|---|---|
| 5,428,734 A * | 6/1995 | Haynes et al. | ................. | 715/769 |
| 5,546,527 A * | 8/1996 | Fitzpatrick et al. | ........... | 715/769 |
| 5,608,860 A * | 3/1997 | Fitzpatrick et al. | ........... | 715/826 |
| 5,777,616 A * | 7/1998 | Bates et al. | .................... | 715/837 |
| 6,151,019 A * | 11/2000 | Watanabe et al. | ............. | 715/733 |
| 6,433,800 B1 * | 8/2002 | Holtz | ............................ | 715/835 |
| 7,370,281 B2 * | 5/2008 | Weber | ........................... | 715/769 |
| 7,396,808 B1 * | 7/2008 | Hood et al. | ................... | 510/474 |
| 7,409,644 B2 * | 8/2008 | Moore et al. | .................. | 715/774 |
| 7,509,588 B2 * | 3/2009 | Van Os et al. | ................. | 715/835 |
| 7,757,180 B2 * | 7/2010 | Nakai et al. | ................... | 715/769 |
| 7,818,672 B2 * | 10/2010 | McCormack et al. | ........ | 715/715 |
| 7,898,529 B2 * | 3/2011 | Fitzmaurice et al. | ......... | 345/173 |
| 7,908,569 B2 * | 3/2011 | Ala-Rantala | .................. | 715/853 |
| 8,020,101 B2 * | 9/2011 | Kesavarapu | ................... | 715/724 |
| 8,136,052 B2 * | 3/2012 | Shin et al. | ..................... | 715/863 |
| 8,161,400 B2 * | 4/2012 | Kwon | ........................... | 715/769 |
| 2002/0174329 A1 * | 11/2002 | Bowler et al. | ..................... | 713/1 |
| 2003/0208565 A1 * | 11/2003 | Nishihara et al. | ............. | 709/219 |
| 2004/0004638 A1 * | 1/2004 | Babaria | ........................ | 345/805 |
| 2004/0027383 A1 * | 2/2004 | Jaeger | ........................... | 345/769 |
| 2004/0070608 A1 * | 4/2004 | Saka | ............................. | 345/748 |
| 2004/0070622 A1 * | 4/2004 | Cossey et al. | ................. | 345/769 |
| 2004/0207660 A1 * | 10/2004 | Marion et al. | ................ | 345/764 |
| 2005/0038836 A1 * | 2/2005 | Wang | ............................ | 707/204 |
| 2005/0060653 A1 * | 3/2005 | Fukase et al. | ................. | 715/724 |
| 2005/0177796 A1 * | 8/2005 | Takahashi | ..................... | 715/769 |
| 2005/0240866 A1 * | 10/2005 | Berstis et al. | ................. | 715/522 |

(Continued)

FOREIGN PATENT DOCUMENTS

JP           2002361986    * 6/2001

*Primary Examiner* — Tuyetlien Tran
*Assistant Examiner* — Enrique Iturralde
(74) *Attorney, Agent, or Firm* — Kilpatrick Townsend & Stockton LLP

(57) ABSTRACT

In some embodiments, a portable multifunction device with a touch screen display concurrently displays on the touch screen display a plurality of predefined regions, the predefined regions including: a source region, a command region, and a destination region. In response to detecting a first command association input by a user on the touch screen display, the device associates a first icon from the source region with a first directory management command icon in the command region. In response to detecting a first command performance input that includes selecting a first folder icon in the destination region, the device performs a directory management operation on a folder or file that corresponds to the first icon. The directory management operation is in accordance with the first directory management command icon and the selected first folder in the destination region.

19 Claims, 55 Drawing Sheets

U.S. PATENT DOCUMENTS

| | | | |
|---|---|---|---|
| 2006/0129945 A1* | 6/2006 | Dettinger et al. | 715/769 |
| 2006/0161856 A1* | 7/2006 | Heir | 715/769 |
| 2006/0206821 A1* | 9/2006 | Chien | 715/733 |
| 2007/0050727 A1* | 3/2007 | Lewis-Bowen et al. | 715/779 |
| 2007/0273663 A1* | 11/2007 | Park et al. | 345/173 |
| 2008/0235609 A1* | 9/2008 | Carraher et al. | 715/769 |
| 2008/0307363 A1* | 12/2008 | Jalon et al. | 715/835 |
| 2008/0313554 A1* | 12/2008 | Ostergaard et al. | 715/764 |
| 2010/0004031 A1* | 1/2010 | Kim | 455/566 |
| 2011/0161881 A1* | 6/2011 | Tomita et al. | 715/825 |

\* cited by examiner

DIRECTORY MANAGEMENT ON A PORTABLE MULTIFUNCTION DEVICE

TECHNICAL FIELD

The disclosed embodiments relate generally to portable multifunction devices with touch screen displays, and more particularly, to management of files and/or folders in one or more hierarchical directories using such devices.

BACKGROUND

The use of touch screen displays as input devices for portable electronic devices has increased significantly in recent years. A variety of file management functions may need to be performed with such devices. For example, a user may need to navigate through a hierarchical directory and perform directory management operations on files and/or folders in a single directory. Similarly, a user may also need to perform directory management operations between two hierarchical directories, such as copying or moving files and/or folders from one hierarchical directory on the portable device to another hierarchical directory on a remote device.

But existing methods for performing these directory management operations on portable electronic devices are cumbersome and inefficient, particularly on handheld devices due to the small size of the touch screen display. Searching for a file or folder and subsequently navigating through menus is inconvenient and time consuming, thereby creating a significant cognitive burden on a user. In addition, existing methods take longer than necessary, thereby wasting energy. This latter consideration is particularly important in battery-operated devices.

Accordingly, there is a need for portable electronic devices with touch screen displays with faster, more efficient methods and interfaces for performing directory management tasks. Such methods and interfaces reduce the cognitive burden on a user and produce a more efficient human-machine interface. For battery-operated electronic devices, such methods and interfaces conserve power and increase the time between battery charges.

SUMMARY

The above deficiencies and other problems associated with user interfaces for portable electronic devices with touch screen displays are reduced or eliminated by the disclosed devices. In some embodiments, the device is a handheld device. The device has a touch-sensitive display (also known as a "touch screen" or "touch screen display"). In some embodiments, the device also has a touchpad. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch screen display. In some embodiments, the functions include one or more of: image editing, drawing, presenting, word processing, website creating, disk authoring, spreadsheet making, game playing, telephoning, video conferencing, e-mailing, instant messaging, workout support, digital photographing, digital videoing, web browsing, digital music playing, purchasing and/or downloading digital content, and/or digital video playing. Executable instructions for performing these functions may be included in a computer readable storage medium or other computer program product configured for execution by one or more processors.

In accordance with some embodiments, a method is performed at a portable multifunction device with a touch screen display. The method includes concurrently displaying on the touch screen display a plurality of predefined regions. The predefined regions include: a source region that includes a first plurality of icons, wherein a respective icon in the first plurality of icons represents a folder or a file in a hierarchical level in a first hierarchical directory; a command region that includes a plurality of directory management command icons; and a destination region that includes a plurality of folder icons that represent folders in a hierarchical level in a second hierarchical directory. The method also includes: detecting a first command association input by a user on the touch screen display; in response to detecting the first command association input by the user on the touch screen display, associating a first icon in the first plurality of icons in the source region with a first directory management command icon in the plurality of directory management command icons; detecting a first command performance input by the user on the touch screen display, wherein the first command performance input includes selection of a first folder icon in the plurality of folder icons in the destination region; and, in response to detecting the first command performance input by the user on the touch screen display, performing a directory management operation on a folder or file that corresponds to the first icon in the first plurality of icons. The directory management operation is in accordance with the first directory management command icon and the selected first folder icon in the plurality of folder icons in the destination region.

In accordance with some embodiments, a graphical user interface on a portable multifunction device with a touch screen display and a hierarchical directory that contains folders and files, includes a plurality of predefined regions. The predefined regions include: a source region that includes a first plurality of icons, wherein a respective icon in the first plurality of icons represents a folder or a file in a hierarchical level in a first hierarchical directory; a command region that includes a plurality of directory management command icons; and a destination region that includes a plurality of folder icons that represent folders in a hierarchical level in a second hierarchical directory. In response to detecting a first command association input by a user on the touch screen display, a first icon in the first plurality of icons in the source region is associated with a first directory management command icon in the plurality of directory management command icons. A first command performance input by the user is detected on the touch screen display. The first command performance input includes selection of a first folder icon in the plurality of folder icons in the destination region. In response to detection of the first command performance input by the user on the touch screen display, a directory management operation is performed on a folder or file that corresponds to the first icon in the first plurality of icons. The directory management operation is in accordance with the first directory management command icon and the selected first folder icon in the plurality of folder icons in the destination region.

In accordance with some embodiments, a portable multifunction device includes a touch screen display; one or more processors; memory; and one or more programs. The one or more programs are stored in the memory and configured to be executed by the one or more processors. The one or more programs include instructions for concurrently displaying on the touch screen display a plurality of predefined regions. The predefined regions include: a source region that includes a first plurality of icons, wherein a respective icon in the first plurality of icons represents a folder or a file in a hierarchical level in a first hierarchical directory; a command region that includes a plurality of directory management command icons; and a destination region that includes a plurality of folder icons that represent folders in a hierarchical level in a second hierarchical directory. The one or more programs also include instructions for: detecting a first command association input by a user on the touch screen display; responding to detection of the first command association input by the user on the touch screen display by associating a first icon in the first plurality of icons in the source region with a first directory management command icon in the plurality of directory management command icons; detecting a first command performance input by the user on the touch screen display, wherein the first command performance input includes selection of a first folder icon in the plurality of folder icons in the destination region; and, responding to detection of the first command performance input by the user on the touch screen display by performing a directory management operation on a folder or file that corresponds to the first icon in the first plurality of icons. The directory management operation is in accordance with the first directory management command icon and the selected first folder icon in the plurality of folder icons in the destination region.

In accordance with some embodiments, a computer readable storage medium stores one or more programs, the one or more programs comprising instructions, which when executed by a portable multifunction device with a touch screen display and a hierarchical directory that contains folders and files, cause the device to concurrently display on the touch screen display a plurality of predefined regions. The predefined regions include: a source region that includes a first plurality of icons, wherein a respective icon in the first plurality of icons represents a folder or a file in a hierarchical level in a first hierarchical directory; a command region that includes a plurality of directory management command icons; and a destination region that includes a plurality of folder icons that represent folders in a hierarchical level in a second hierarchical directory. The instructions also cause the device to: detect a first command association input by a user on the touch screen display; respond to detection of the first command association input by the user on the touch screen display by associating a first icon in the first plurality of icons in the source region with a first directory management command icon in the plurality of directory management command icons; detect a first command performance input by the user on the touch screen display, wherein the first command performance input includes selection of a first folder icon in the plurality of folder icons in the destination region; and, respond to detection of the first command performance input by the user on the touch screen display by performing a directory management operation on a folder or file that corresponds to the first icon in the first plurality of icons. The directory management operation is in accordance with the first directory management command icon and the selected first folder icon in the plurality of folder icons in the destination region.

In accordance with some embodiments, a portable multifunction device includes: a touch screen display; means for concurrently displaying on the touch screen display a plurality of predefined regions, the predefined regions including: a source region that includes a first plurality of icons, wherein a respective icon in the first plurality of icons represents a folder or a file in a hierarchical level in a first hierarchical directory, a command region that includes a plurality of directory management command icons, and a destination region that includes a plurality of folder icons that represent folders in a hierarchical level in a second hierarchical directory; means for detecting a first command association input by a user on the touch screen display; means, responsive to detection of the first command association input by the user on the touch screen display, for associating a first icon in the first plurality of icons in the source region with a first directory management command icon in the plurality of directory management command icons; means for detecting a first command performance input by the user on the touch screen display, wherein the first command performance input includes selection of a first folder icon in the plurality of folder icons in the destination region; and, means, responsive to detection of the first command performance input by the user on the touch screen display, for performing a directory management operation on a folder or file that corresponds to the first icon in the first plurality of icons. The directory management operation is in accordance with the first directory management command icon and the selected first folder icon in the plurality of folder icons in the destination region.

In accordance with some embodiments, an information processing apparatus for use in a portable multifunction device with a touch screen display and a hierarchical directory that contains folders and files includes: means for concurrently displaying on the touch screen display a plurality of predefined regions, the predefined regions including: a source region that includes a first plurality of icons, wherein a respective icon in the first plurality of icons represents a folder or a file in a hierarchical level in a first hierarchical directory, a command region that includes a plurality of directory management command icons, and a destination region that includes a plurality of folder icons that represent folders in a hierarchical level in a second hierarchical directory; means for detecting a first command association input by a user on the touch screen display; means, responsive to detection of the first command association input by the user on the touch screen display, for associating a first icon in the first plurality of icons in the source region with a first directory management command icon in the plurality of directory management command icons; means for detecting a first command performance input by the user on the touch screen display, wherein the first command performance input includes selection of a first folder icon in the plurality of folder icons in the destination region; and, means, responsive to detection of the first command performance input by the user on the touch screen display, for performing a directory management operation on a folder or file that corresponds to the first icon in the first plurality of icons. The directory management operation is in accordance with the first directory management command icon and the selected first folder icon in the plurality of folder icons in the destination region.

Thus, portable multifunction devices with touch screen displays are provided with faster, more efficient methods and interfaces for managing file directories, thereby increasing the effectiveness, efficiency, and user satisfaction with such devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
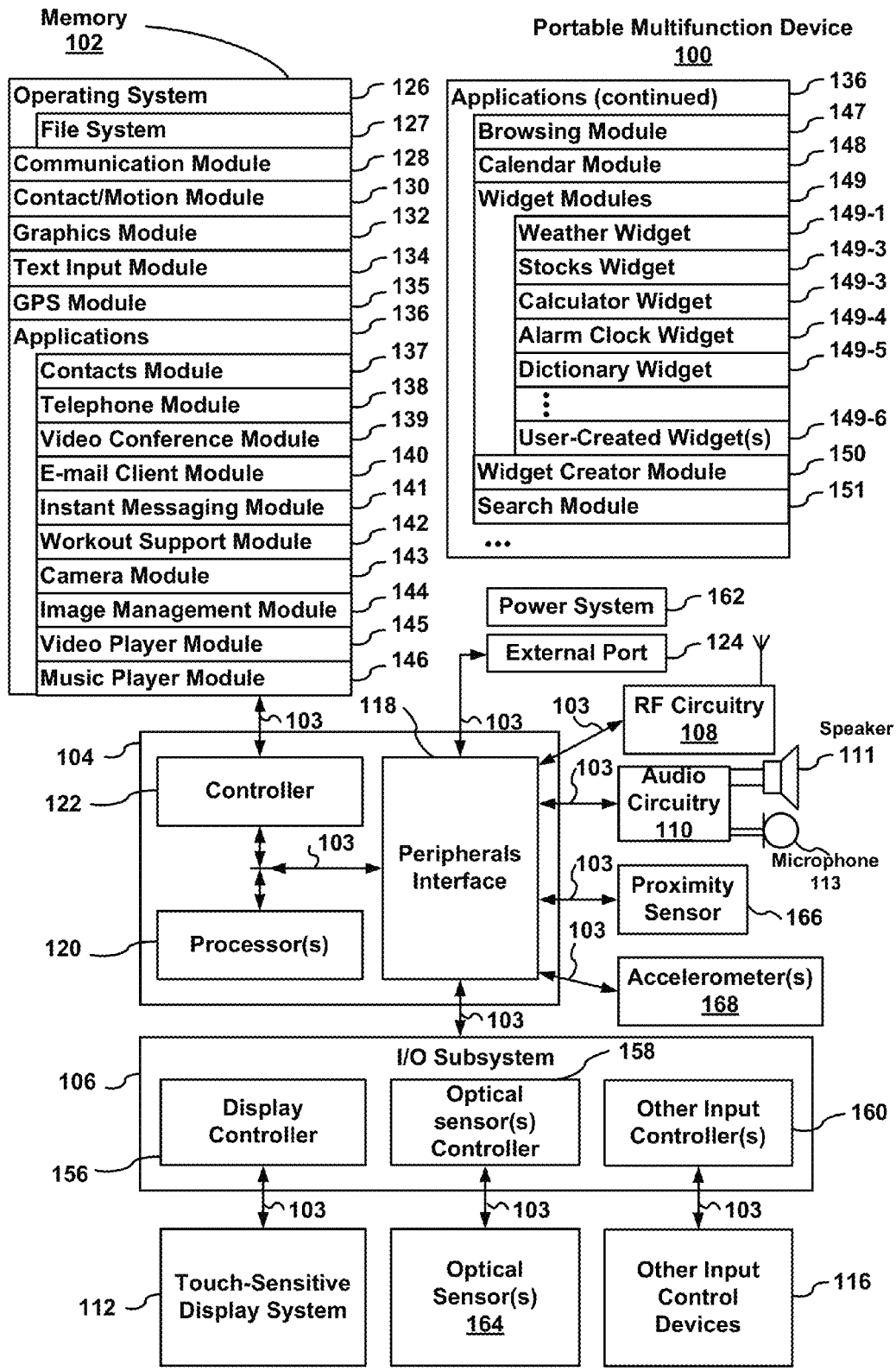
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact. But, as explained below, in some cases a first hierarchical directory and a second hierarchical directory refer to the same hierarchical directory.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Computer, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
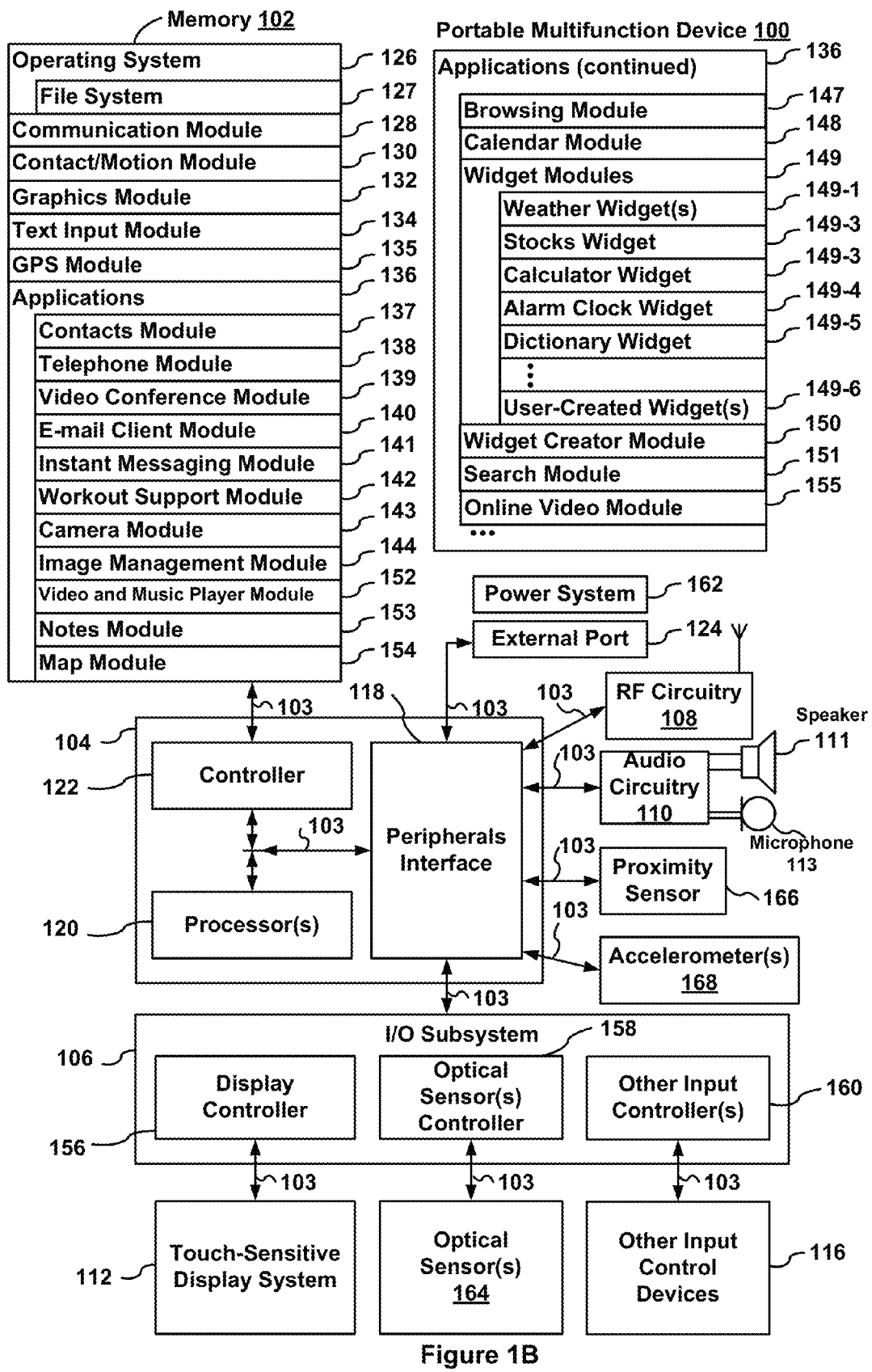

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch-sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. The operating system 126 includes file system 127 for storing data in a hierarchical directory, the data including files (e.g., text files, image files, audio files, video files, other multimedia files, executable files, etc.) and folders.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch-sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);
a telephone module 138;
a video conferencing module 139;
an e-mail client module 140;
an instant messaging (IM) module 141;
a workout support module 142;
a camera module 143 for still and/or video images;
an image management module 144;
a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
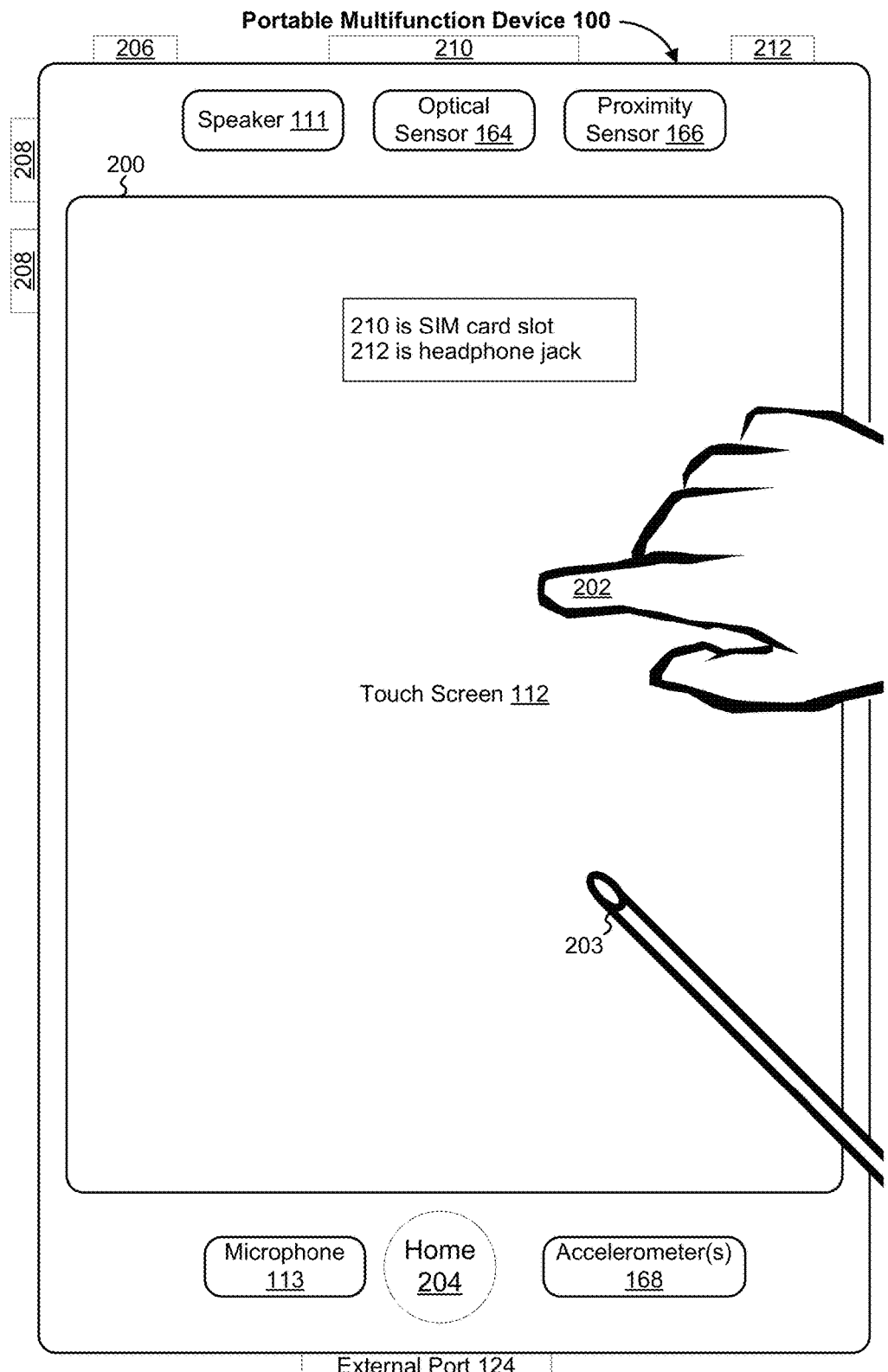
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") that may be implemented on a portable multifunction device 100.

Figure 3:
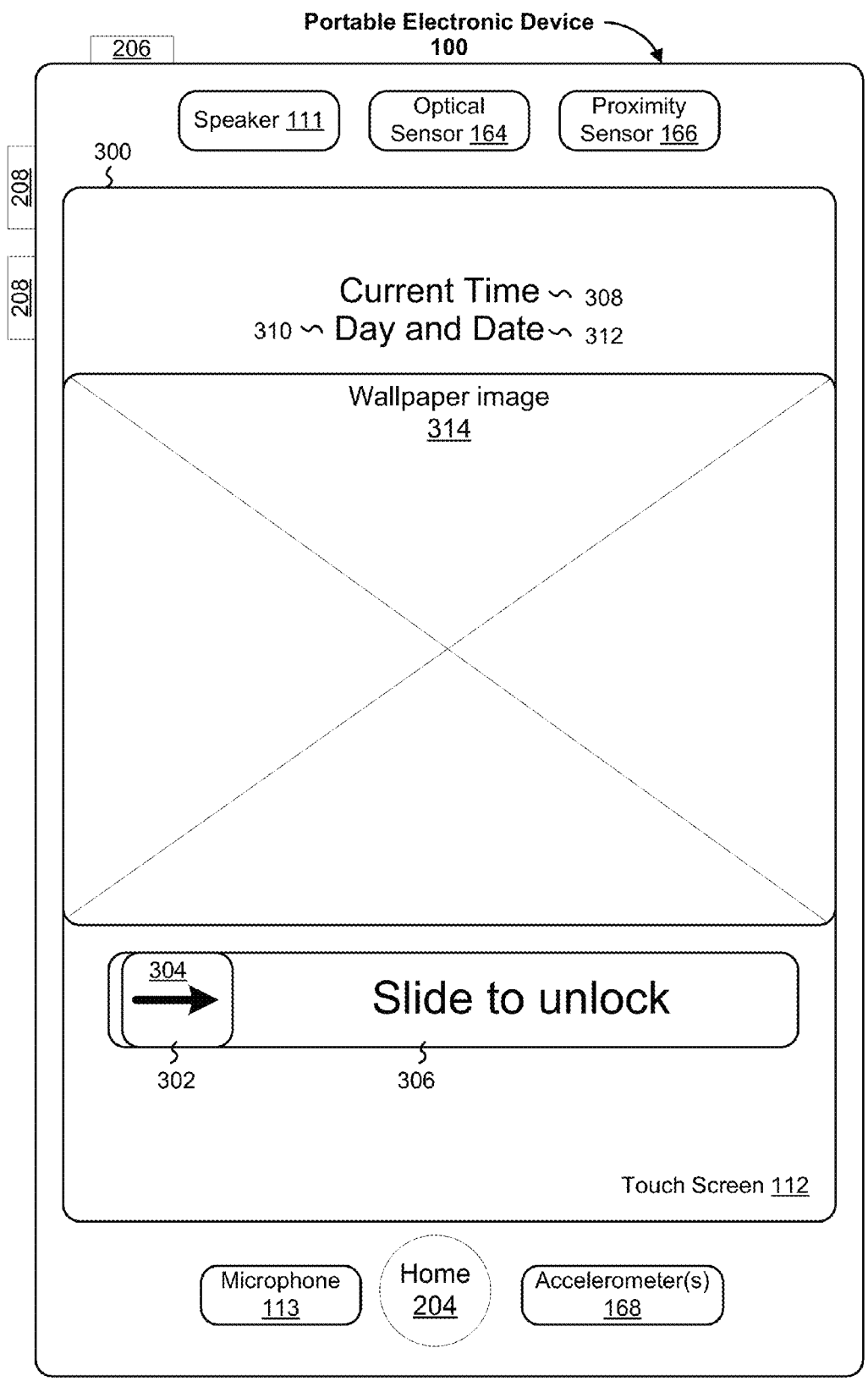
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
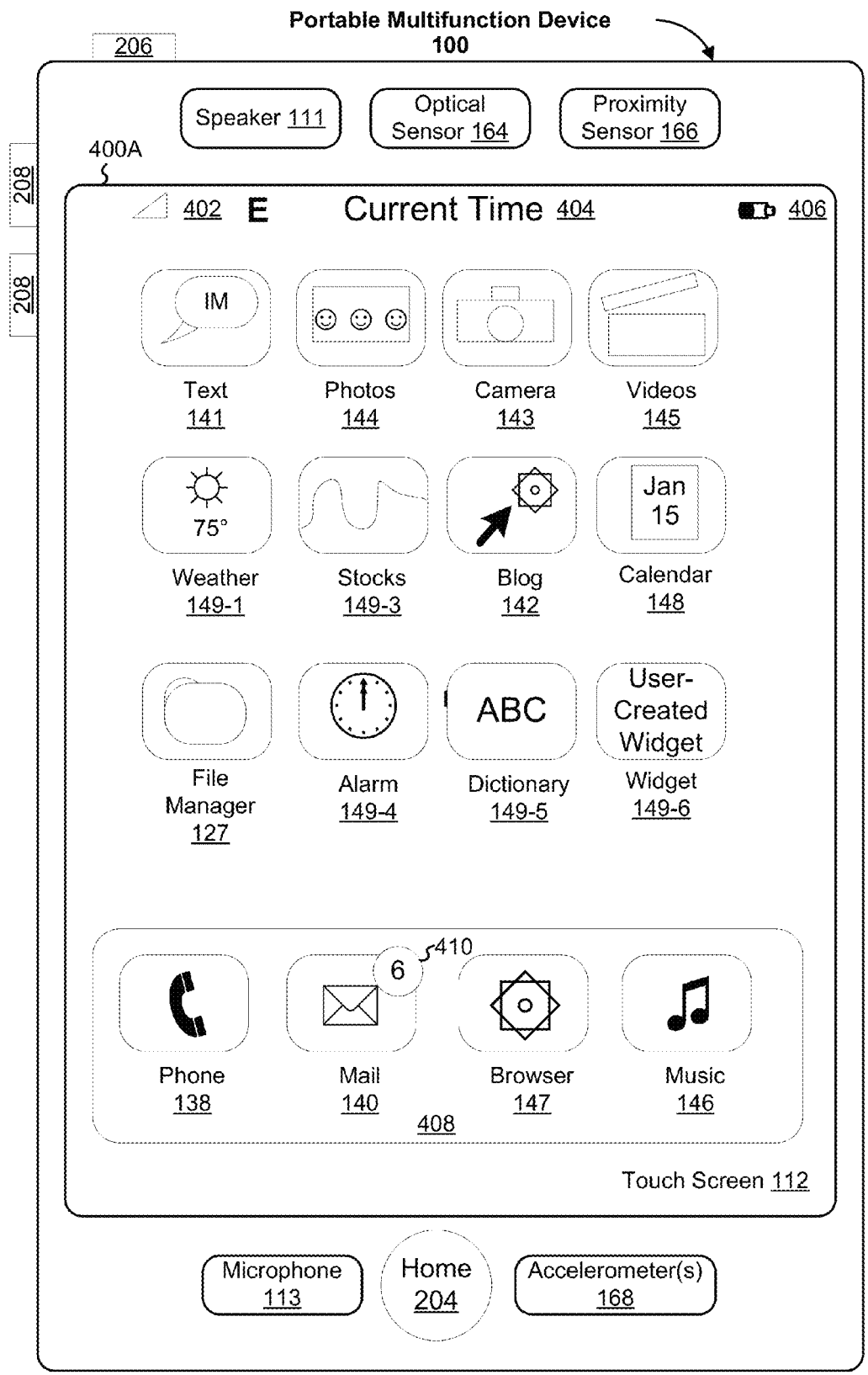
FIGS. 4A and 4B illustrate exemplary user interfaces for a menu of applications on a portable multifunction device in accordance with some embodiments.
Figure 4B:
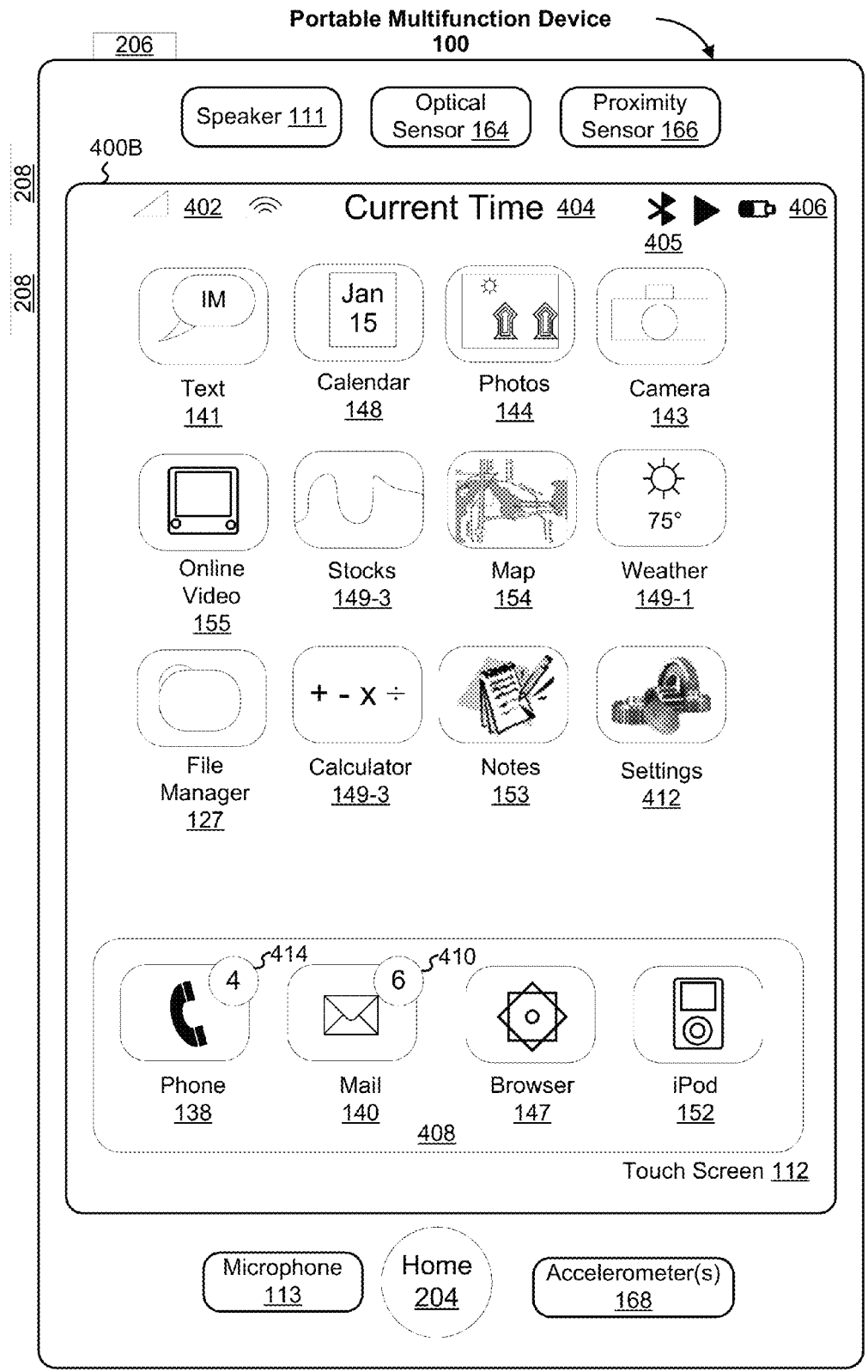

FIGS. 4A and 4B illustrate exemplary user interfaces for a menu of applications on a portable multifunction device 100 in accordance with some embodiments. In some embodiments, user interface 400A includes the following elements, or a subset or superset thereof:
- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Workout support 142;
  - Calendar 148;
  - Alarm clock 149-4;
  - Dictionary 149-5; and
  - User-created widget 149-6, and
  - File manager 127 for performing file management operations (e.g., copy, move, delete, etc.) on files (e.g., text files, image files, audio files, video files, other multimedia files, executable files, etc.) and/or folders in one or more file systems 127.

In some embodiments, user interface 400B includes the following elements, or a subset or superset thereof:
- 402, 404, 405, 406, 127, 141, 148, 144, 143, 149-3, 149-2, 149-1, 149-4, 410, 414, 138, 140, and 147, as described above;
- Calculator 149-3;
- Map 154;
- Notes 153;
- Settings 412, which provides access to settings for the device 100 and its various applications 136, as described further below;
- Video and music player module 152, also referred to as iPod (trademark of Apple Computer, Inc.) module 152; and
- Online video module 155, also referred to as YouTube (trademark of Google, Inc.) module 155.

Figure 5:
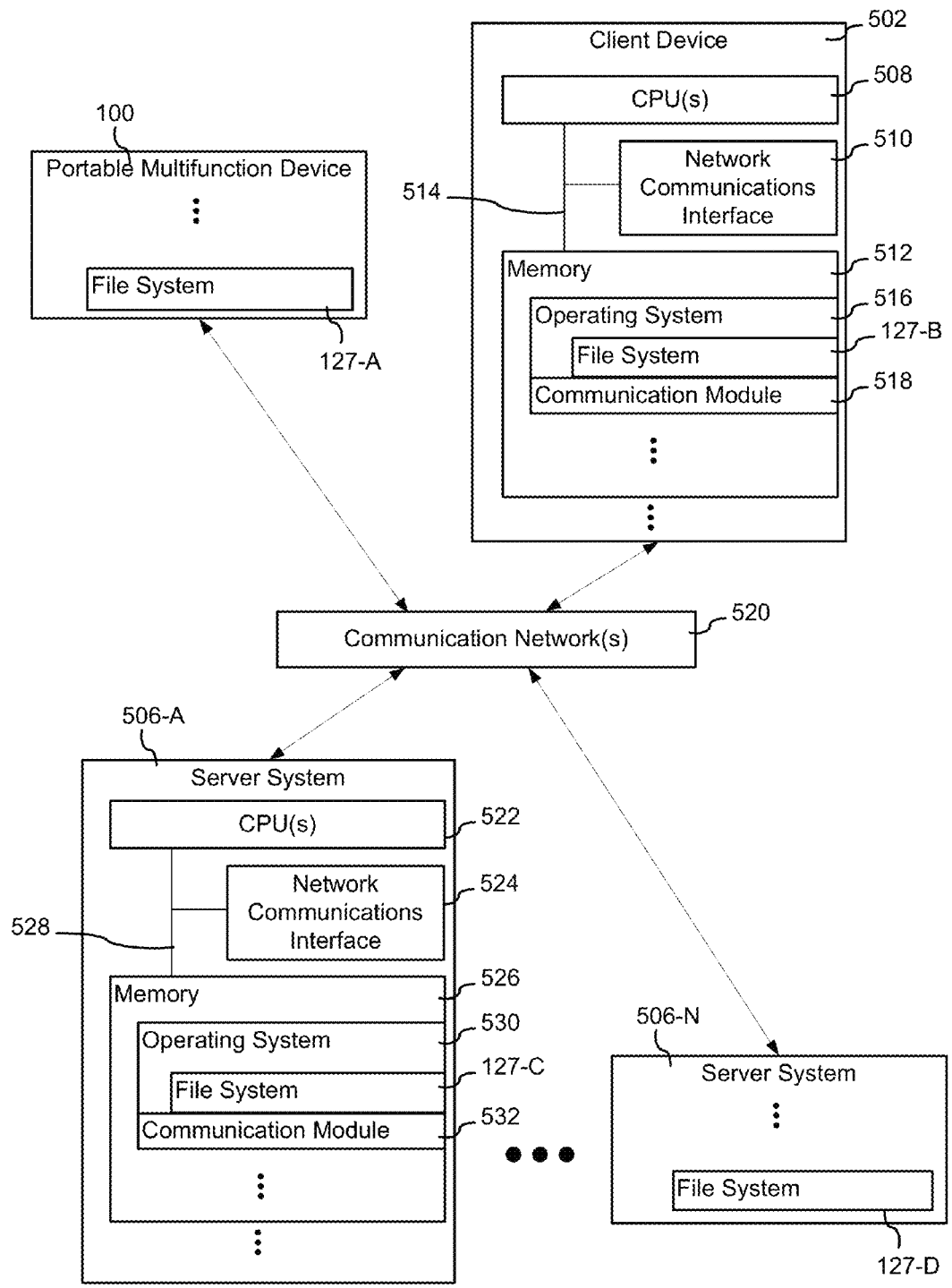
FIG. 5 illustrates a distributed client-server system in accordance with some embodiments.

Attention is now directed towards FIG. 5, which is a block diagram of an exemplary distributed client-server system in accordance with some embodiments. The distributed system includes a plurality of clients (e.g., portable multifunction device 100 and client device 502). The clients can be any of a number of computing devices (e.g., Internet kiosk, personal digital assistant, cell phone, gaming device, desktop computer, laptop computer, handheld computer, tablet computer, portable electronic device, portable multifunction device or combinations thereof) used to enable the activities described below. Each client (e.g., portable multifunction device 100 or client device 502) is coupled to a network 520, which can be any of a number of networks (e.g. Internet, intranet, local area network, wide area network, wireless network, wired network, optical network, or a combination of such networks). More generally, the clients (e.g., portable multifunction device 100 or client device 502) and servers systems 506 are coupled to each other via one or more communication networks 520.

The client device 502 includes one or more processing units (CPUs) 508, one or more network or other communications interfaces 510, memory 512, and one or more communication buses 514 for interconnecting these components. The communication buses 514 may include circuitry (sometimes called a chipset) that interconnects and controls communications between system components. The client device 502 optionally includes a user interface having a display device and a keyboard. Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 508. Memory 512, or alternately the non-volatile memory device(s) within memory 512, includes a computer readable storage medium. In some embodiments, memory 512 or the computer readable storage medium of memory 512 stores the following programs, modules and data structures, or a subset thereof:
- an operating system 516 that includes procedures for handling various basic system services and for performing hardware dependent tasks;
- a file system 127-B for storing data in a hierarchical directory, the data including files (e.g., text files, image files, audio files, video files, other multimedia files, executable files, etc.) and folders; and a communication module 518 that is used for connecting the client device 502 to other computers via the one or more communication network interfaces 510 and one or more communication networks 520, such as the Internet, other wide area networks, local area networks, metropolitan area networks, and so on.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

The server system 506-A includes one or more processing units (CPUs) 522, one or more network or other communications interfaces 524, memory 526, and one or more communication buses 528 for interconnecting these components. The communication buses 528 may include circuitry (sometimes called a chipset) that interconnects and controls communications between system components. The server system 506 optionally includes (but typically does not include) a user interface having a display device and a keyboard. Memory 526 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 526 may optionally include one or more storage devices remotely located from the CPU(s) 522. Memory 526, or alternately the non-volatile memory device(s) within memory 526, includes a computer readable storage medium. In some embodiments, memory 526 or the computer readable storage medium of memory 526 stores the following programs, modules and data structures, or a subset thereof:

an operating system 530 that includes procedures for handling various basic system services and for performing hardware dependent tasks;

a file system 127-C for storing data in a hierarchical directory, the data including files (e.g., text files, image files, audio files, video files, other multimedia files, executable files, etc.) and folders; and a communication module 532 that is used for connecting the server system 506 to other computers via the one or more communication network interfaces 524 and one or more communication networks 520, such as the Internet, other wide area networks, local area networks, metropolitan area networks, and so on.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 526 may store a subset of the modules and data structures identified above. Furthermore, memory 526 may store additional modules and data structures not described above.

Although FIG. 5 shows a server system 506-A, server system 506-A in FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in server system 506-A in FIG. 5 could be implemented on single servers and single items could be implemented by one or more servers (e.g., server system 506-A and server system 506-N in FIG. 5). The actual number of servers used to implement a server system and how features are allocated among them will vary from one implementation to another, and may depend in part on the amount of data traffic that the system must handle during peak usage periods as well as during average usage periods.

Each of the computer systems (e.g., portable multifunction device 100, client device 502, server system 506-A and server system 506-N) includes a distinct file system (e.g., 127-A, 127-B, 127-C, 127-D). It should be understood that, as described herein, performing a directory management operation (e.g., move, copy, delete, send, print, etc.) includes performing an operation on an item (e.g., a file or folder) in one or more of these file systems 127.

As one embodiment, the file management operation is performed at portable multifunction device 100, and a file or folder is copied from one location in file system 127-A to another location in file system 127-A. In other words, input is received at a device instructing the device to perform a directory management operation. In some embodiments, the directory management operation includes operations performed within a single file system on the device that received the input to perform directory management operation.

In another embodiment, the file management operation is initiated at portable multifunction device 100 and a file or folder is moved from a location in file system 127-A to a location in file system 127-B. In other words, input is received at a device instructing the device to perform a directory management operation. In some embodiments, the directory management operation includes operations performed at a plurality of file systems where one of the file systems is the file system on the device that received the input to perform directory management operation.

In another embodiment, the file management operation is initiated at a portable multifunction device 100 and a file or folder is moved from a location in file system 127-C to a location in file system 127-D. In other words, input is received at a device 100 instructing the device to initiate directory management operations on other devices. In some embodiments, the directory management operation includes operations performed at one or more file systems where the one or more file systems are distinct from the file system on the device that received the input to initiate a directory management operation.

Figure 6A:
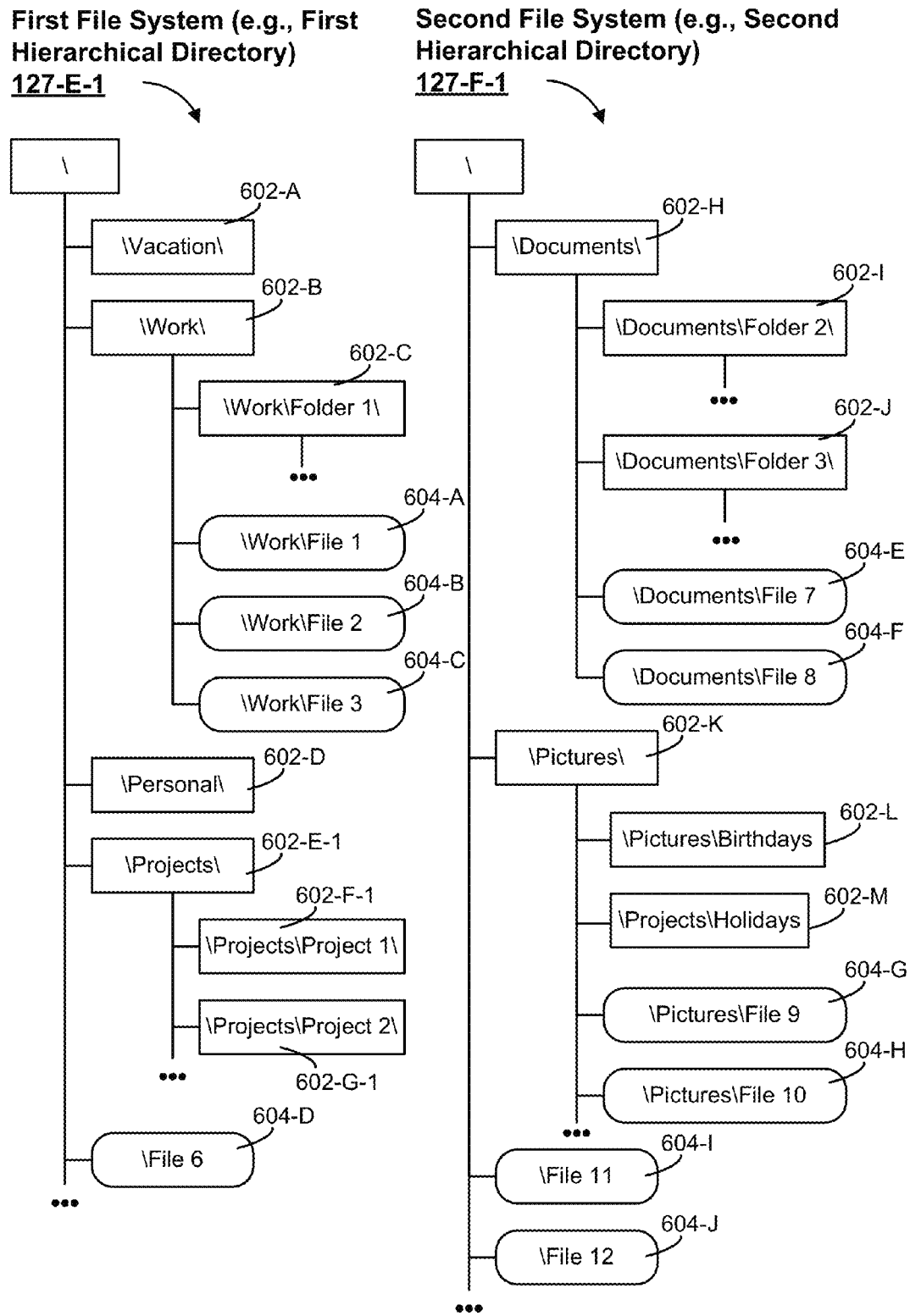
FIGS. 6A-6C illustrate a first file system including a first hierarchical directory and a second file system including a second hierarchical directory, in accordance with some embodiments.
Figure 6B:
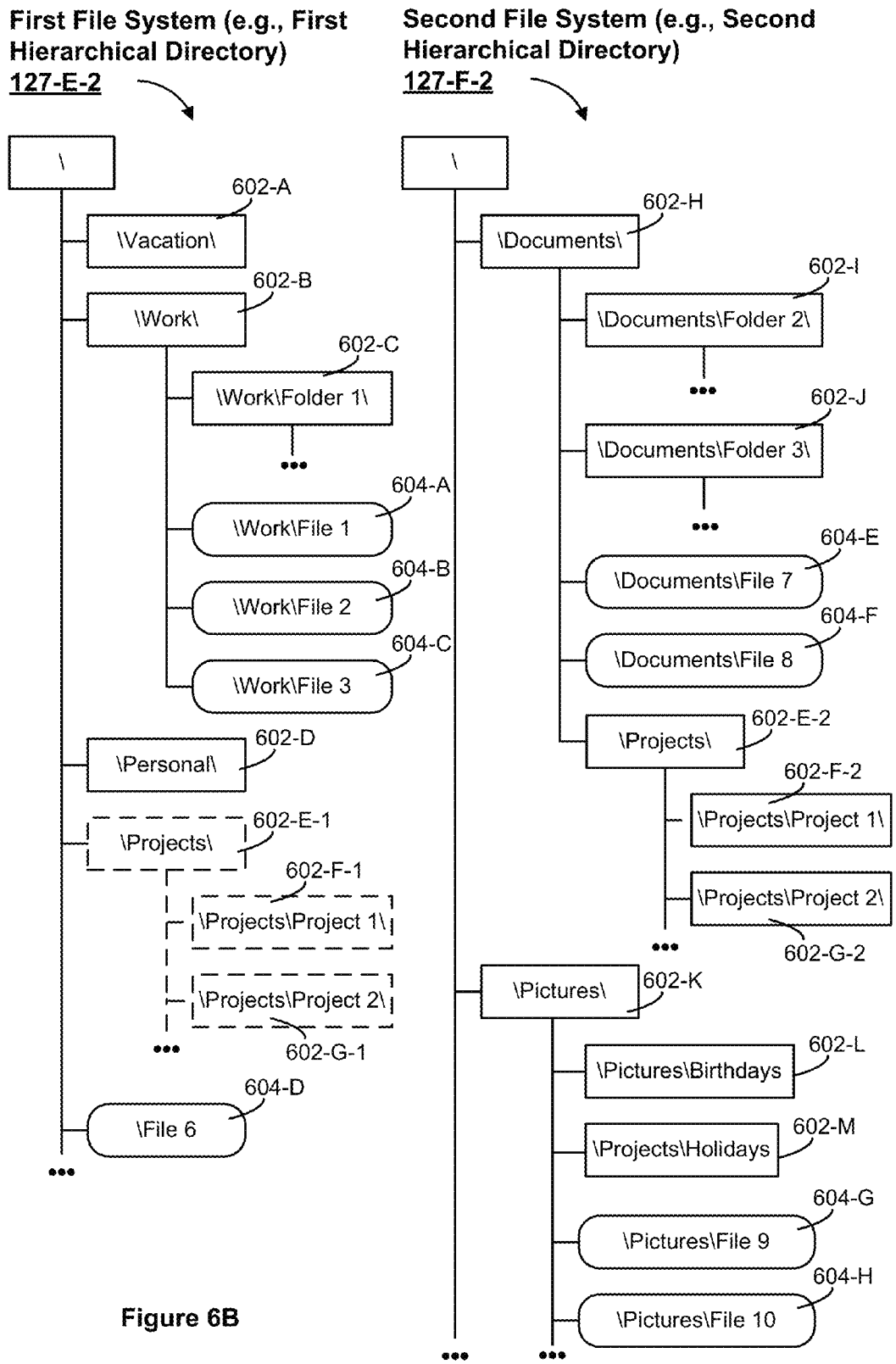
Figure 6C:
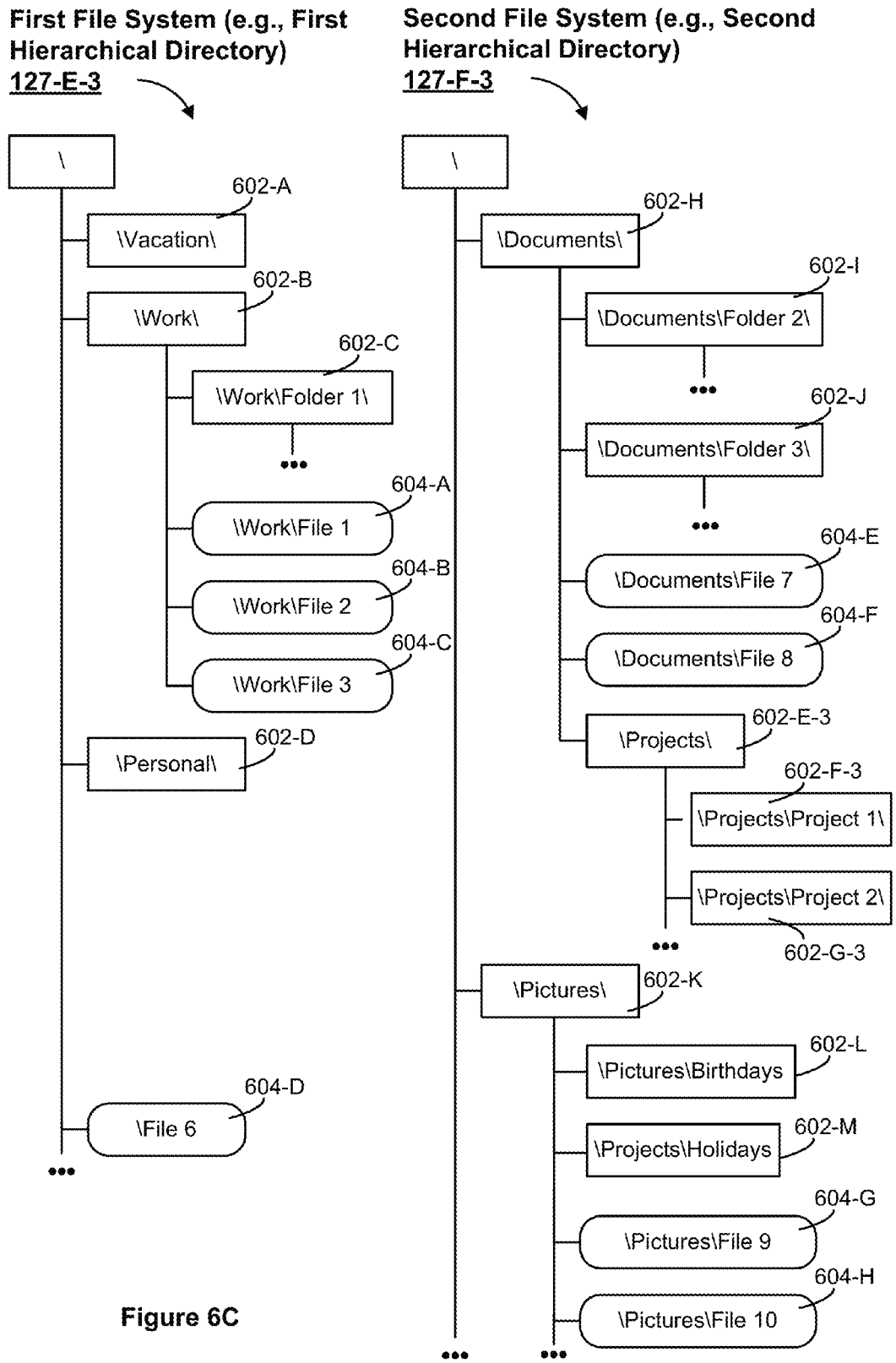

Attention is now directed towards FIGS. 6A-6C, which illustrate an exemplary first file system 127-E and second file system 127-F. Each of the file systems includes one or more folders 602 and one or more files 604. In some embodiments, the first file system 127-E and the second file system 127-F are on a single computer system (e.g., portable multifunction device 100, client device 502, or server system 506). In some embodiments the first file system 127-E is on a first computer system (e.g., potable multifunction device 100) while the second file system 127-F is on a second computer system (e.g., client device 502), where the first computer system is distinct from the second computer system.

FIG. 6A shows the first file system 127-E-1 and the second file system 127-F-1 before a file management operation (e.g., a copy operation or a move operation). FIG. 6B shows the first file system 127-E-2 and the second file system 127-F-2 after a copy file management operation. In this example, the file management operation is to copy the "projects" folder 602-E in the first file system 127-E-1 (in FIG. 6A) to the documents folder 602-H in the second file system 127-F-1 (in FIG. 6A), and so the projects folder 602-E-1 from the first file system 127-E-1 is copied to the documents folder 602-H in the second file system 127-F-2 (in FIG. 6B), while a copy of the projects folder 602-E-1 remains on the first file system 127-E-2 (shown in dotted lines in FIG. 6B).

FIG. 6C shows the first file system 127-E-3 and the second file system 127-F-3 after a move file management operation. In this example, the file management operation is to move the "projects" folder 602-E-1 in the first file system 127-E-1 to the documents folder 602-H in the second file system 127-F-1, and so the projects folder 602-E-1 from the first file system 127-E-1 is copied to the documents folder 602-H in the second file system 127-F-3 (in FIG. 6C), and the "projects" folder 602-F-1 (in FIG. 6A) is deleted from the first file system 127-E-3 (in FIG. 6C). User interfaces that are configured to allow a user to provide instructions to perform these exemplary file management operations and other file management operations are described in greater detail below with reference to FIGS. 7A-7W.

Attention is now directed towards embodiments of user interfaces ("UI") for performing directory management and associated processes that may be implemented on a portable multifunction device with a touch screen display, such as portable multifunction device 100.

Figure 7A:
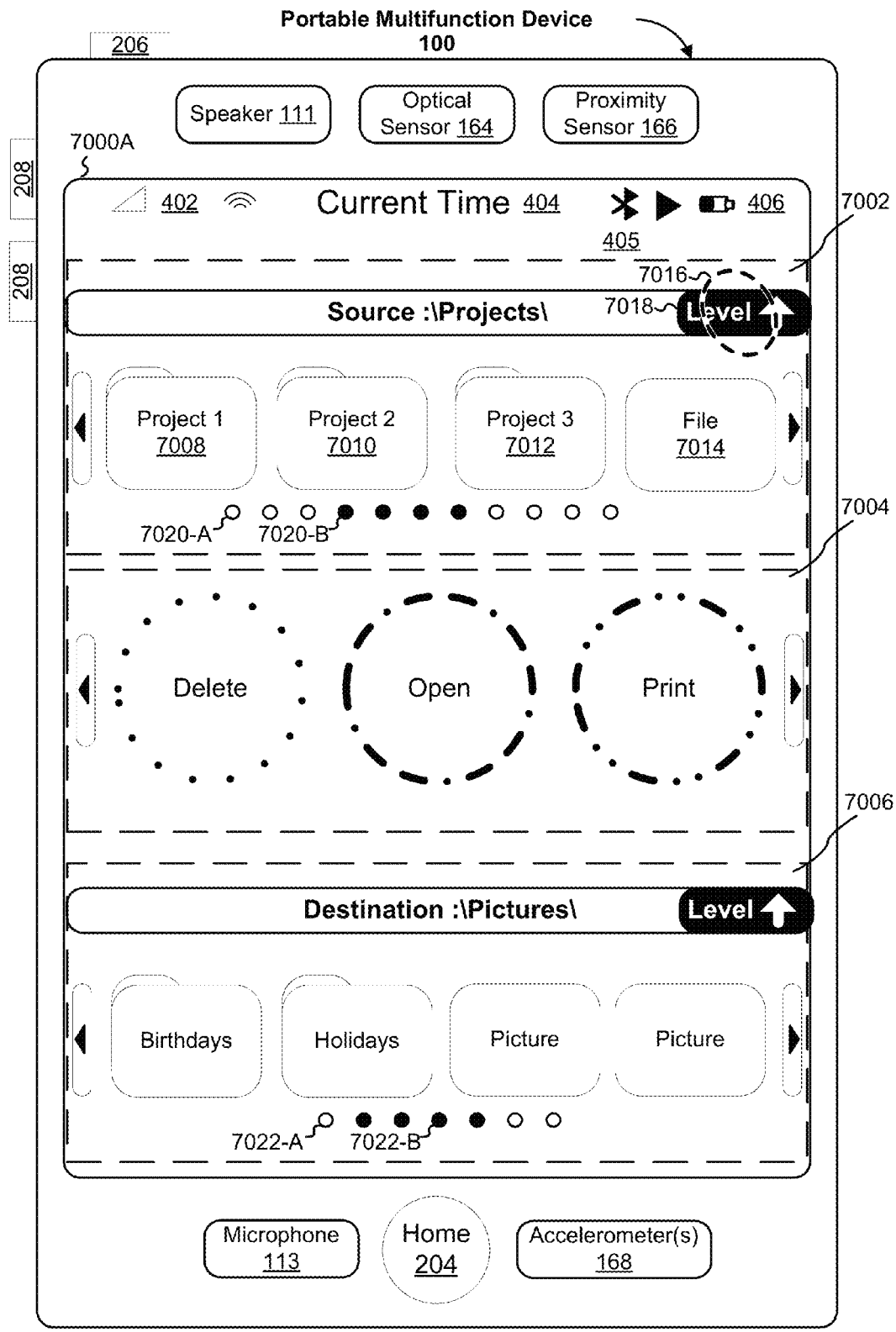
FIGS. 7A-7W illustrate exemplary user interfaces for performing directory management operations in accordance with some embodiments.
Figure 7B:
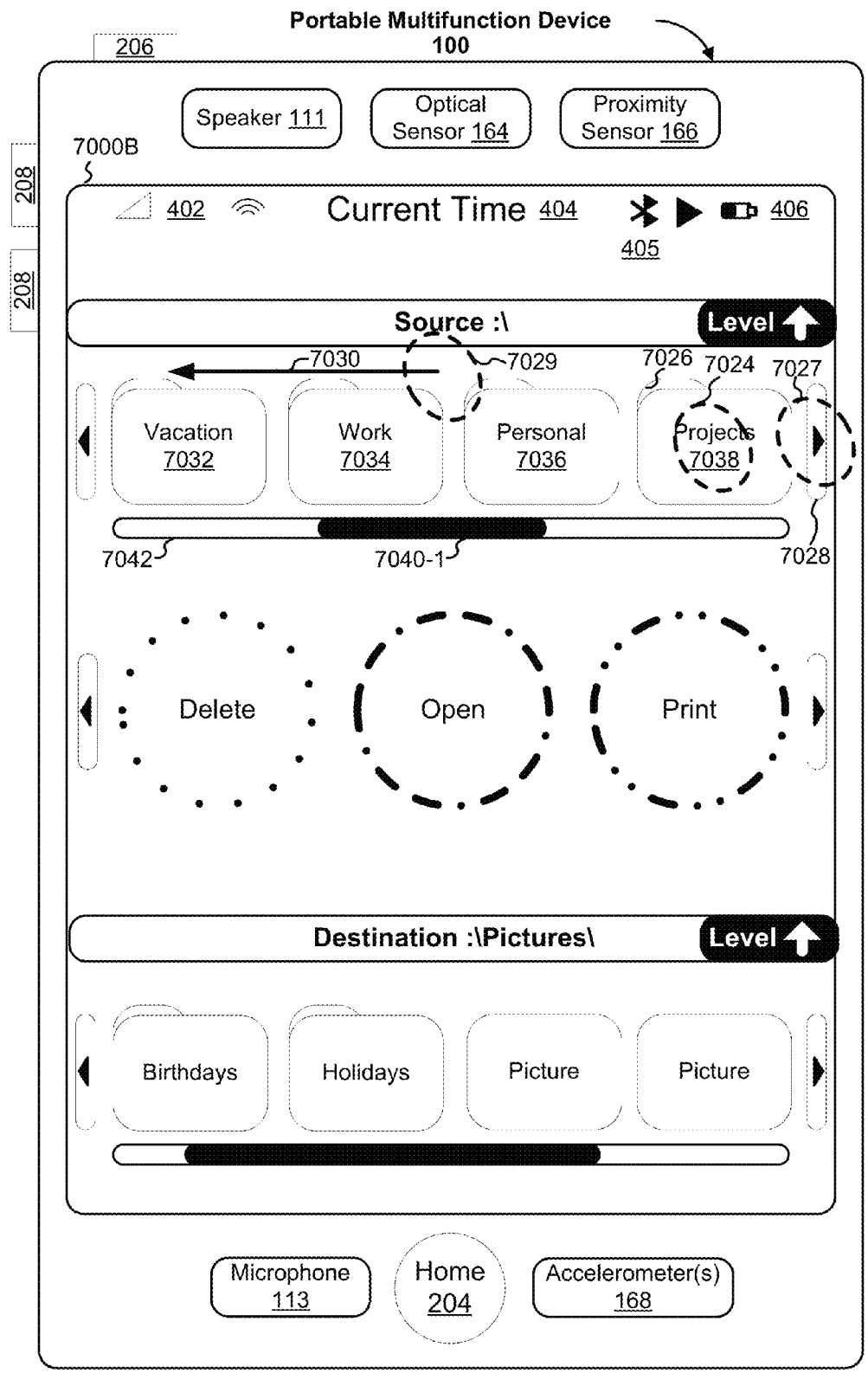
Figure 7C:
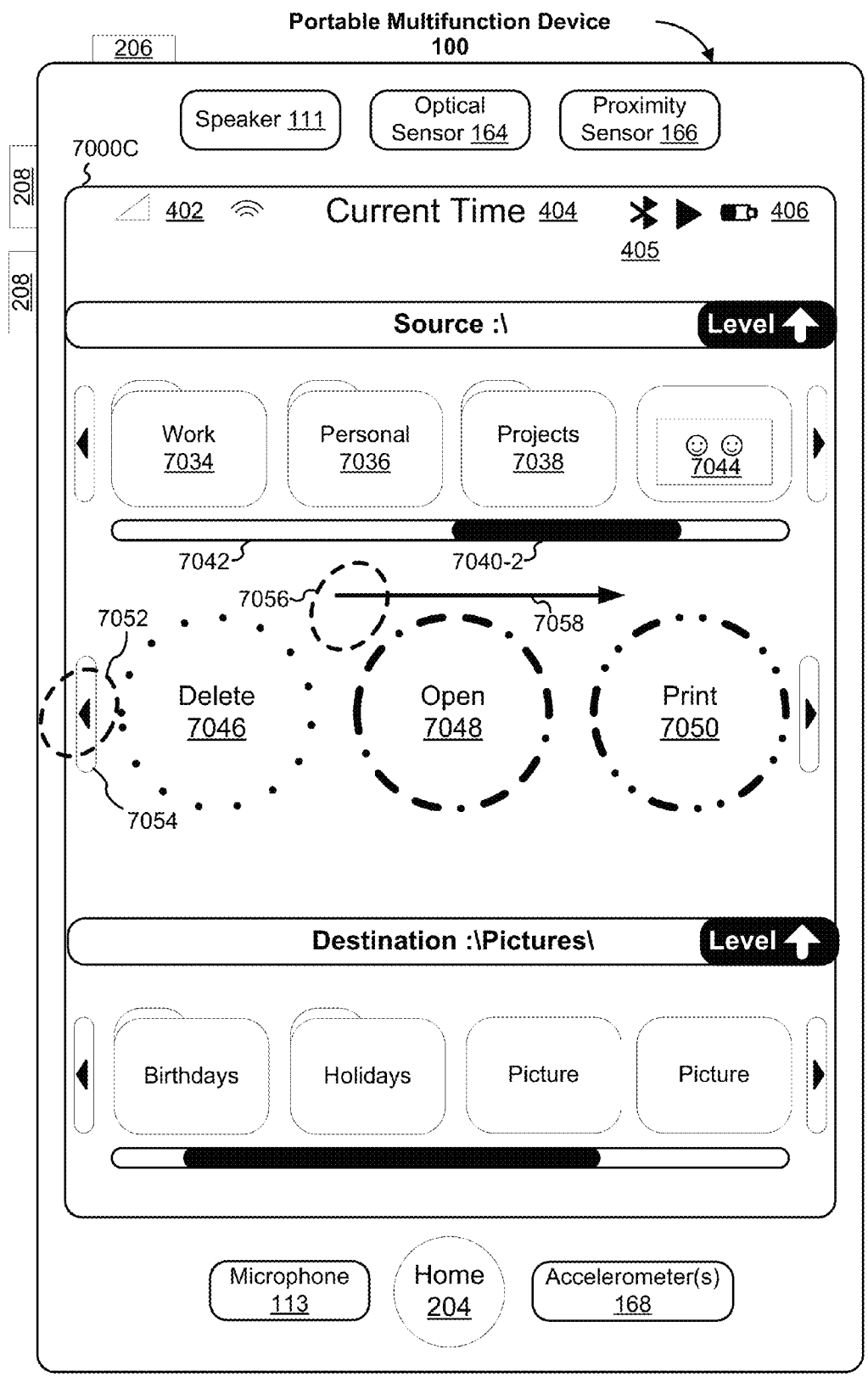

FIGS. 7A-7C illustrate a graphical user interface for navigating through icons that are representative of files and/or folders in a first hierarchical directory, in accordance with some embodiments.

Figure 7D:
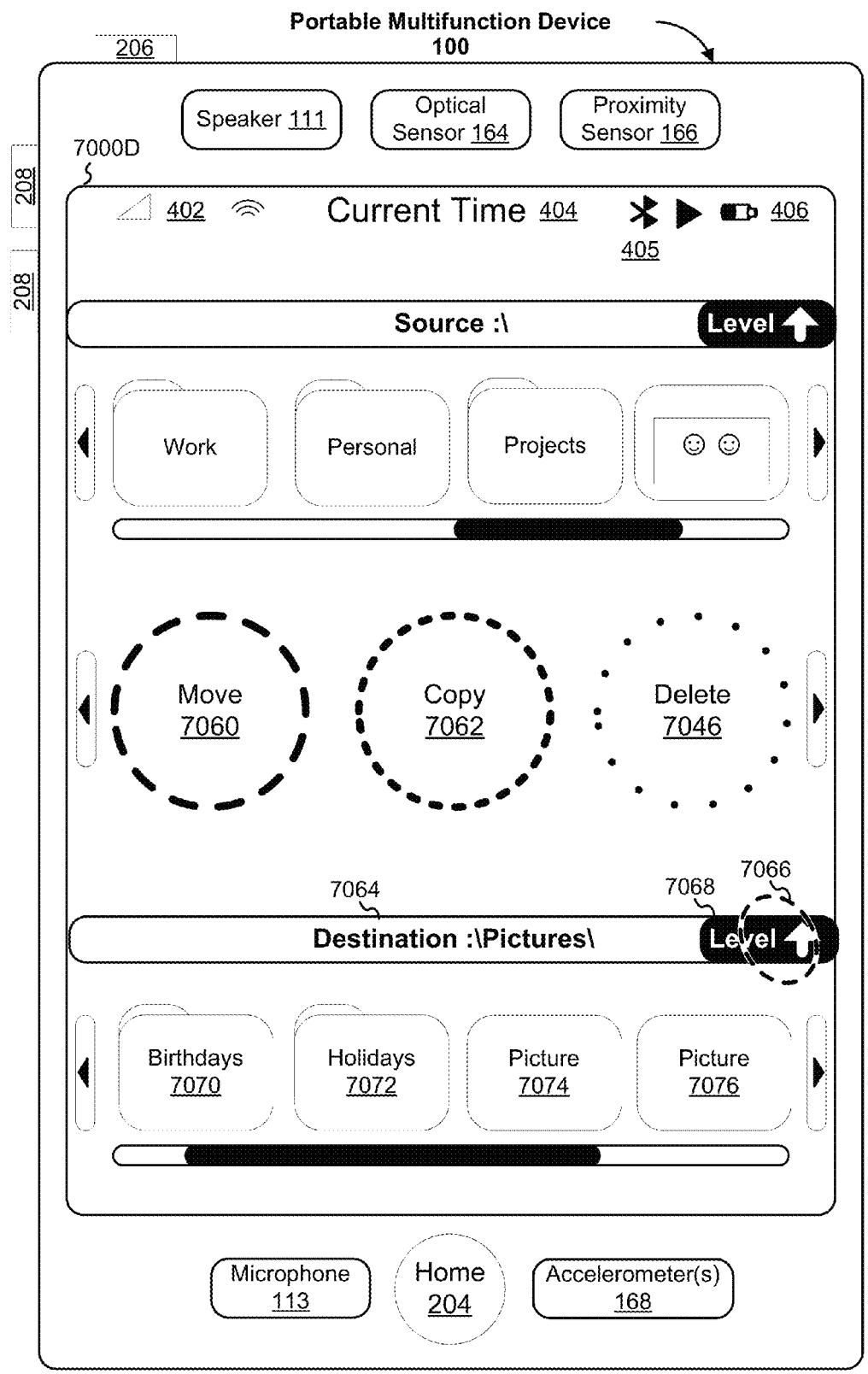

FIGS. 7C-7D illustrate a graphical user interface for navigating through command icons, in accordance with some embodiments.

Figure 7E:
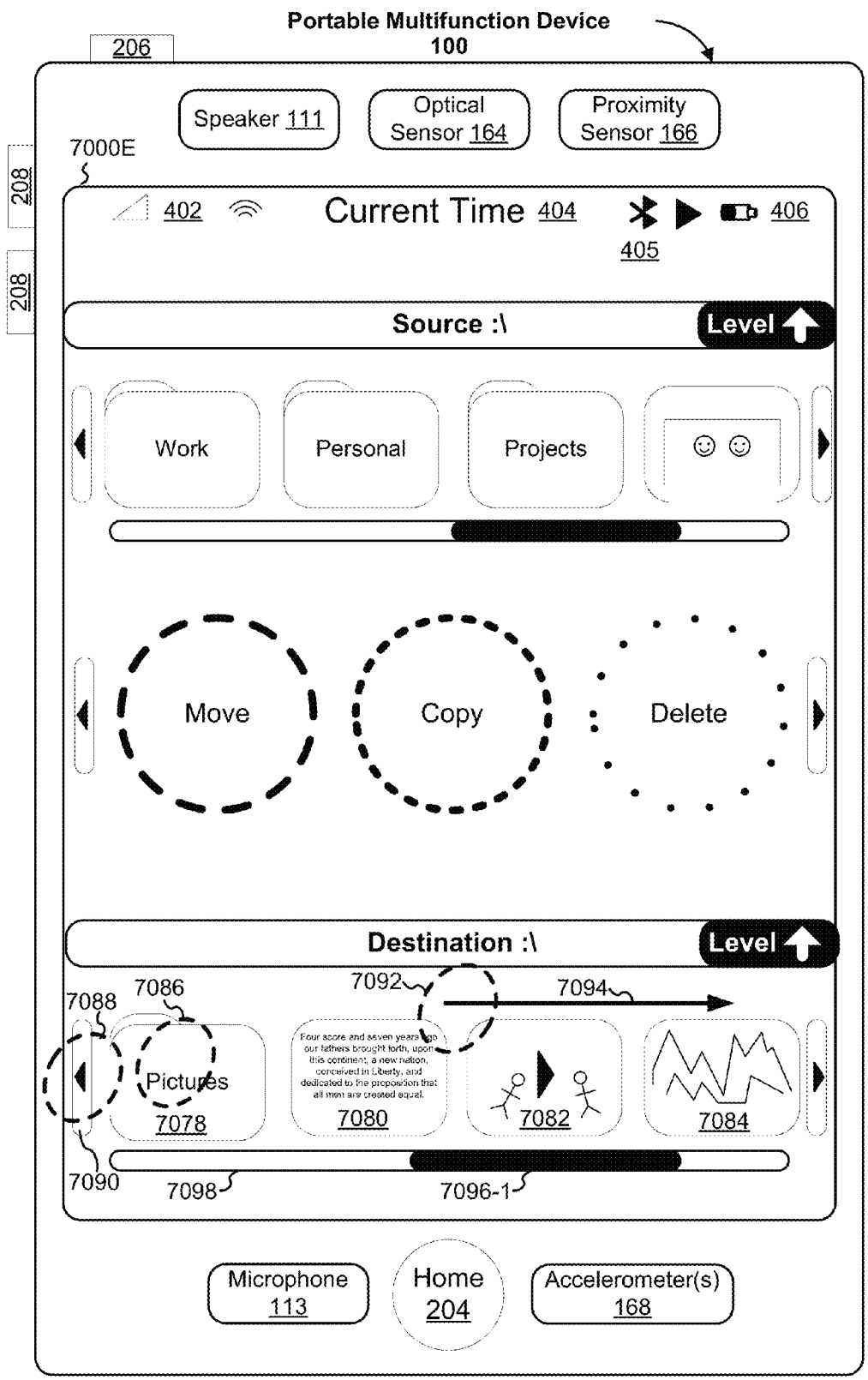
Figure 7F:
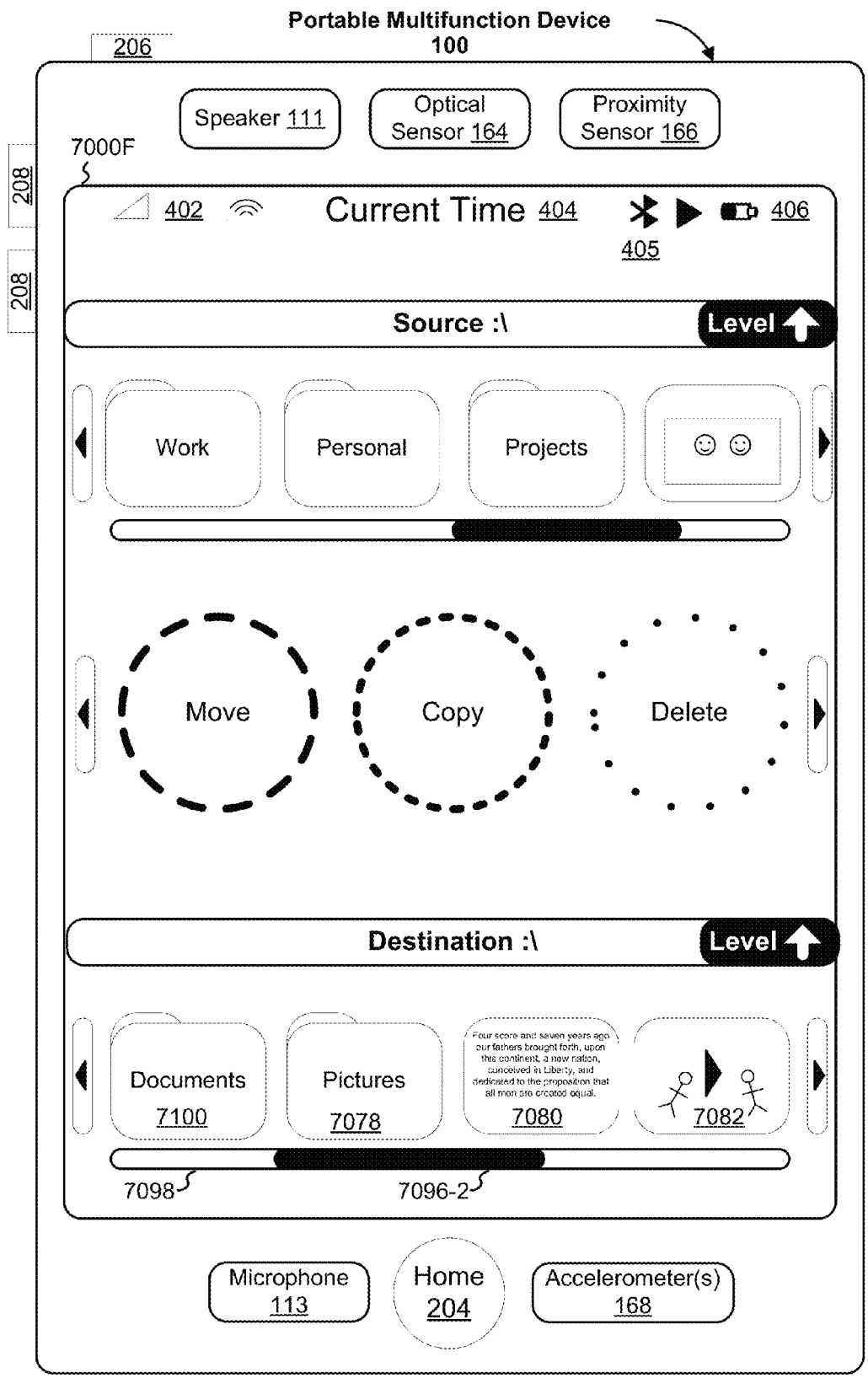

FIGS. 7D-7F illustrate a graphical user interface for navigating through icons that are representative of files and/or folders in a second hierarchical directory, in accordance with some embodiments.

FIGS. 7G-7J, 7M-7P and 7R-7S illustrate a graphical user interface for performing a directory management operation on a single file or folder (e.g., moving the file or folder from a first hierarchical directory to a second hierarchical directory), in accordance with some embodiments.

Figure 7G:
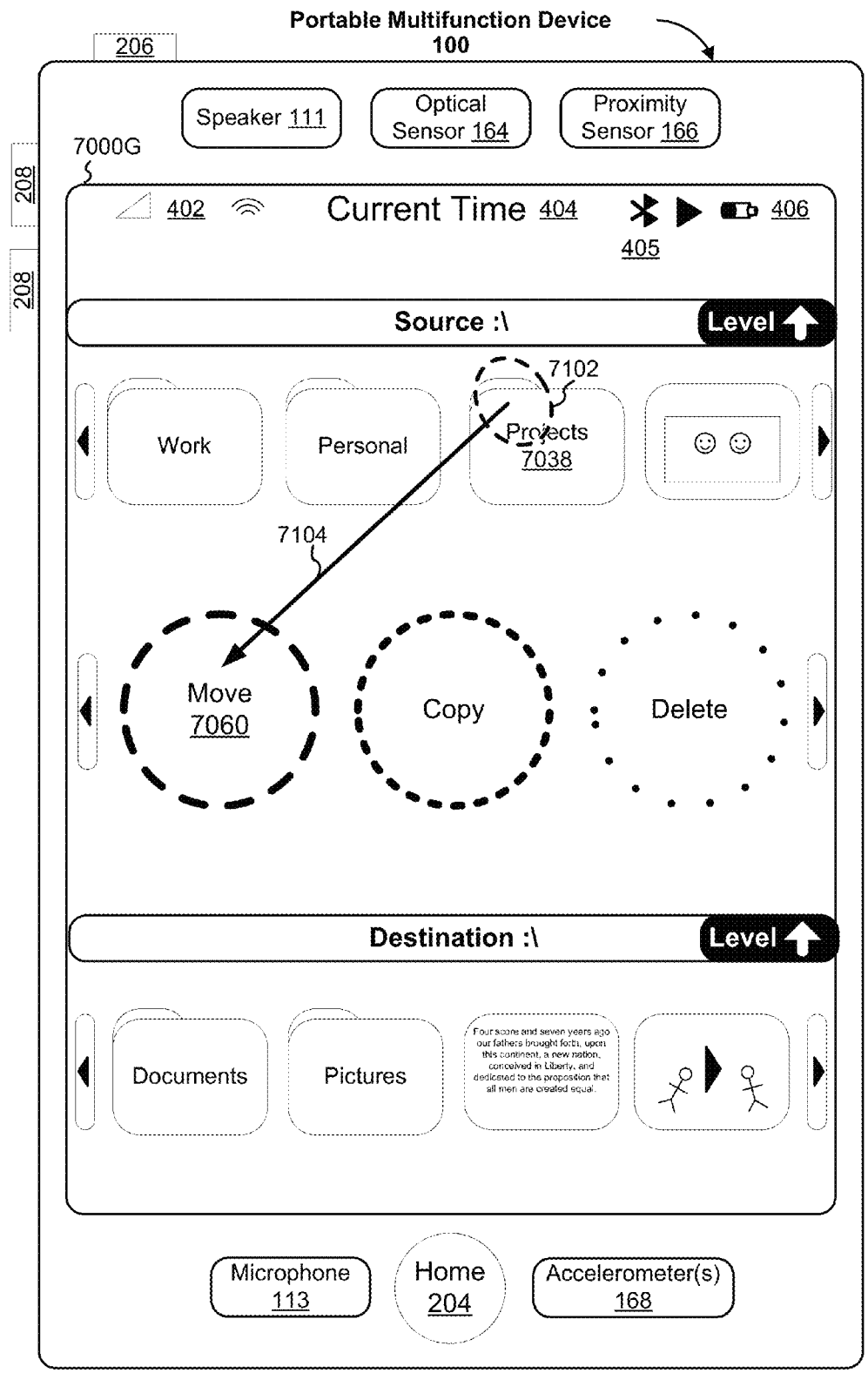
Figure 7H:
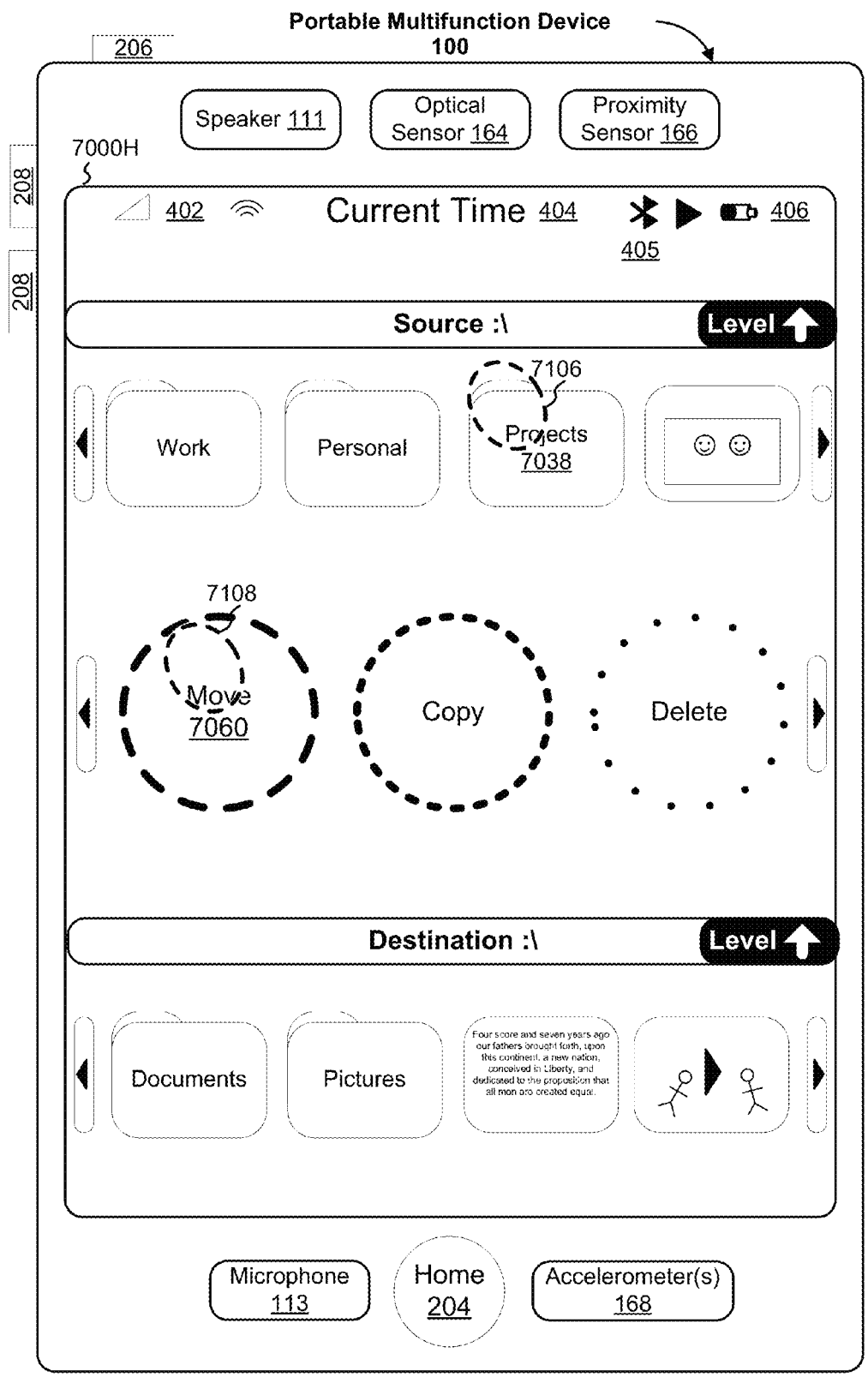
Figure 7I:
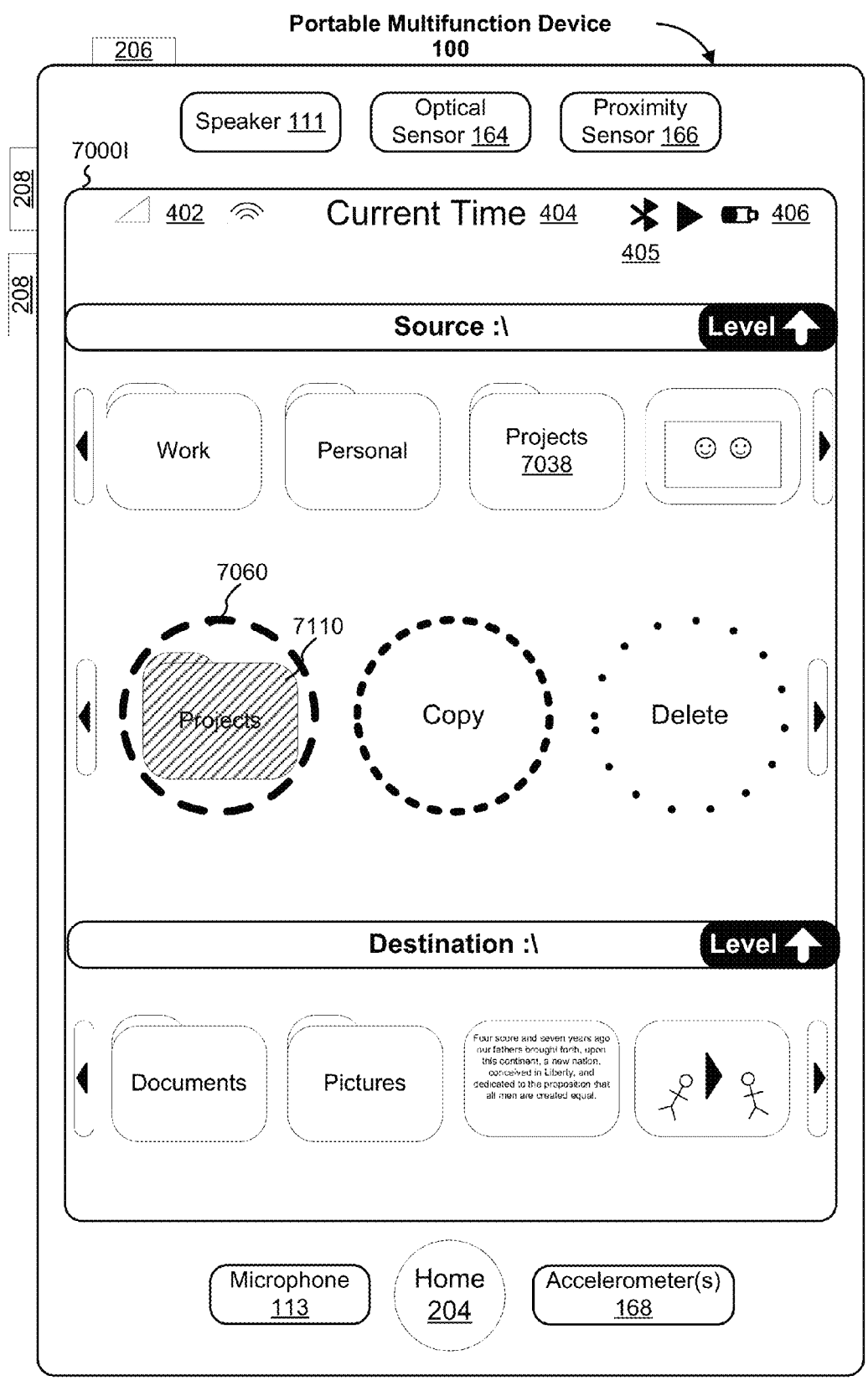
Figure 7J:
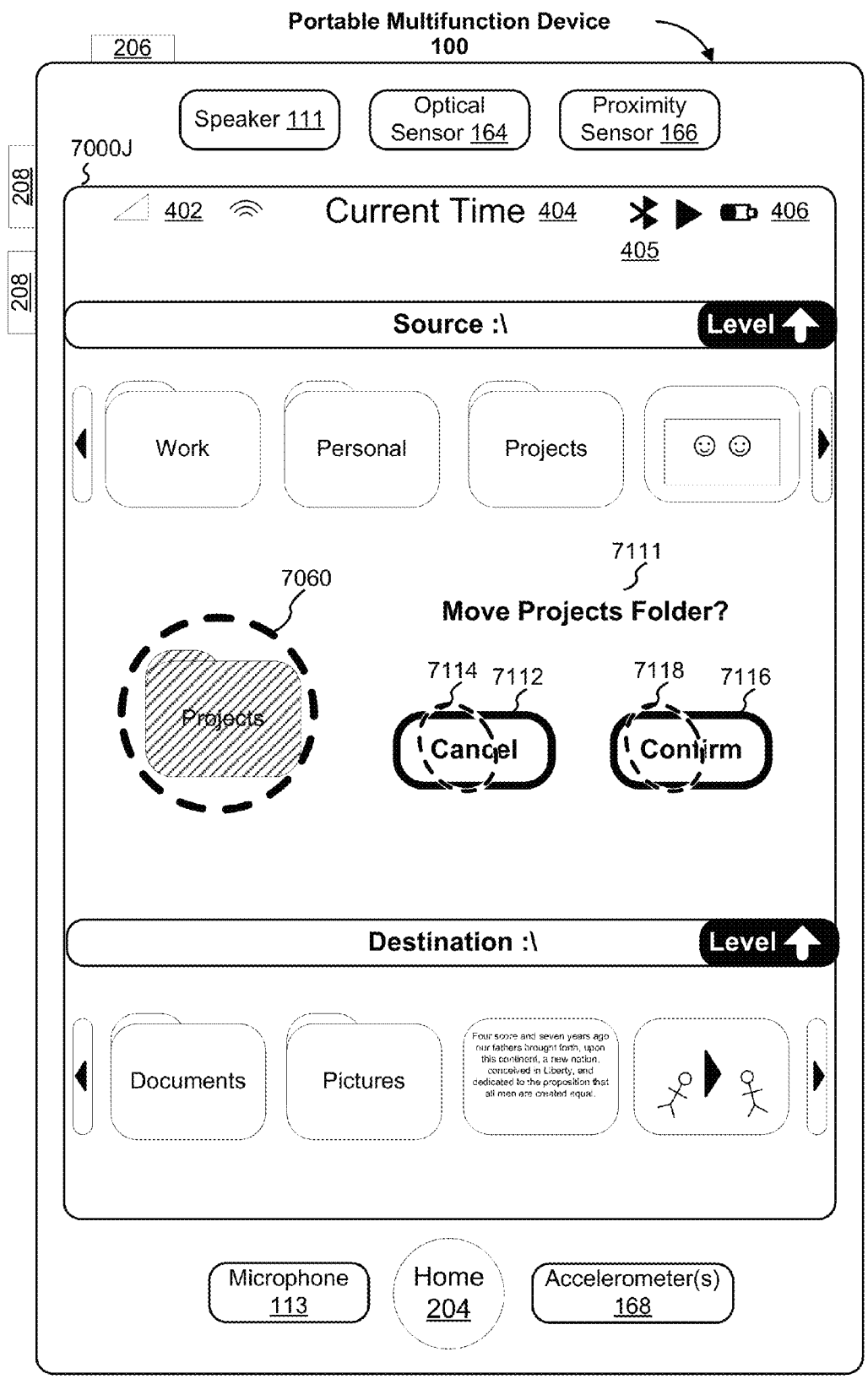
Figure 7K:
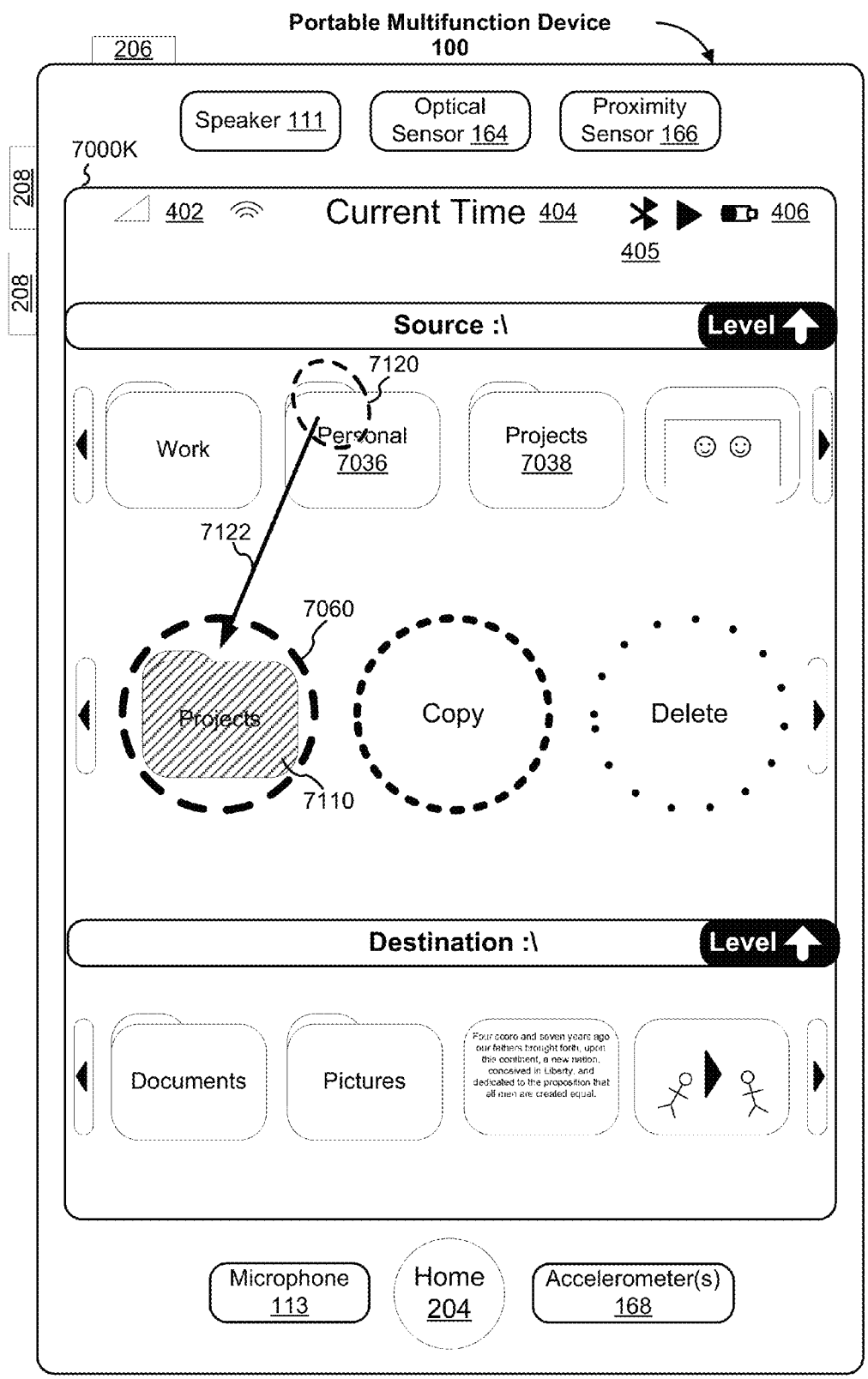
Figure 7L:
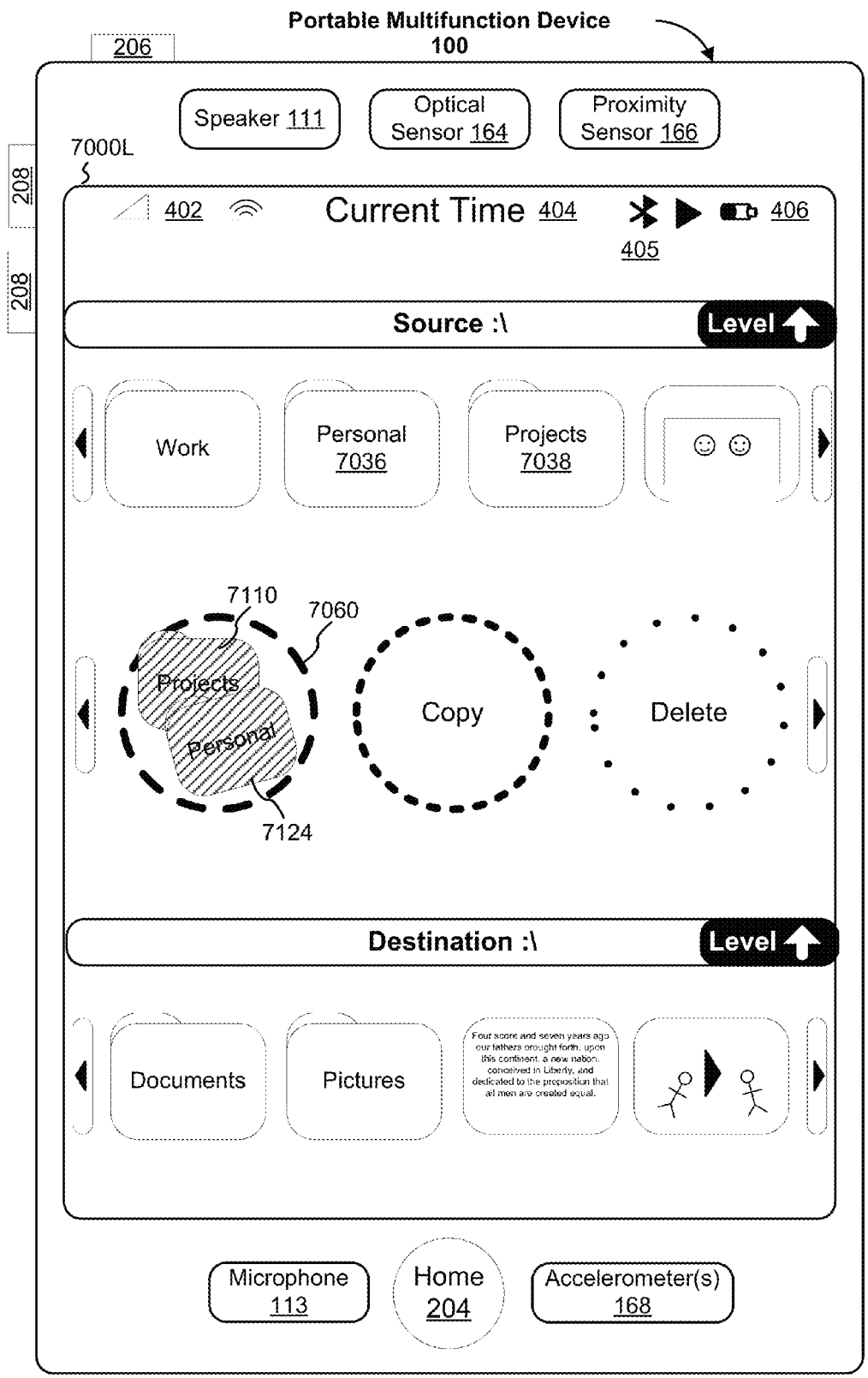
Figure 7M:
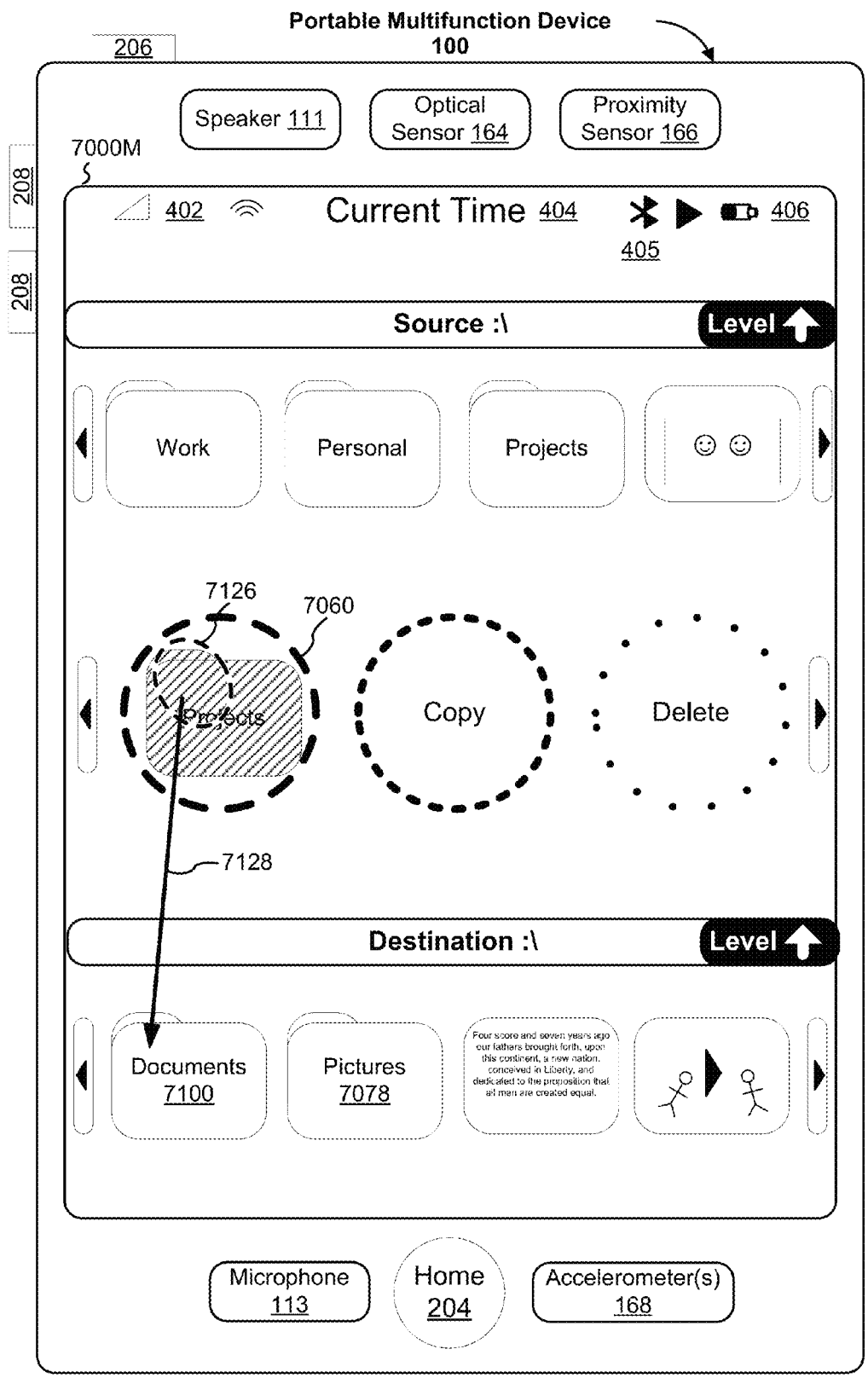
Figure 7N:
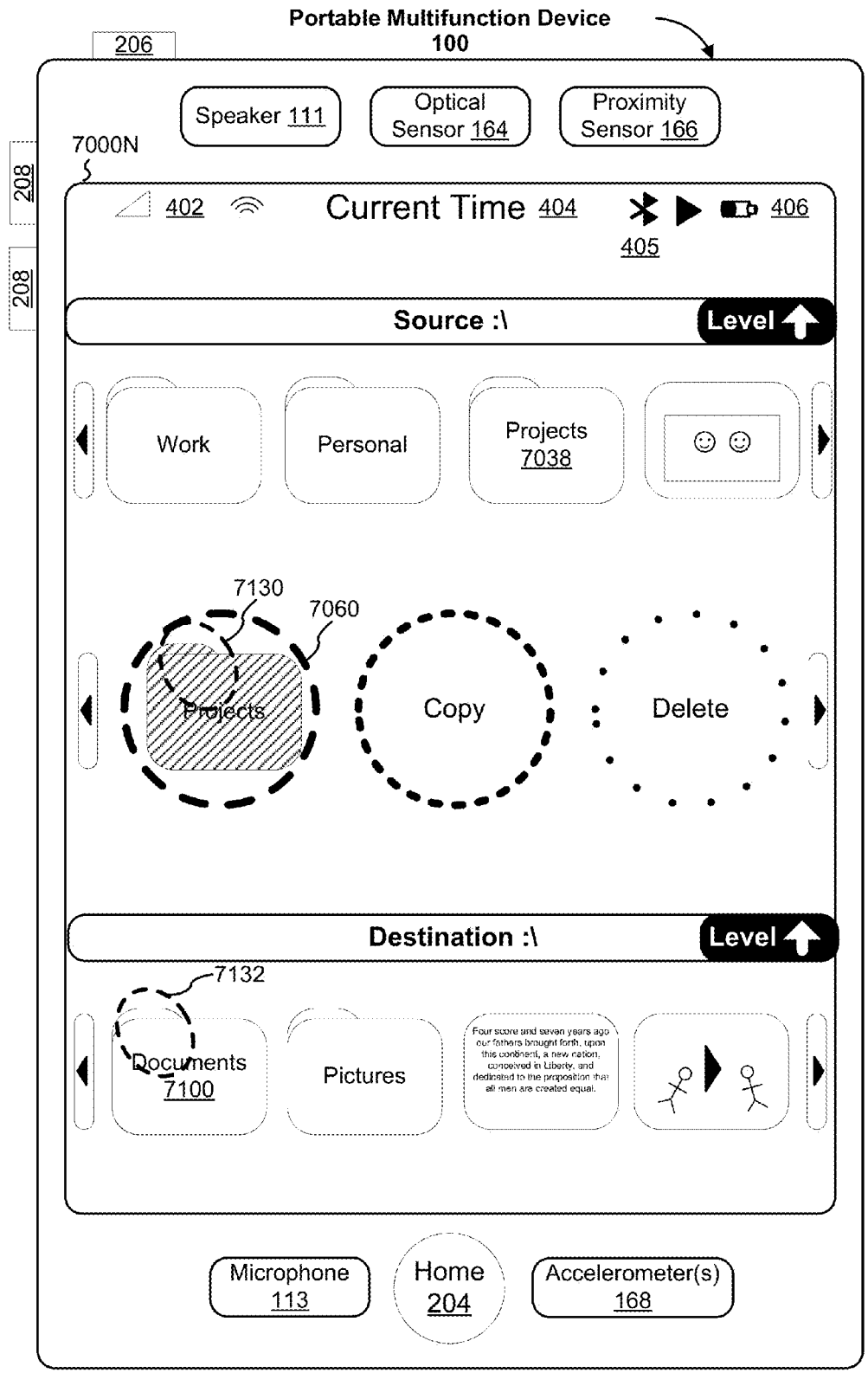
Figure 7O:
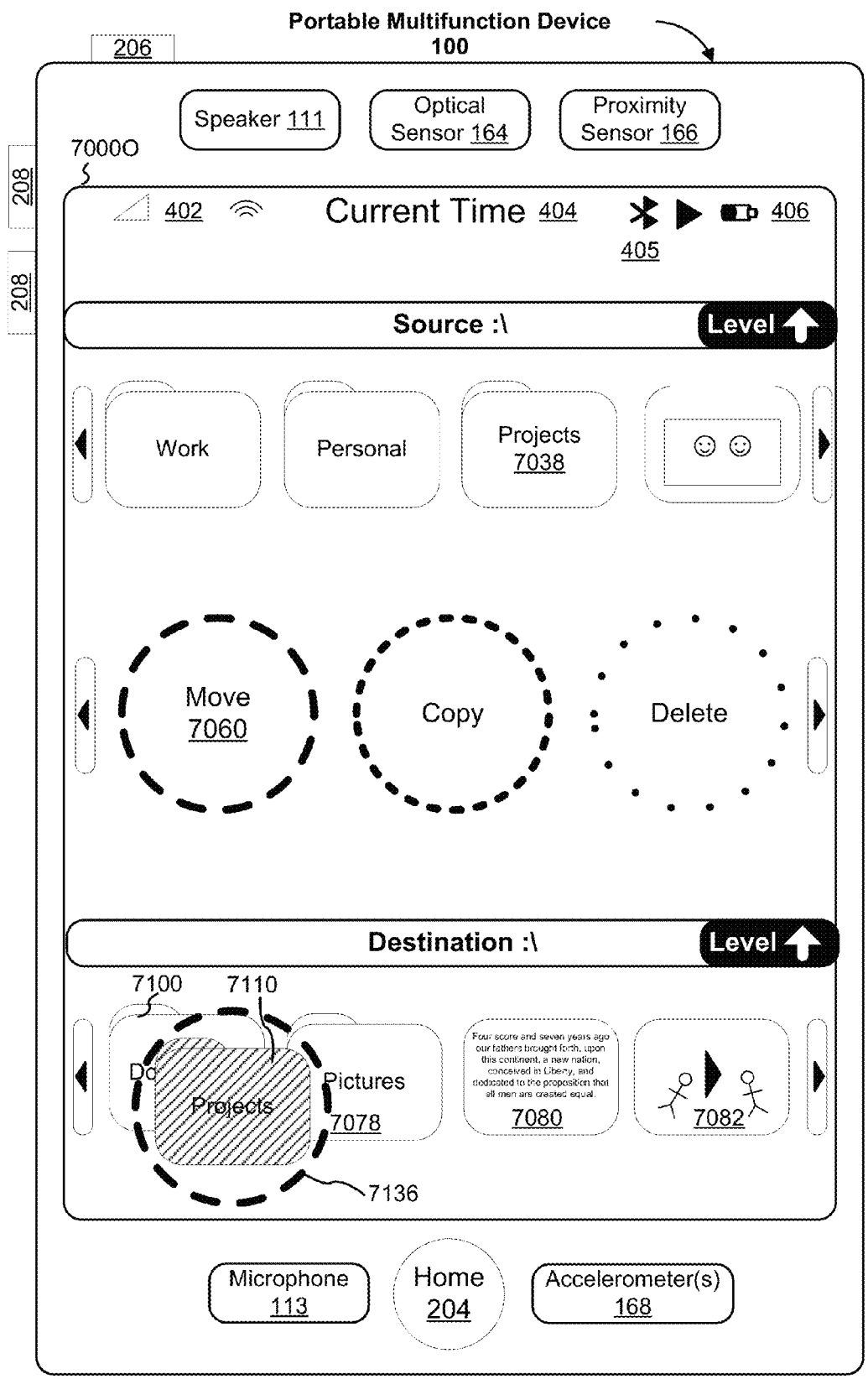
Figure 7P:
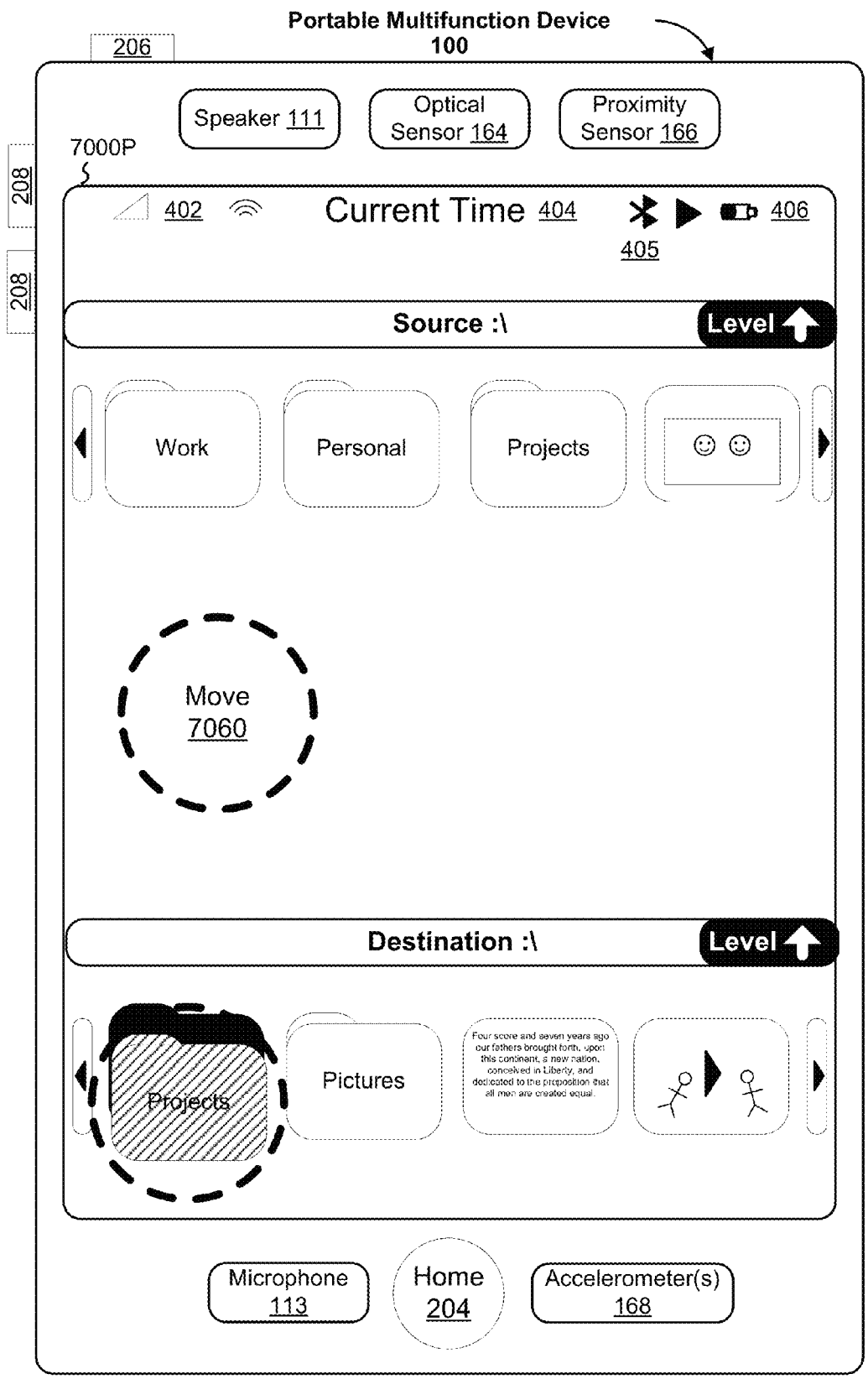
Figure 7Q:
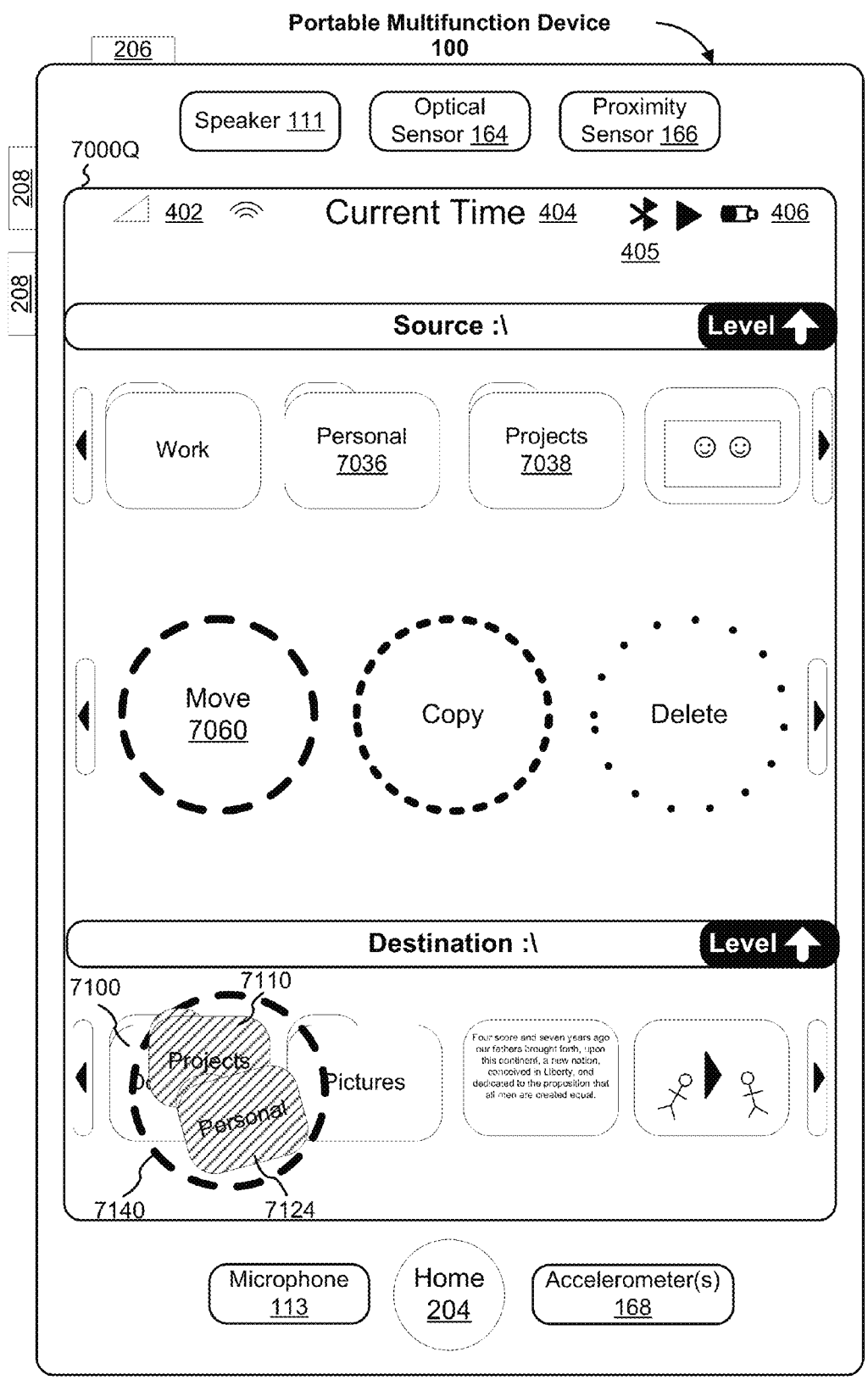

FIGS. 7K-7L, 7Q illustrate a graphical user interface for performing a single directory management operation on multiple files and/or folders (e.g., moving multiple files and/or folders from a first hierarchical directory to a second hierarchical directory), in accordance with some embodiments.

Figure 7R:
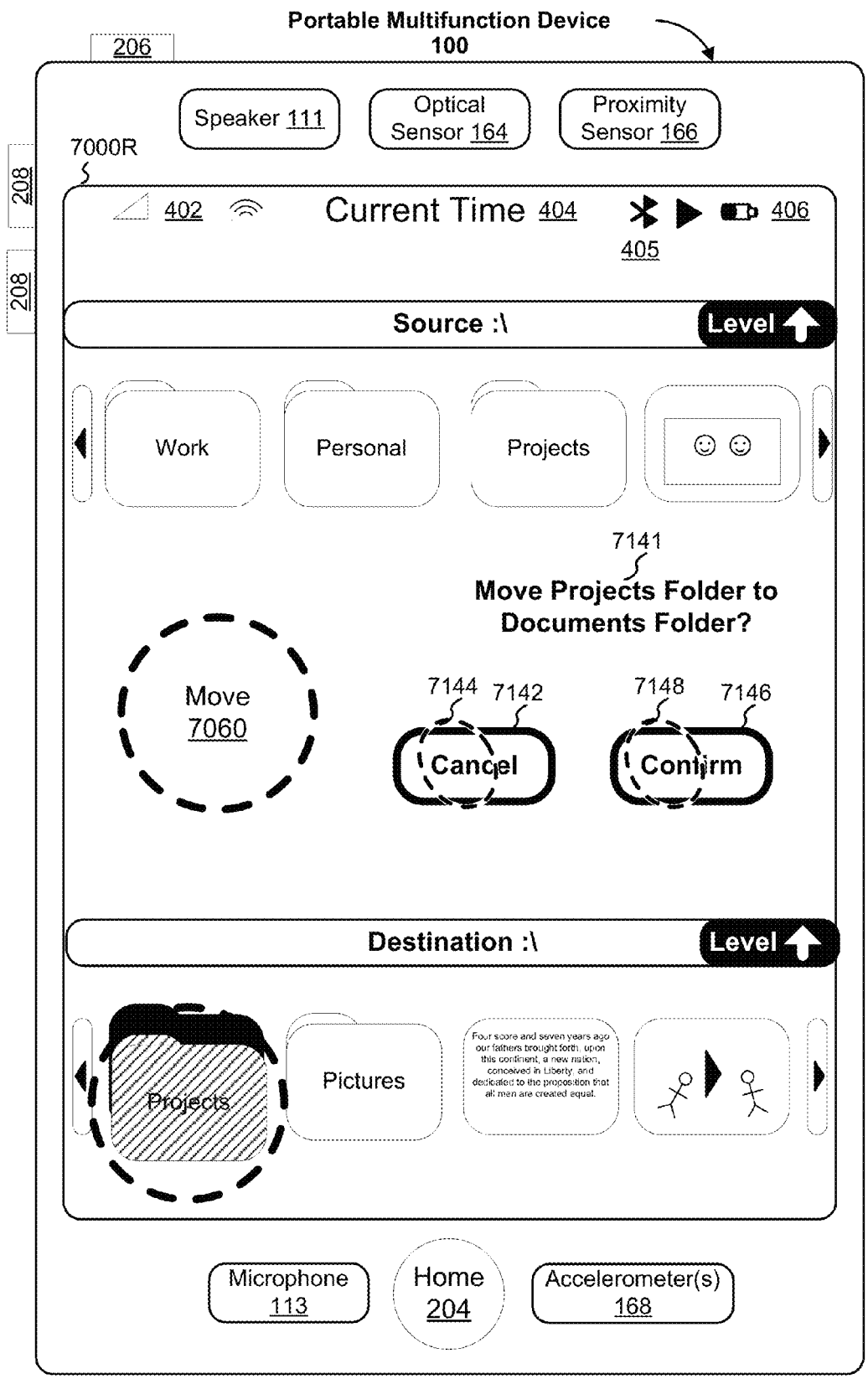
Figure 7S:
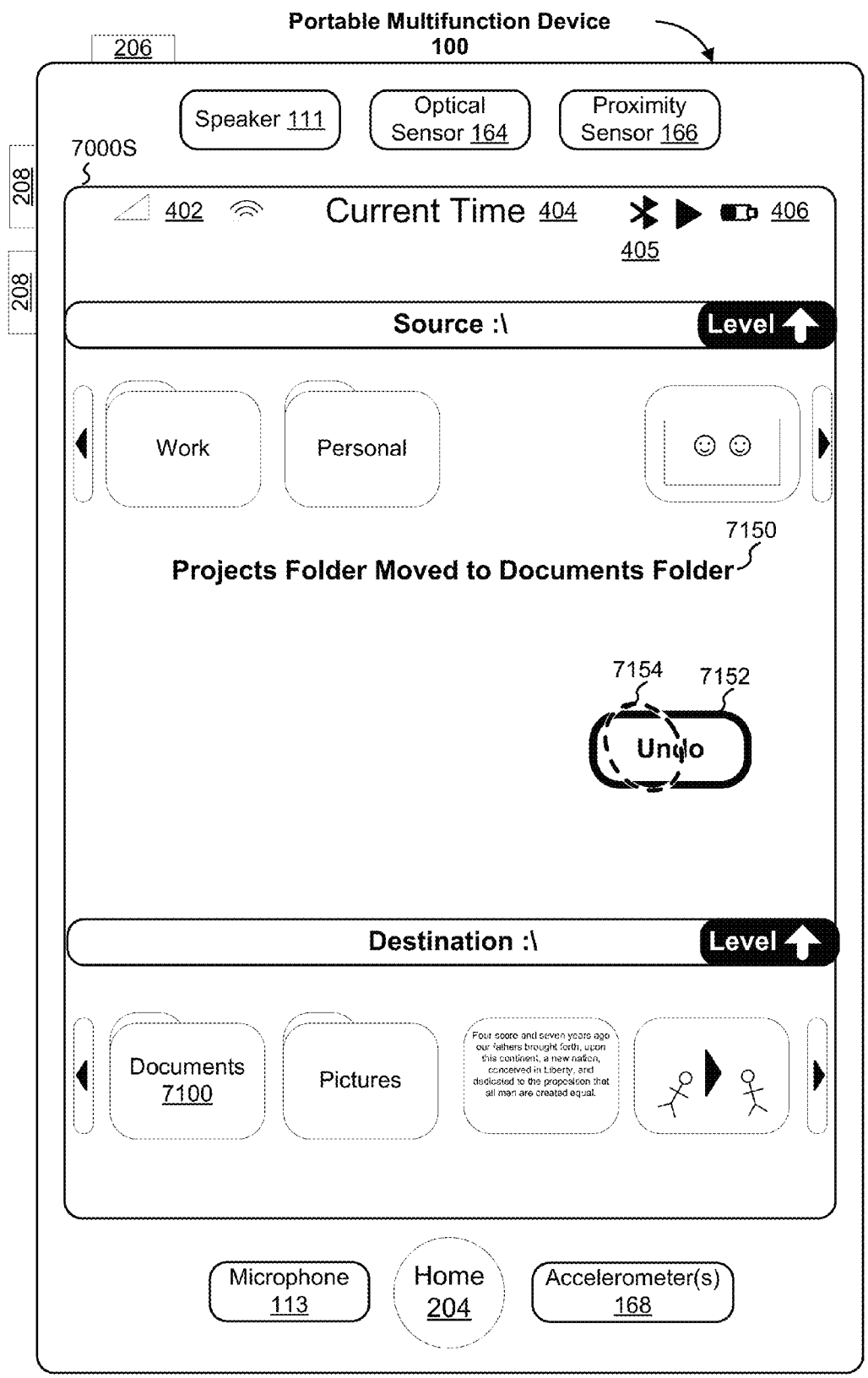
Figure 7T:
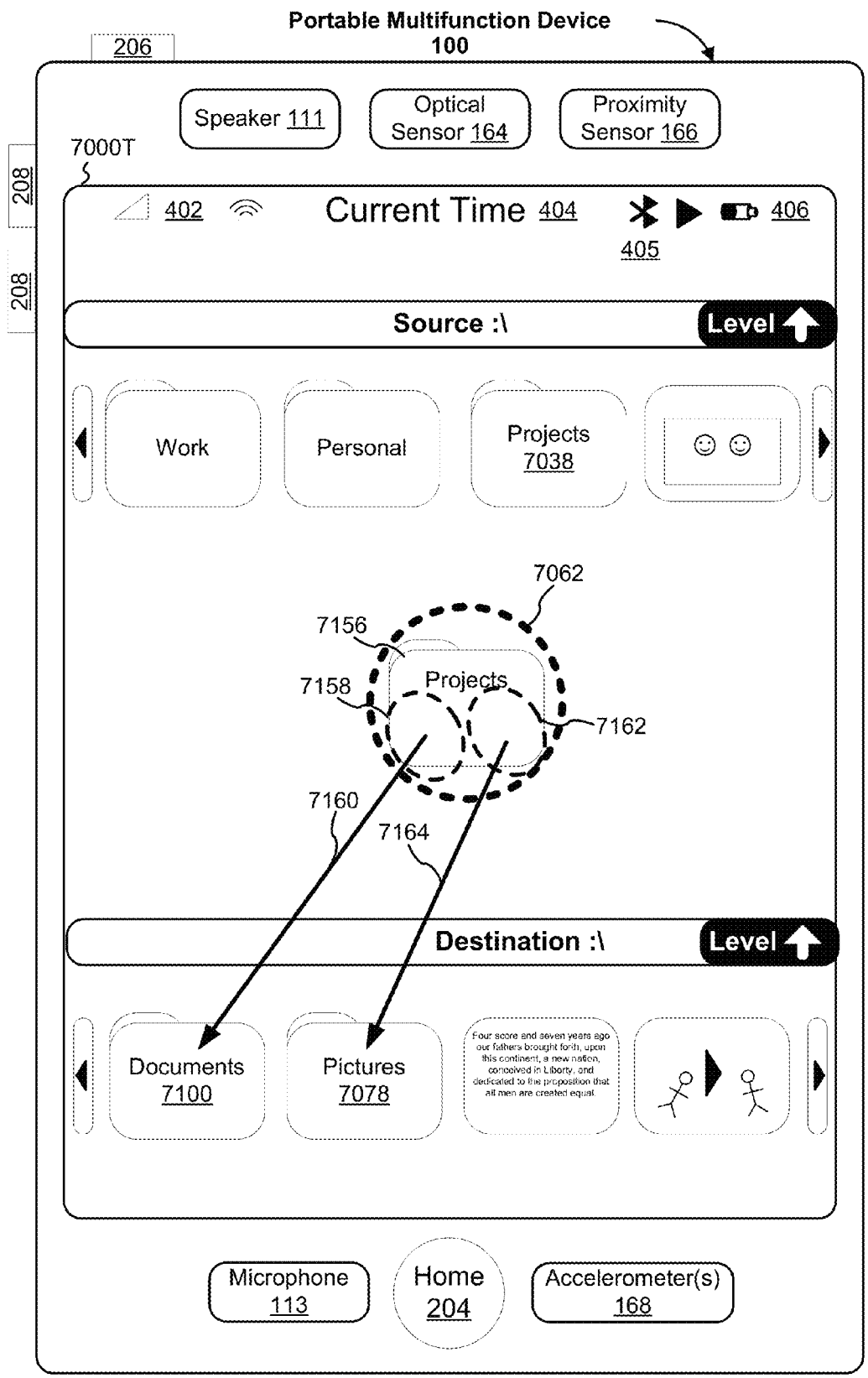

FIG. 7T illustrates a graphical user interface for performing multiple directory management operations on one or more files and/or folders (e.g., copying a single file/folder in a first hierarchical directory to a first folder in a second hierarchical directory and copying the same file/folder to a second folder in the second hierarchical directory), in accordance with some embodiments.

Figure 7U:
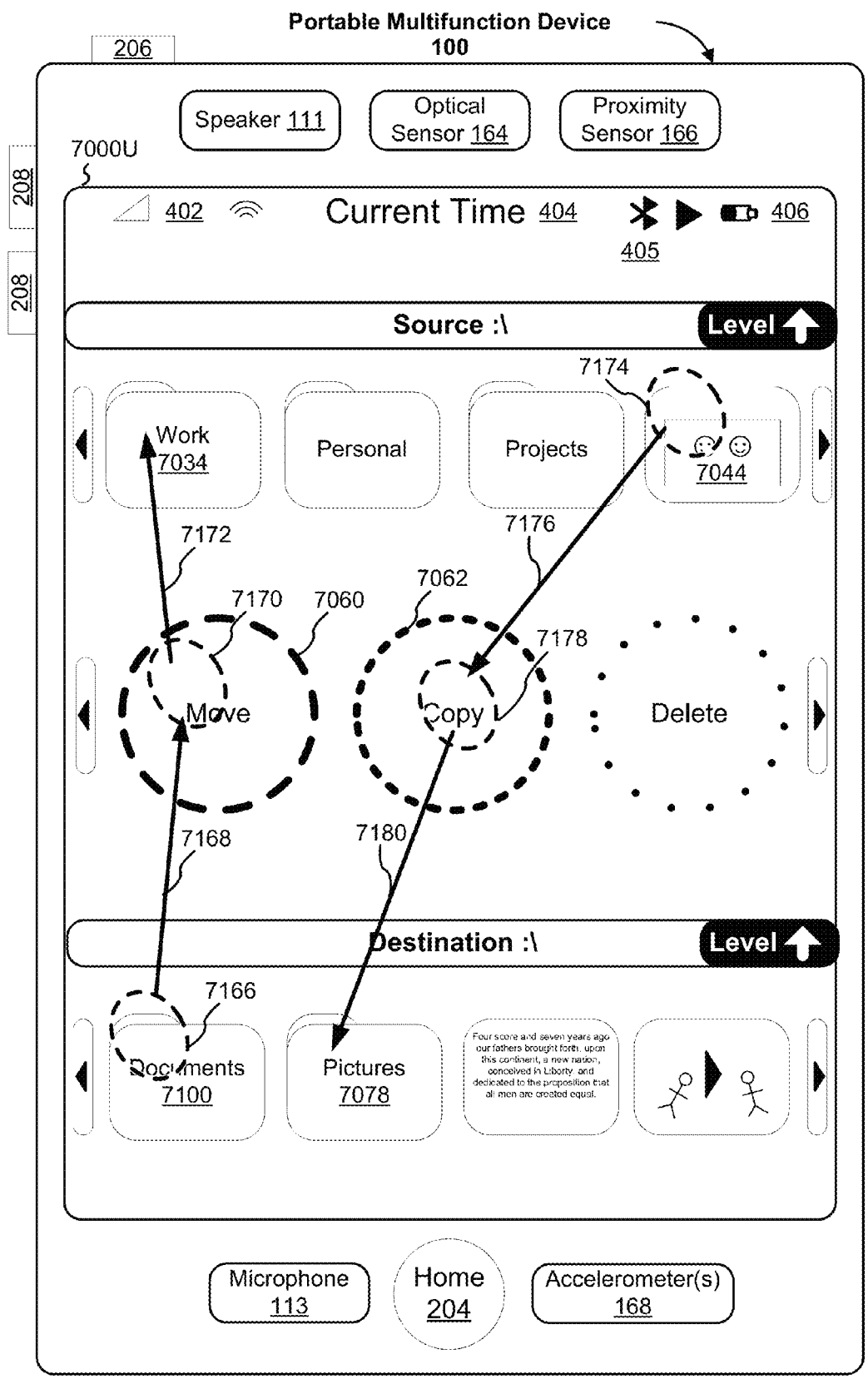
Figure 7V:
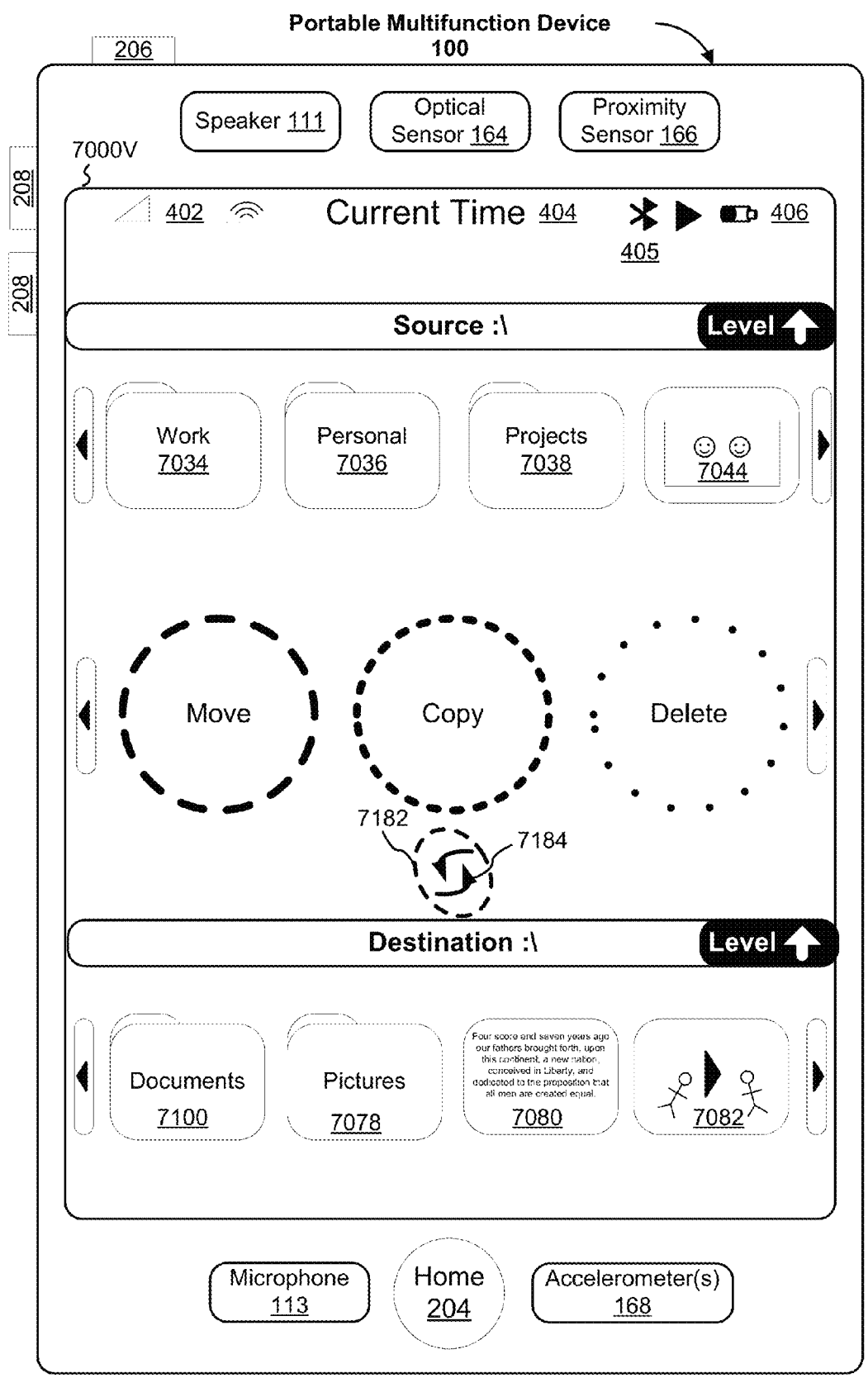
Figure 7W:
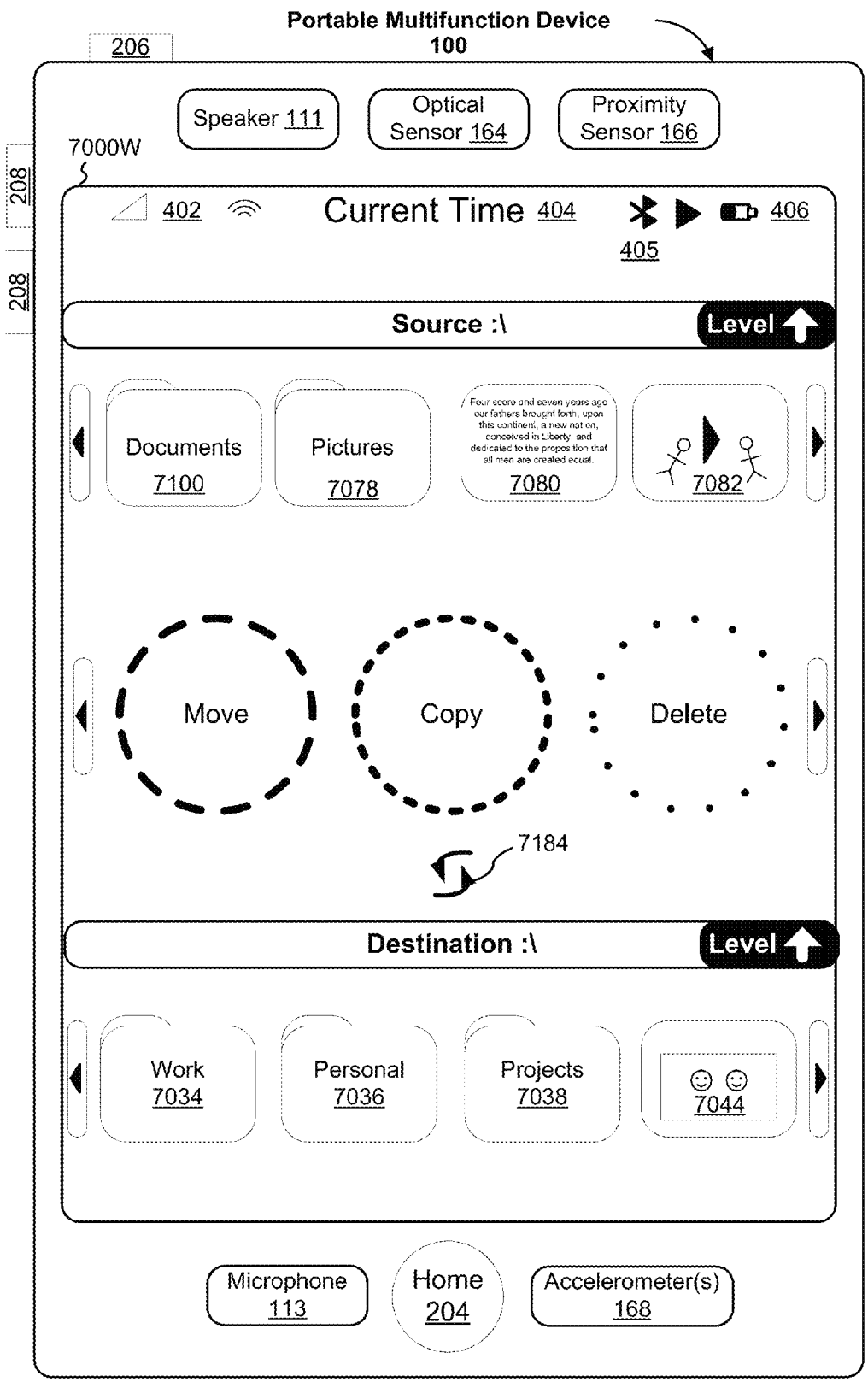

FIGS. 7U-7W illustrate a graphical user interface for performing directory management operations on files and/or folders in the second hierarchical directory, in accordance with some embodiments.

Figure 8A:
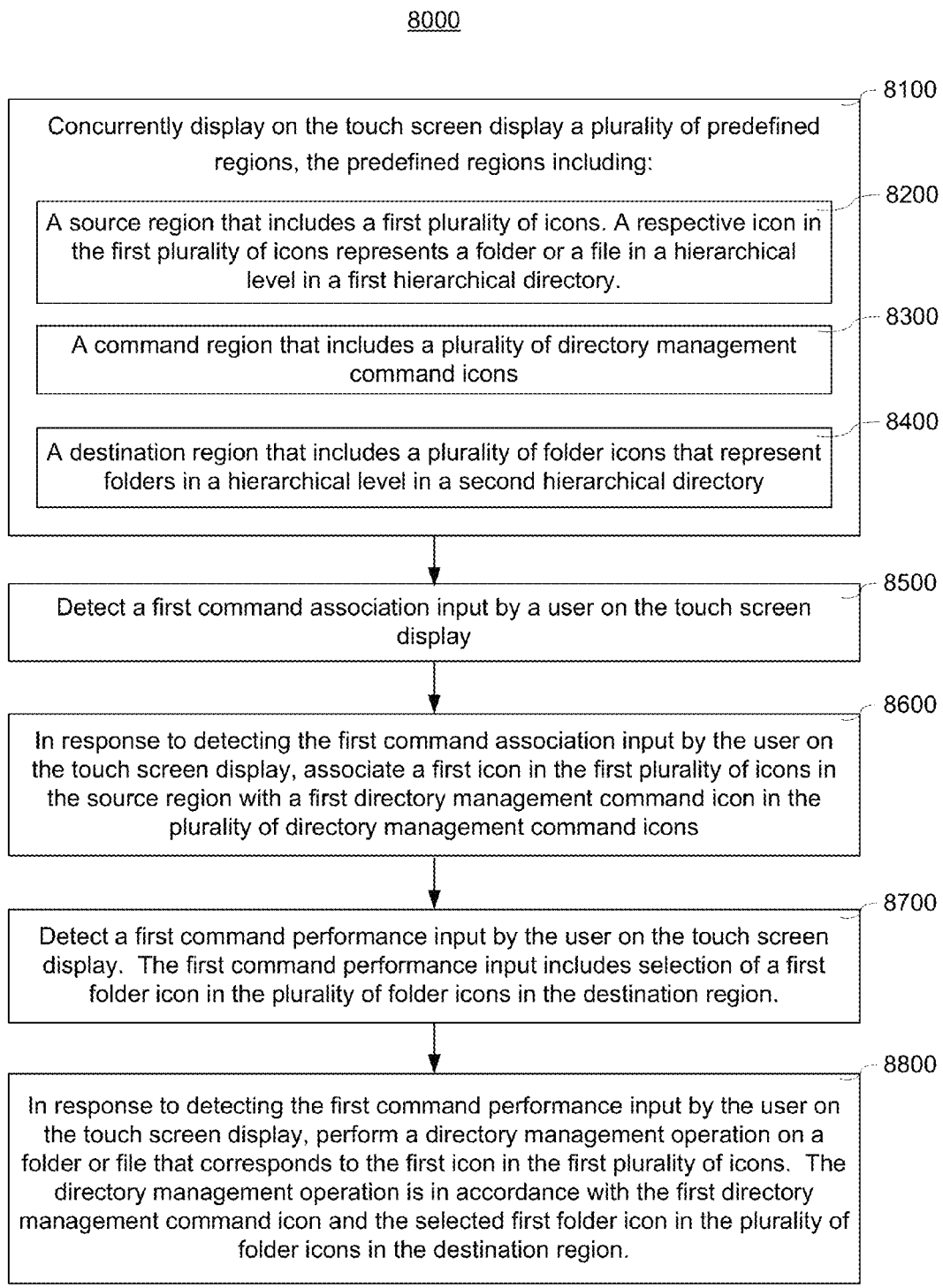
FIGS. 8A-8V are flow diagrams illustrating a method for performing directory management operations in accordance with some embodiments.
Figure 8B:
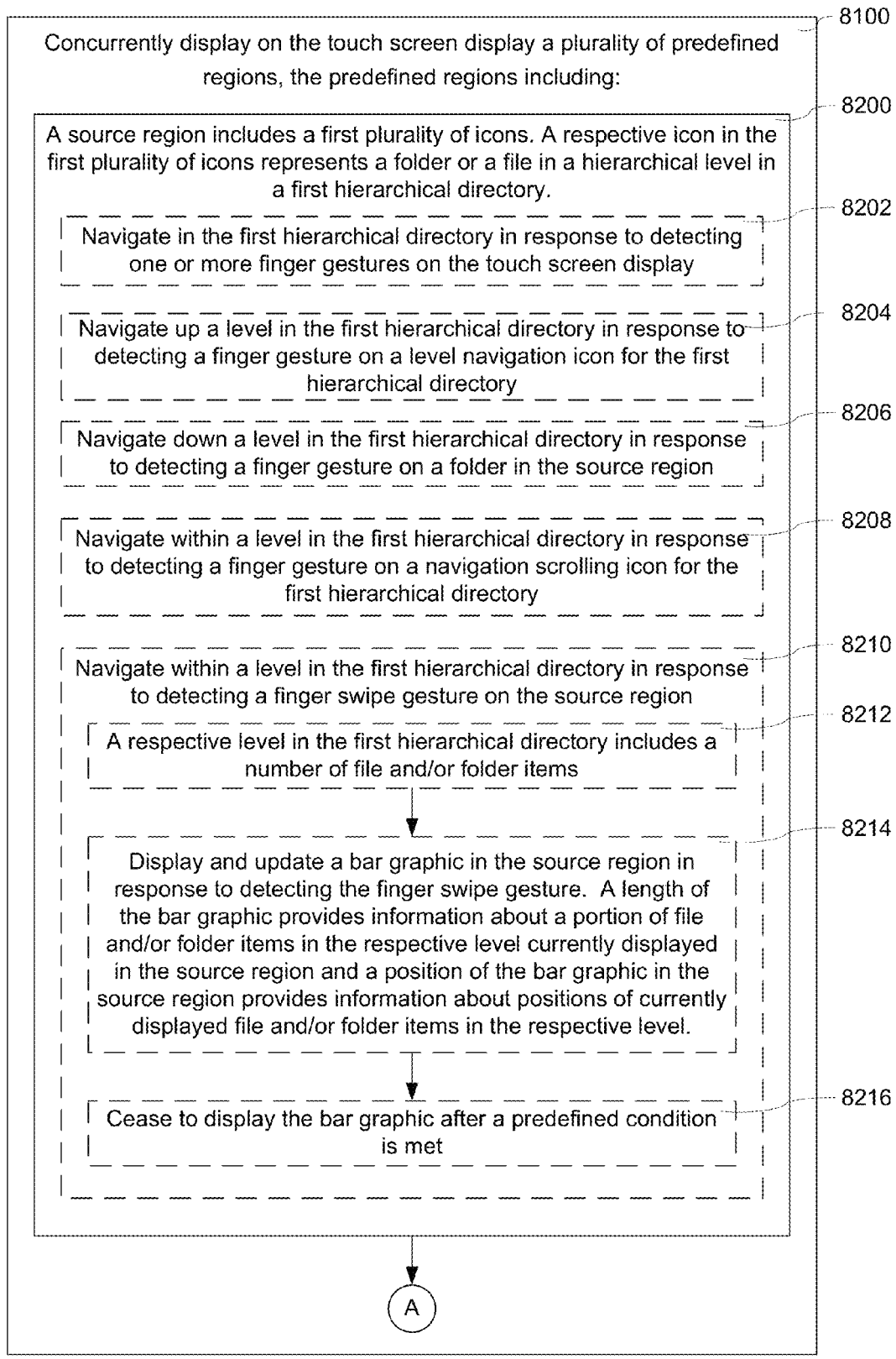
Figure 8C:
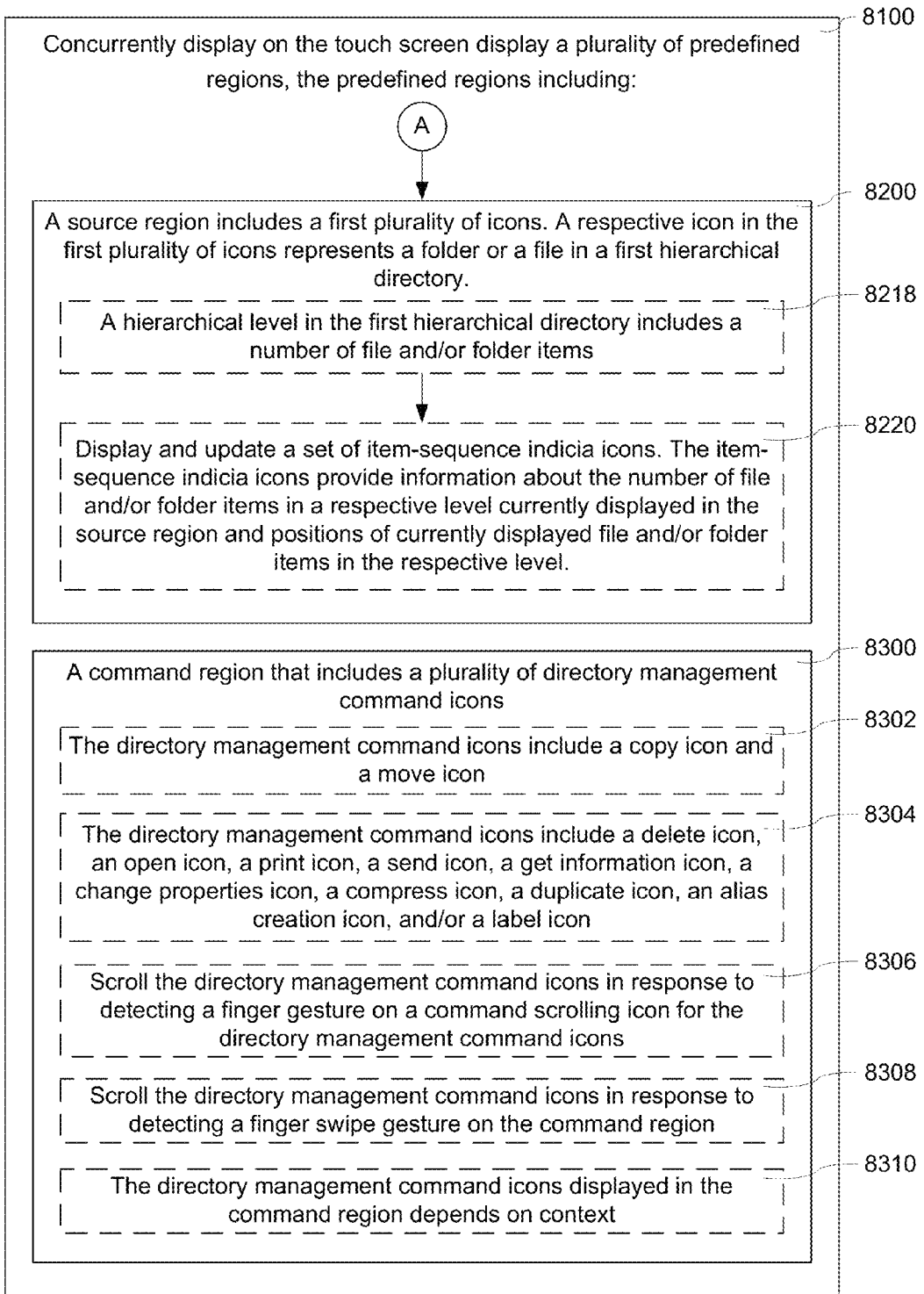
Figure 8D:
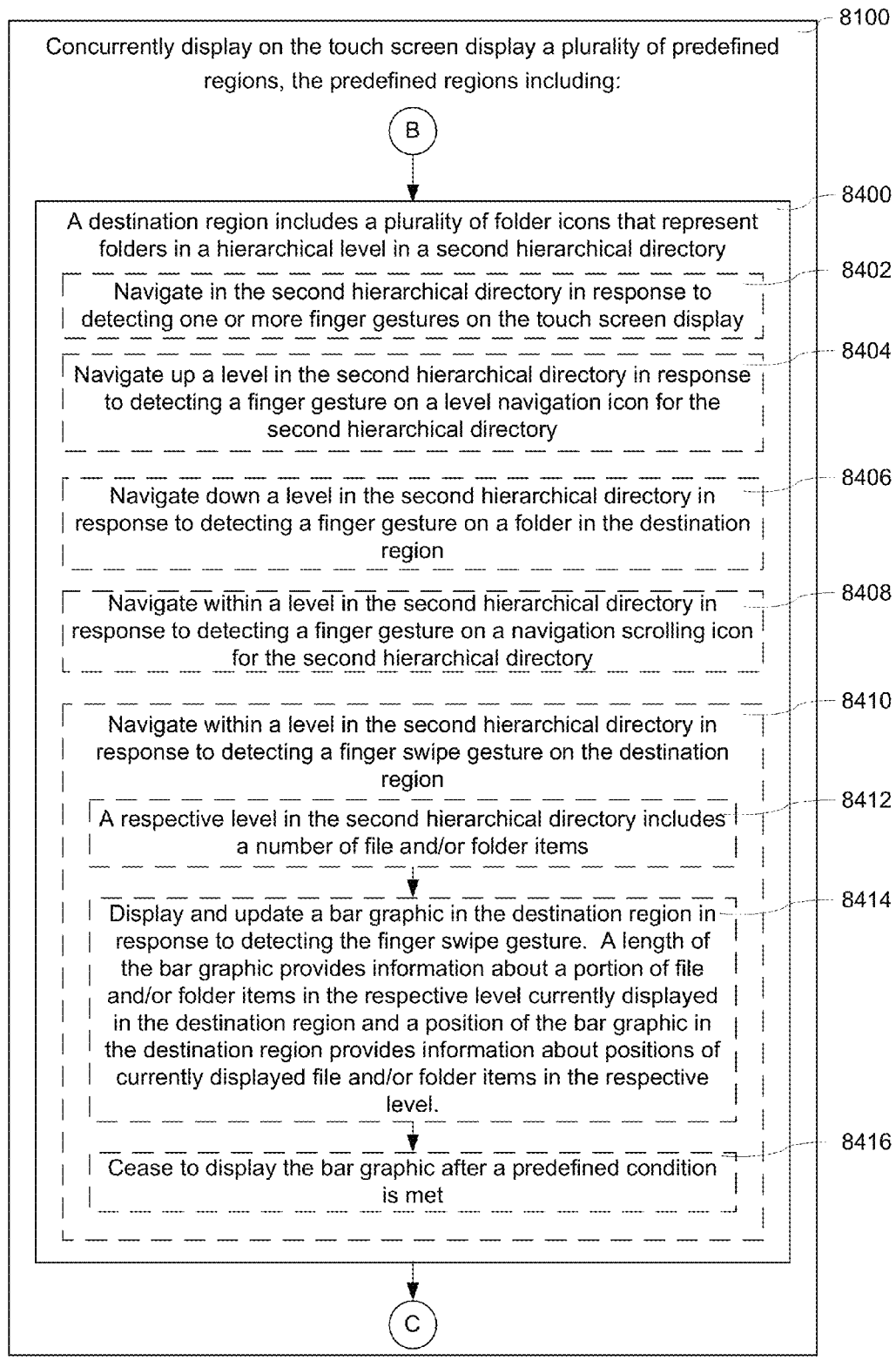
Figure 8E:
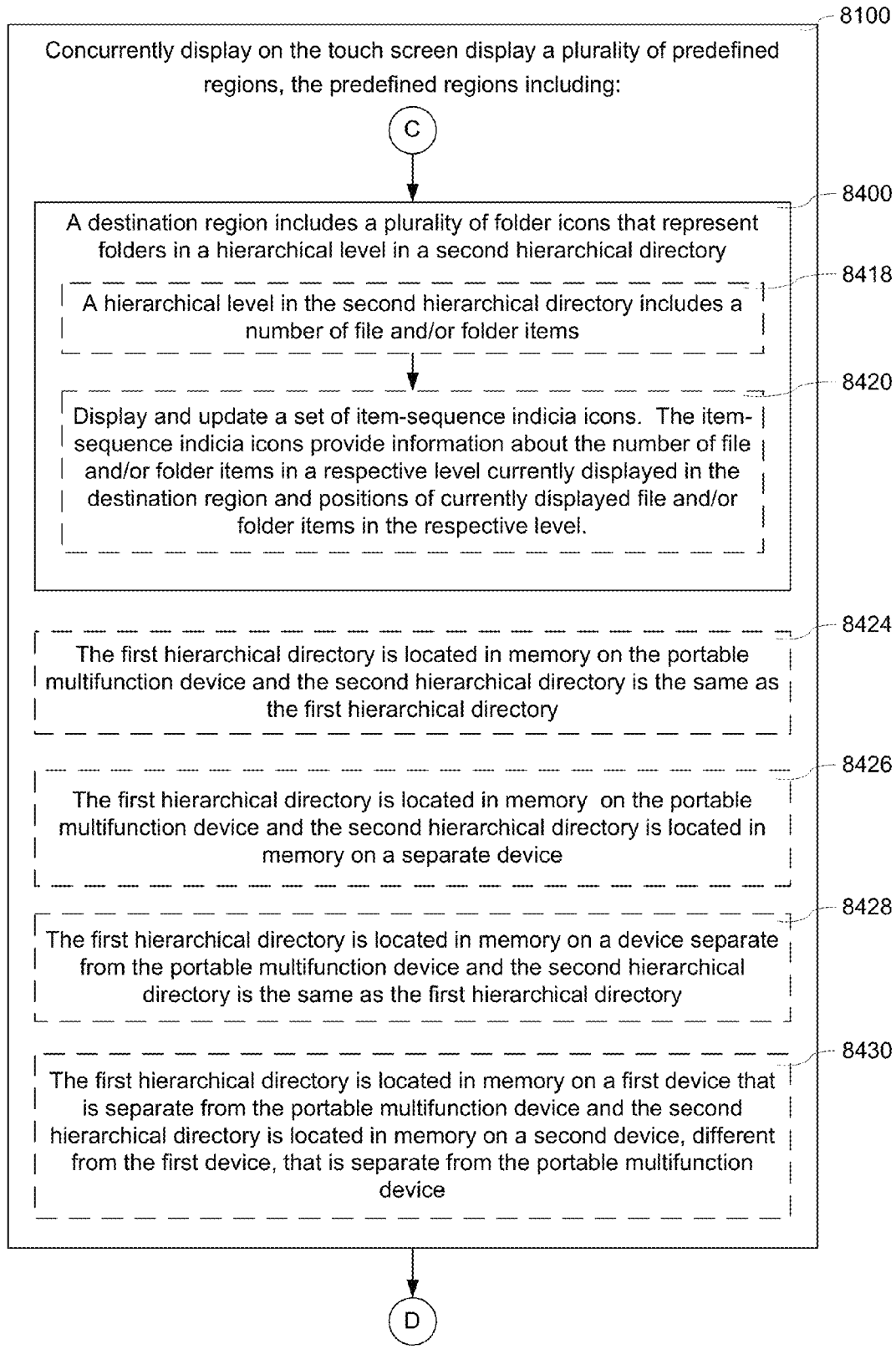
Figure 8F:
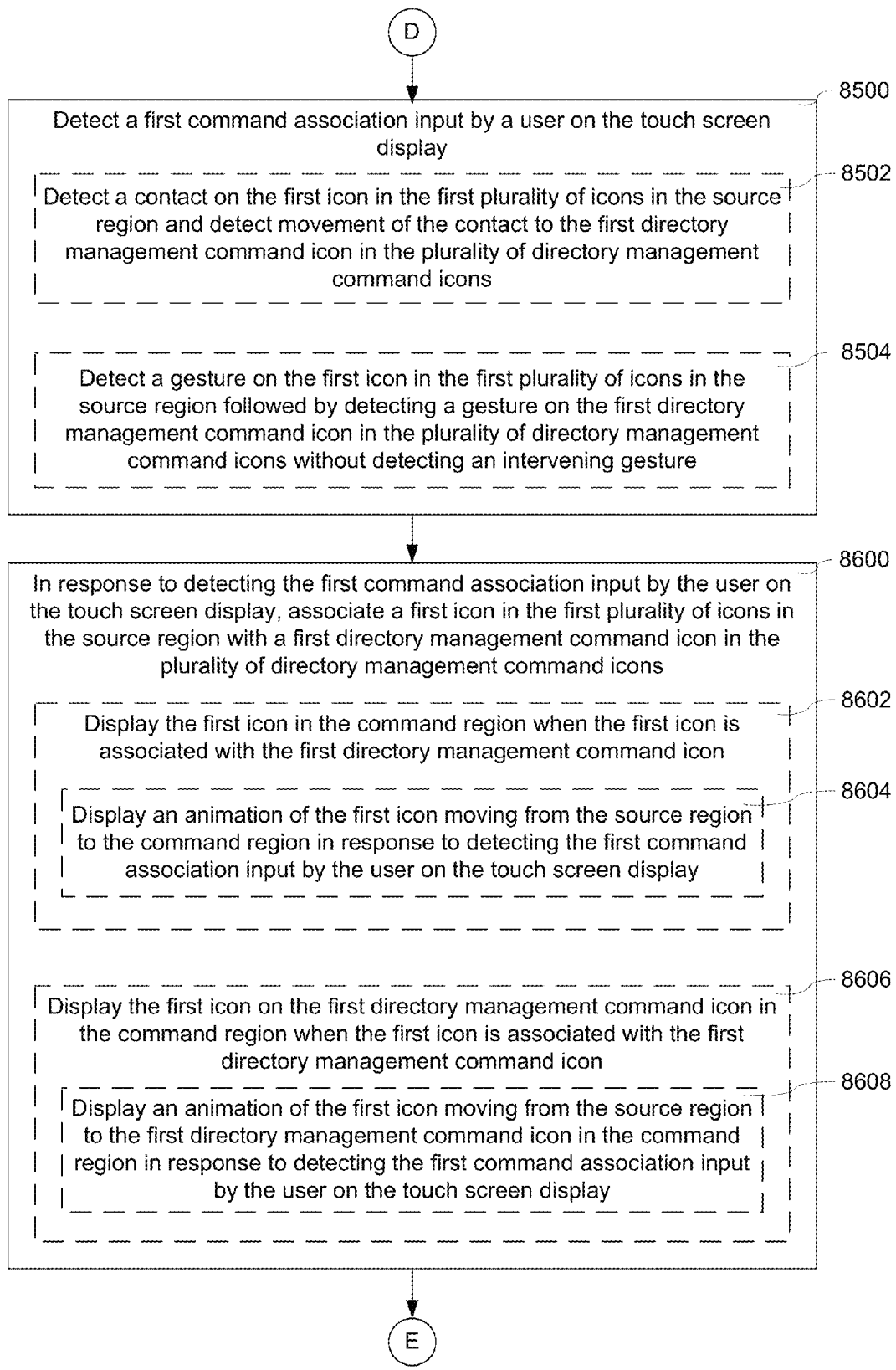
Figure 8G:
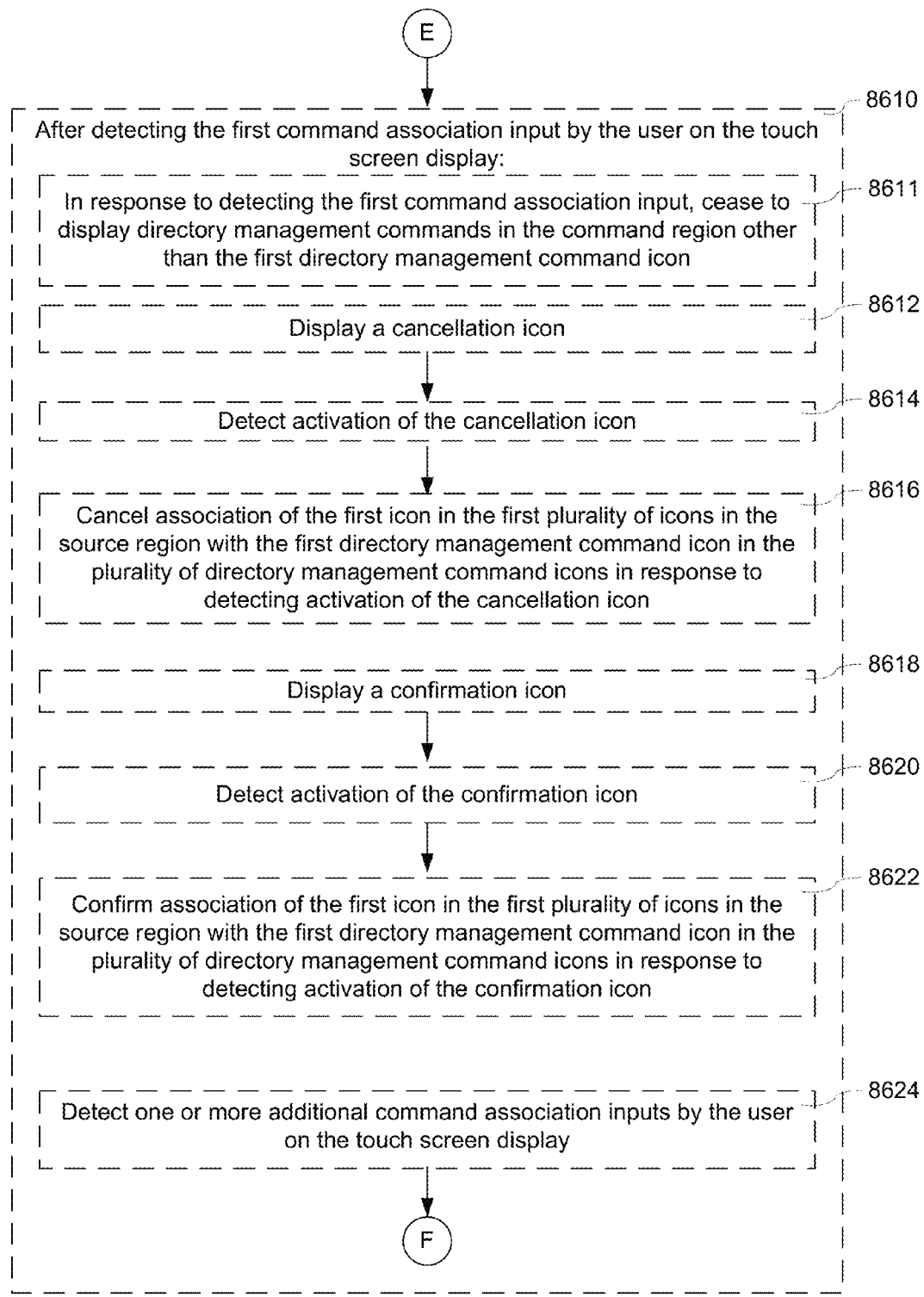
Figure 8H:
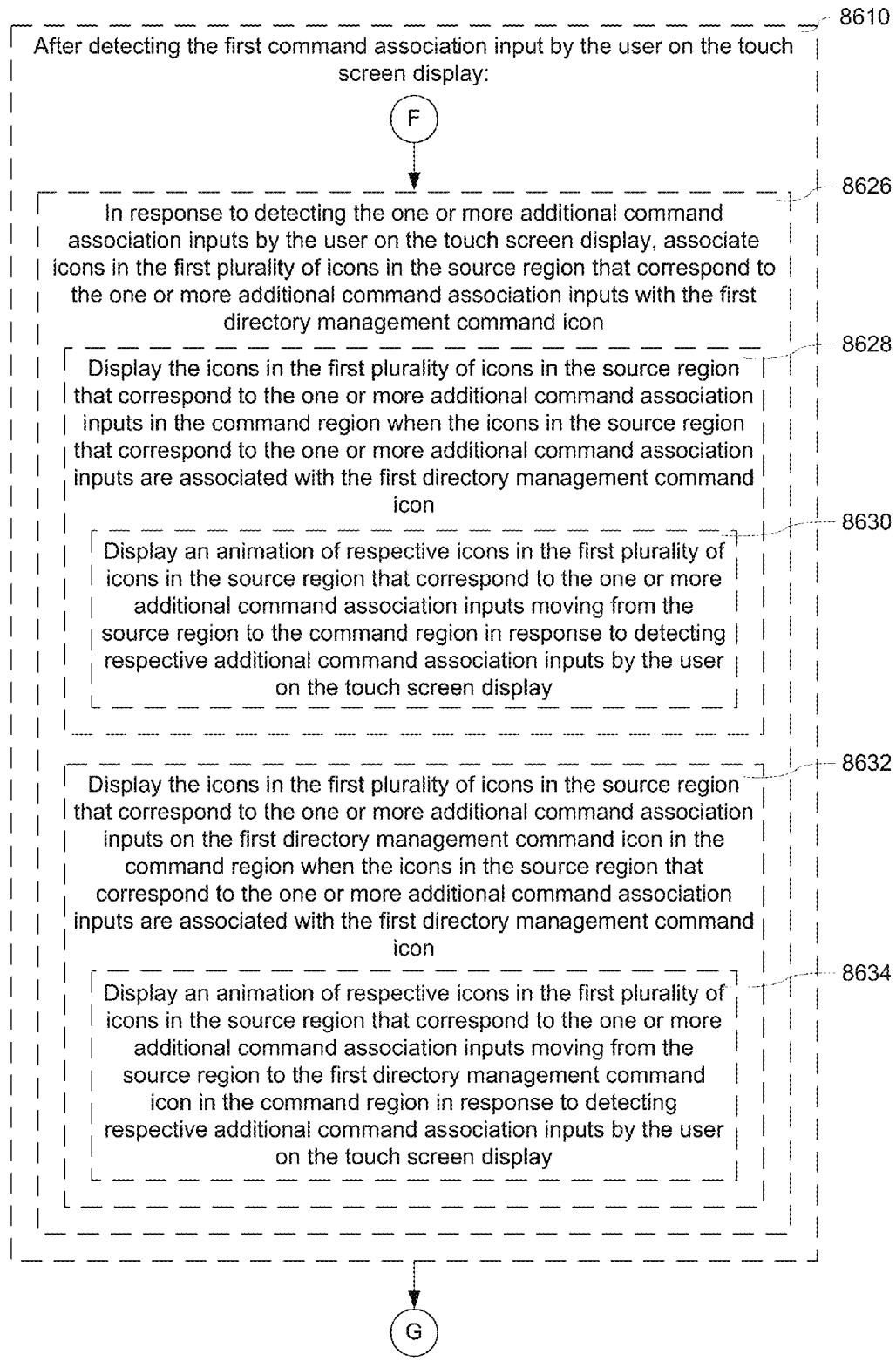
Figure 8I:
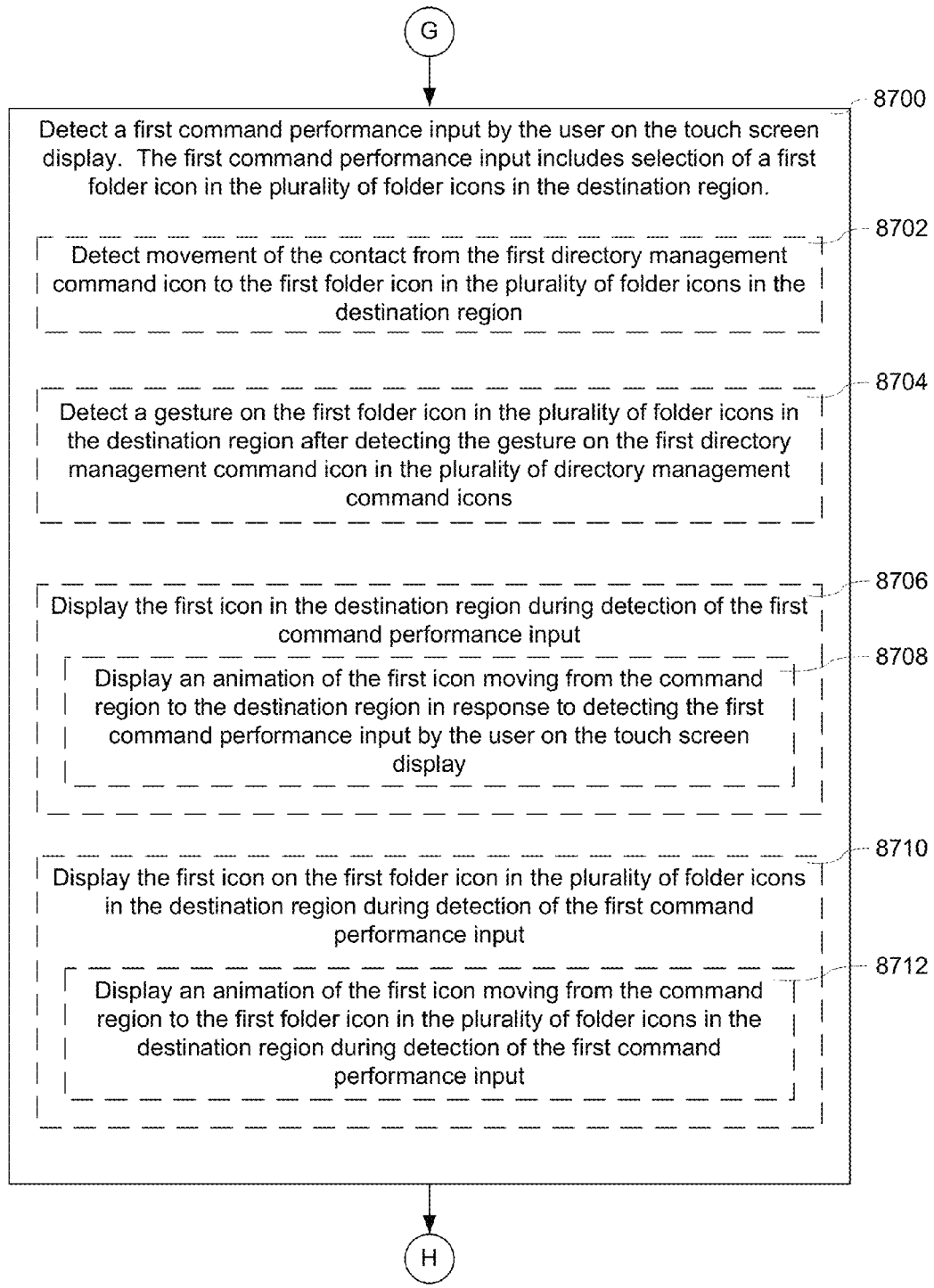
Figure 8J:
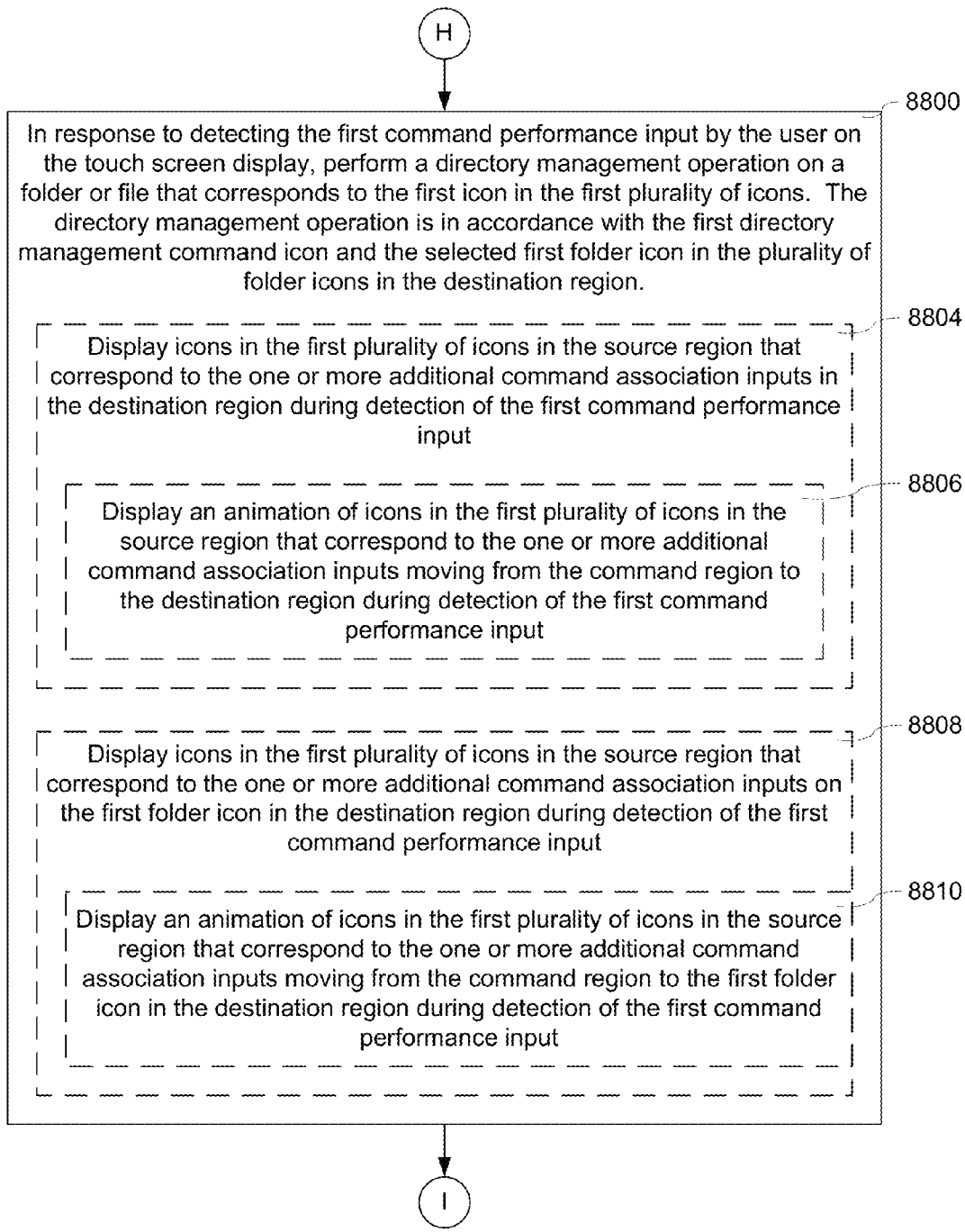
Figure 8K:
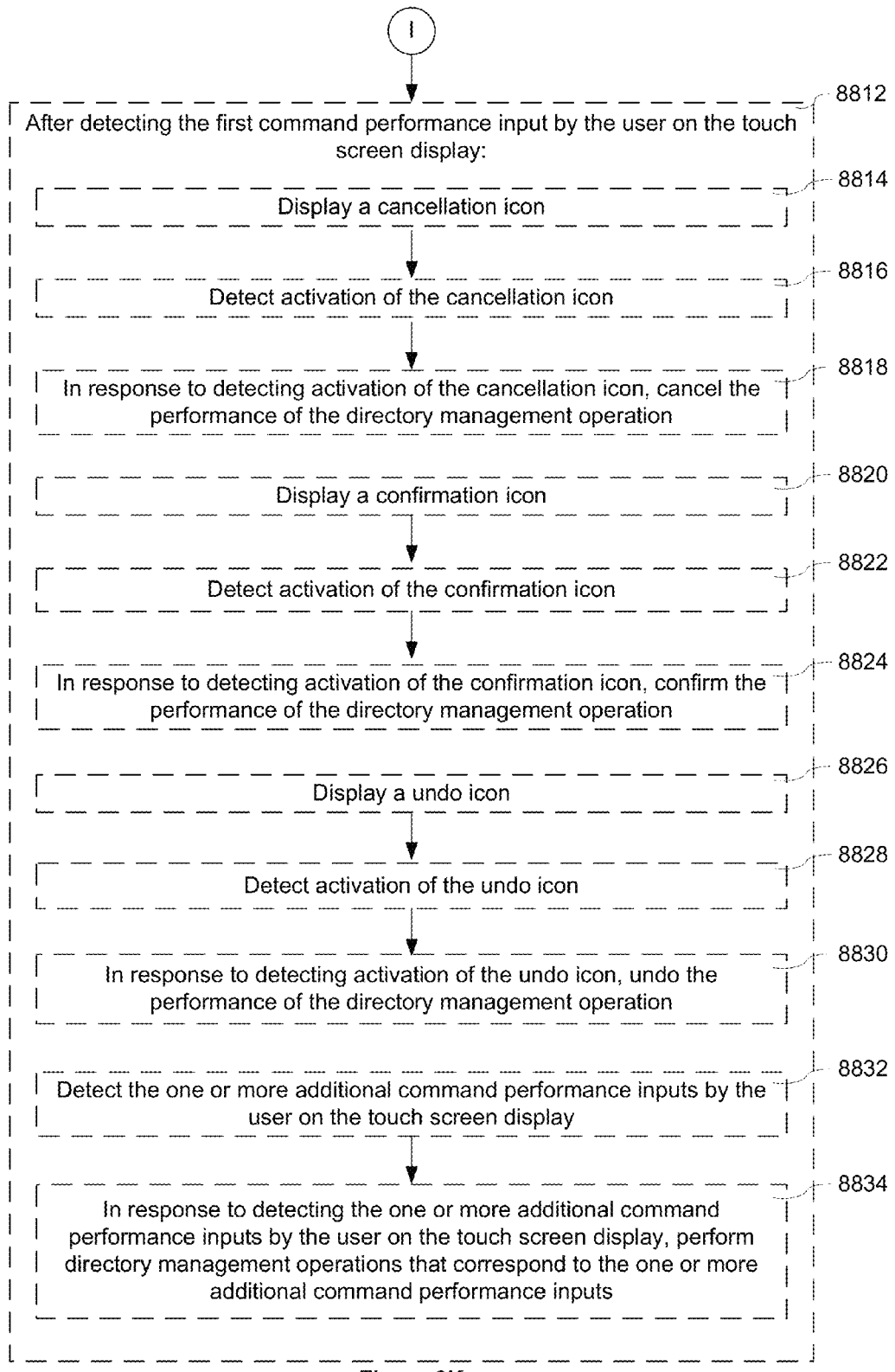
Figure 8L:
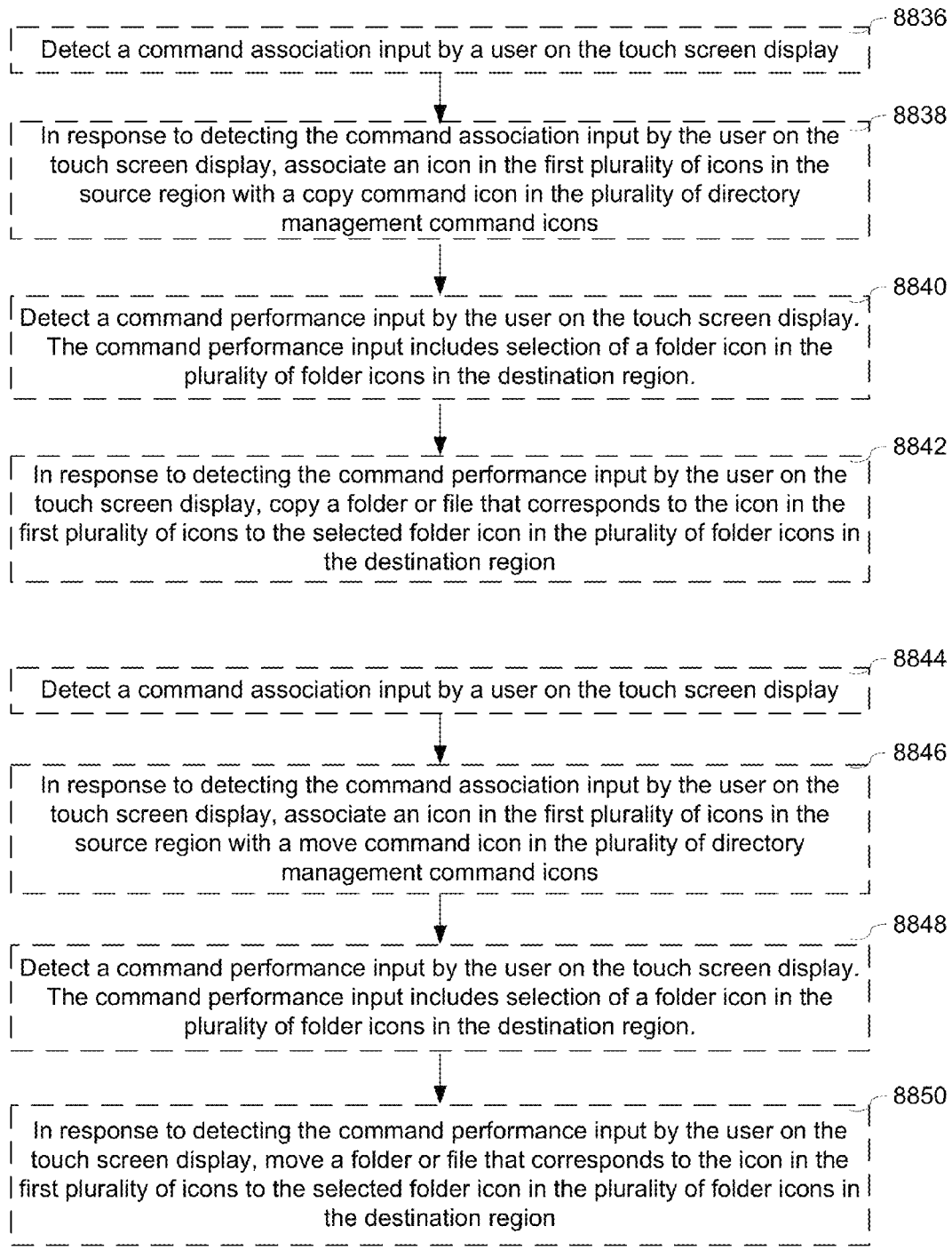
Figure 8M:
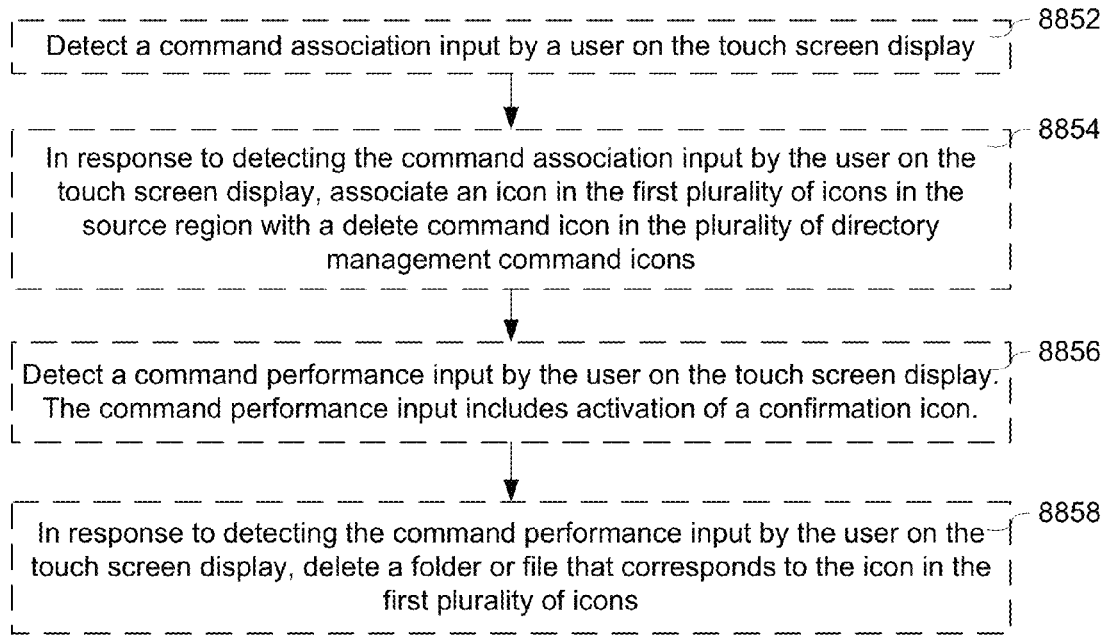
Figure 8N:
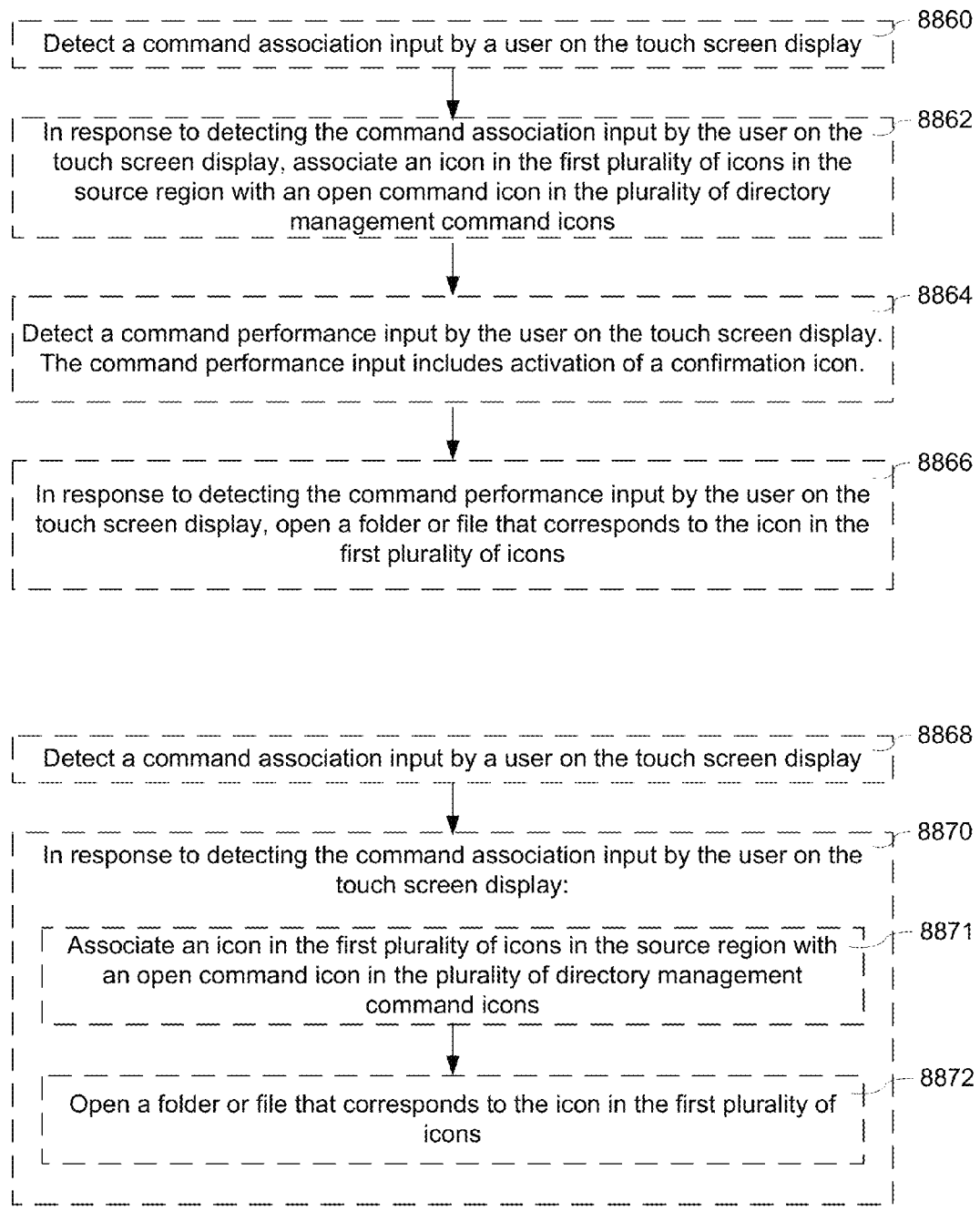
Figure 8O:
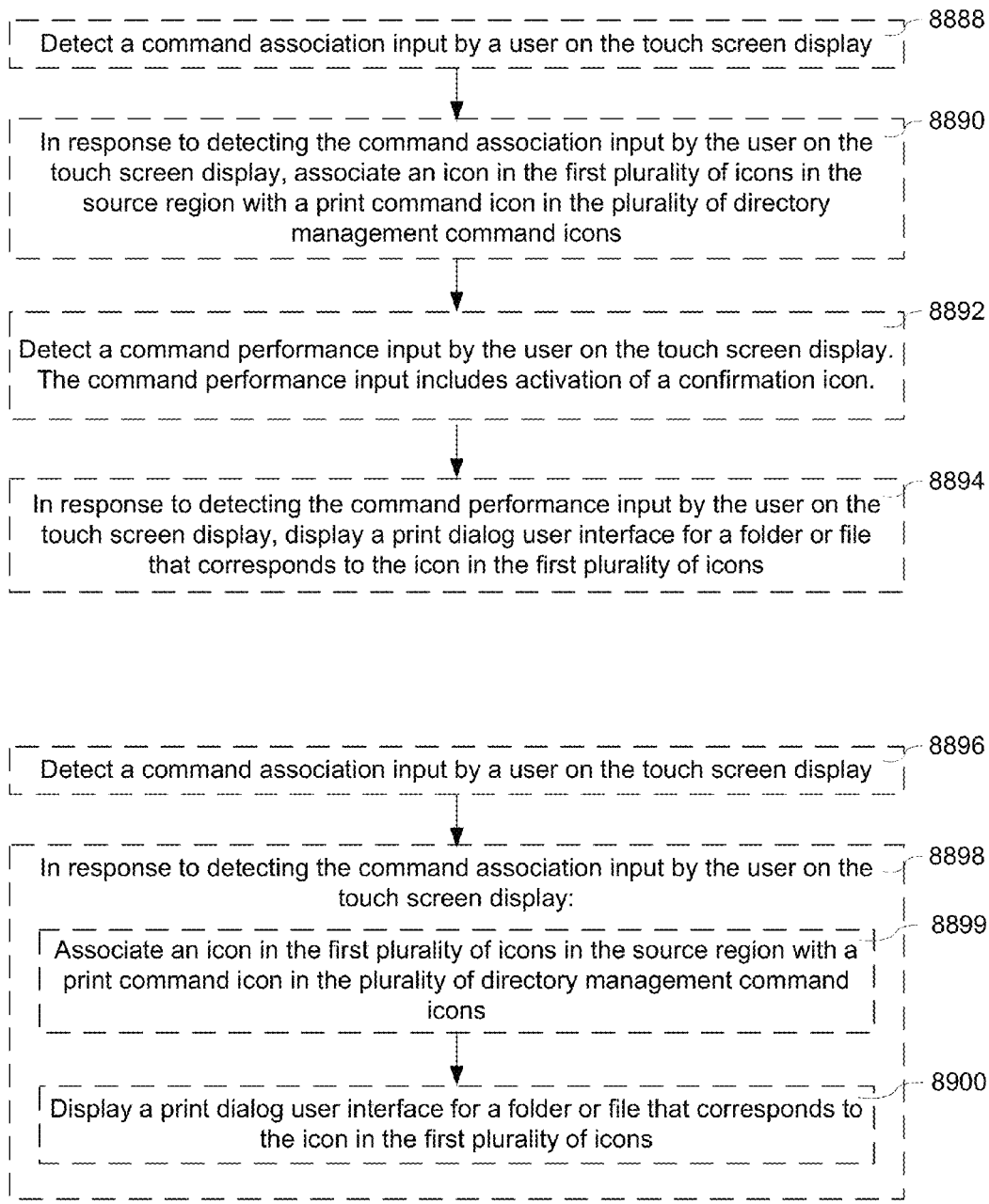
Figure 8P:
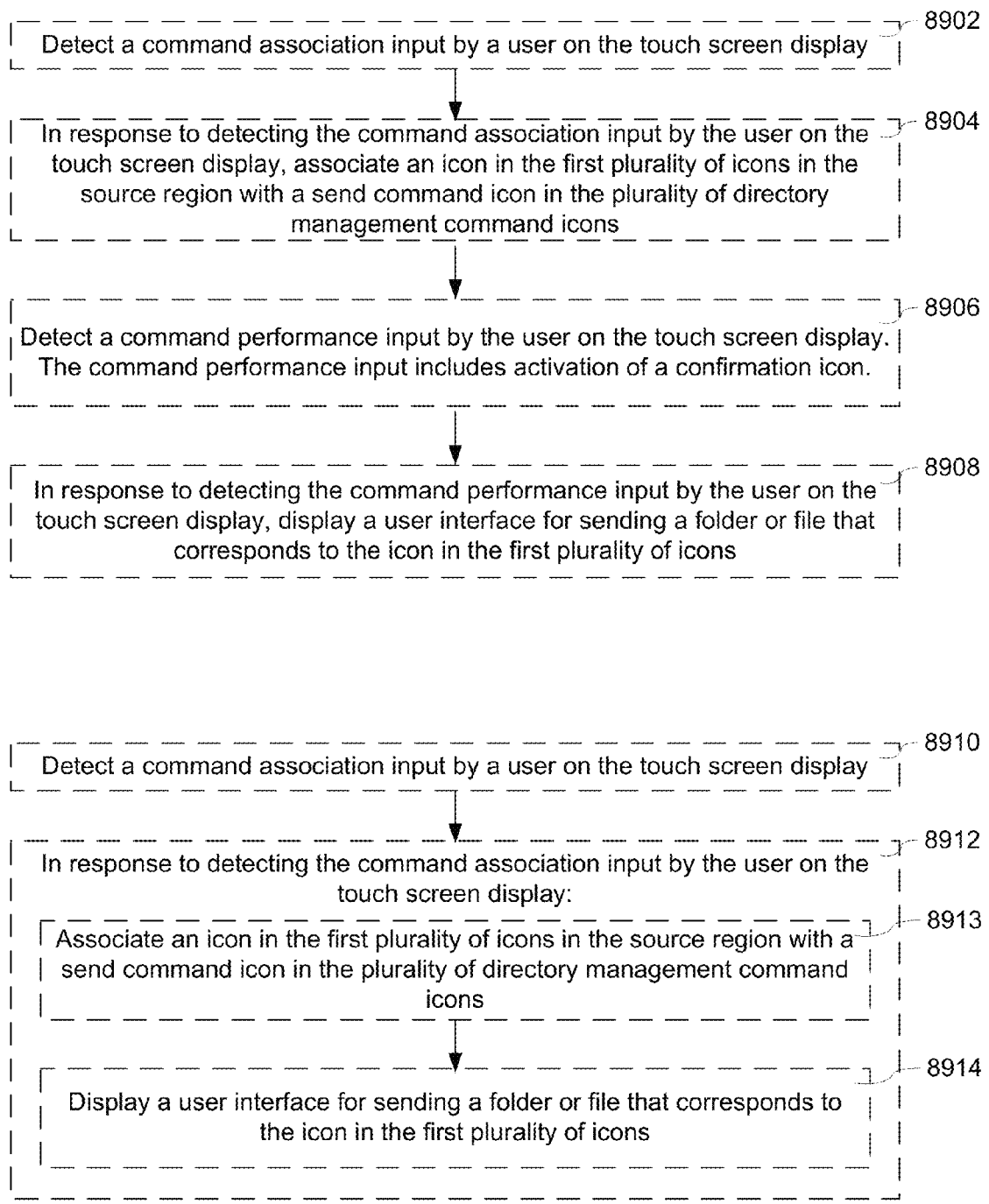
Figure 8Q:
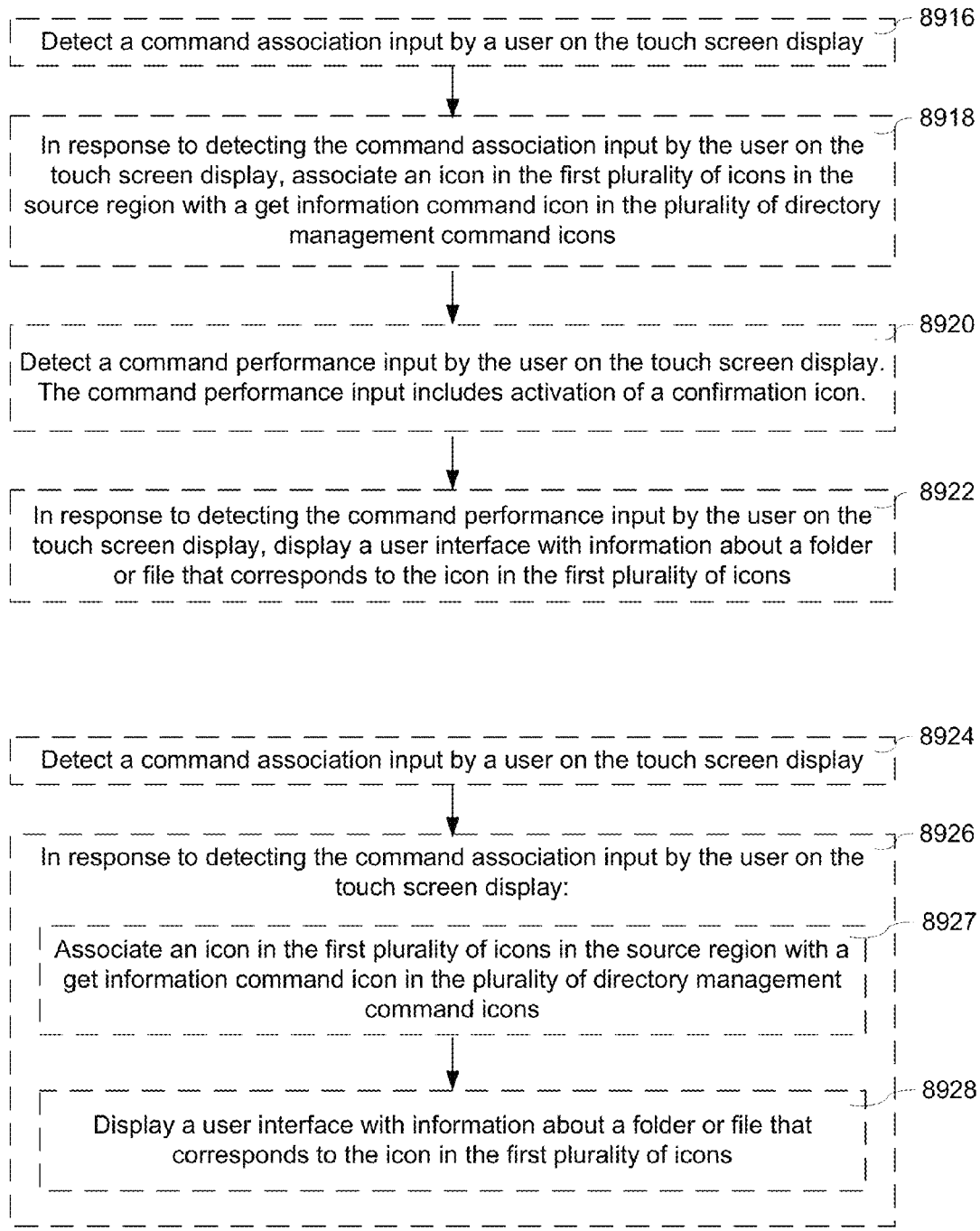
Figure 8R:
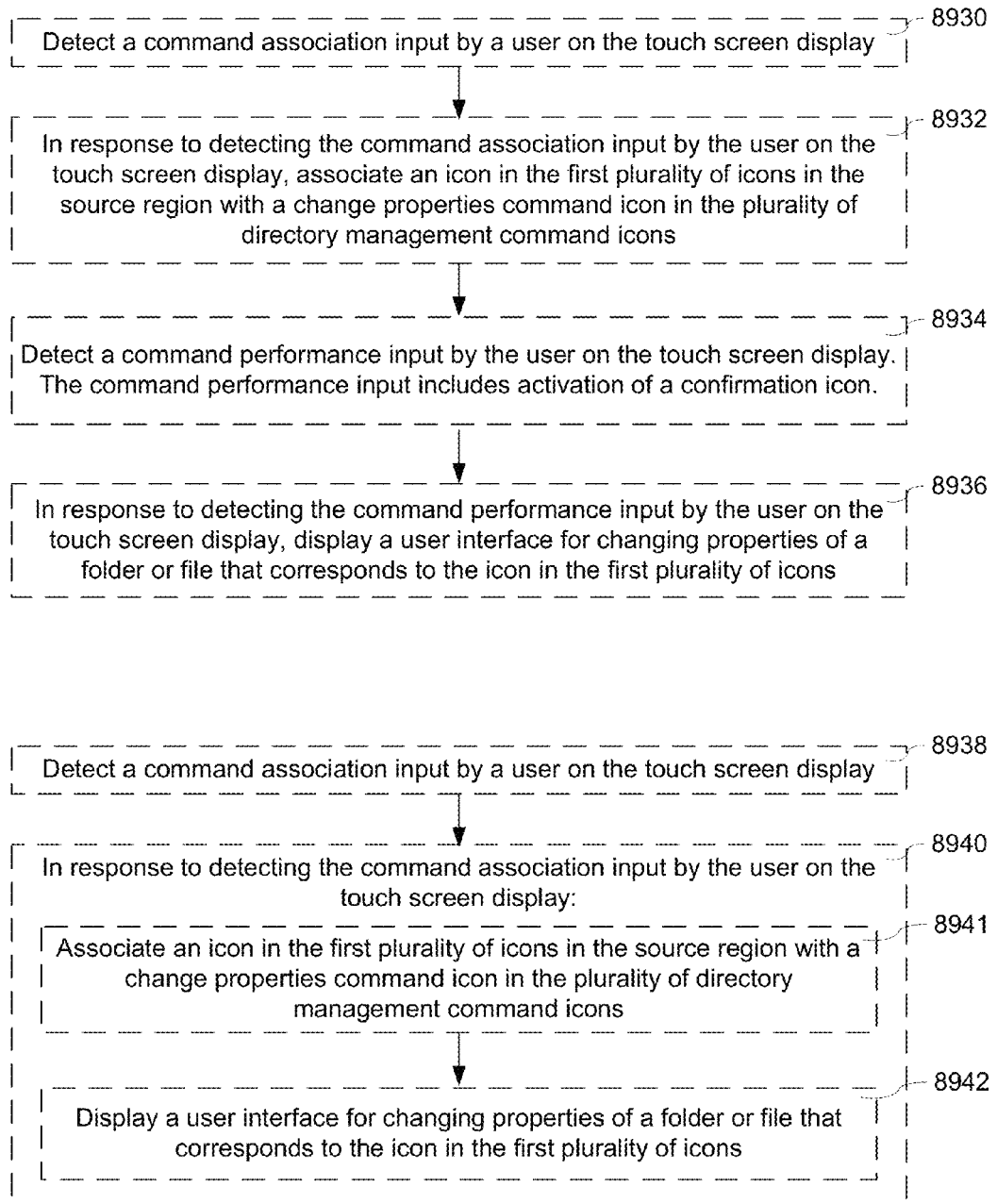
Figure 8S:
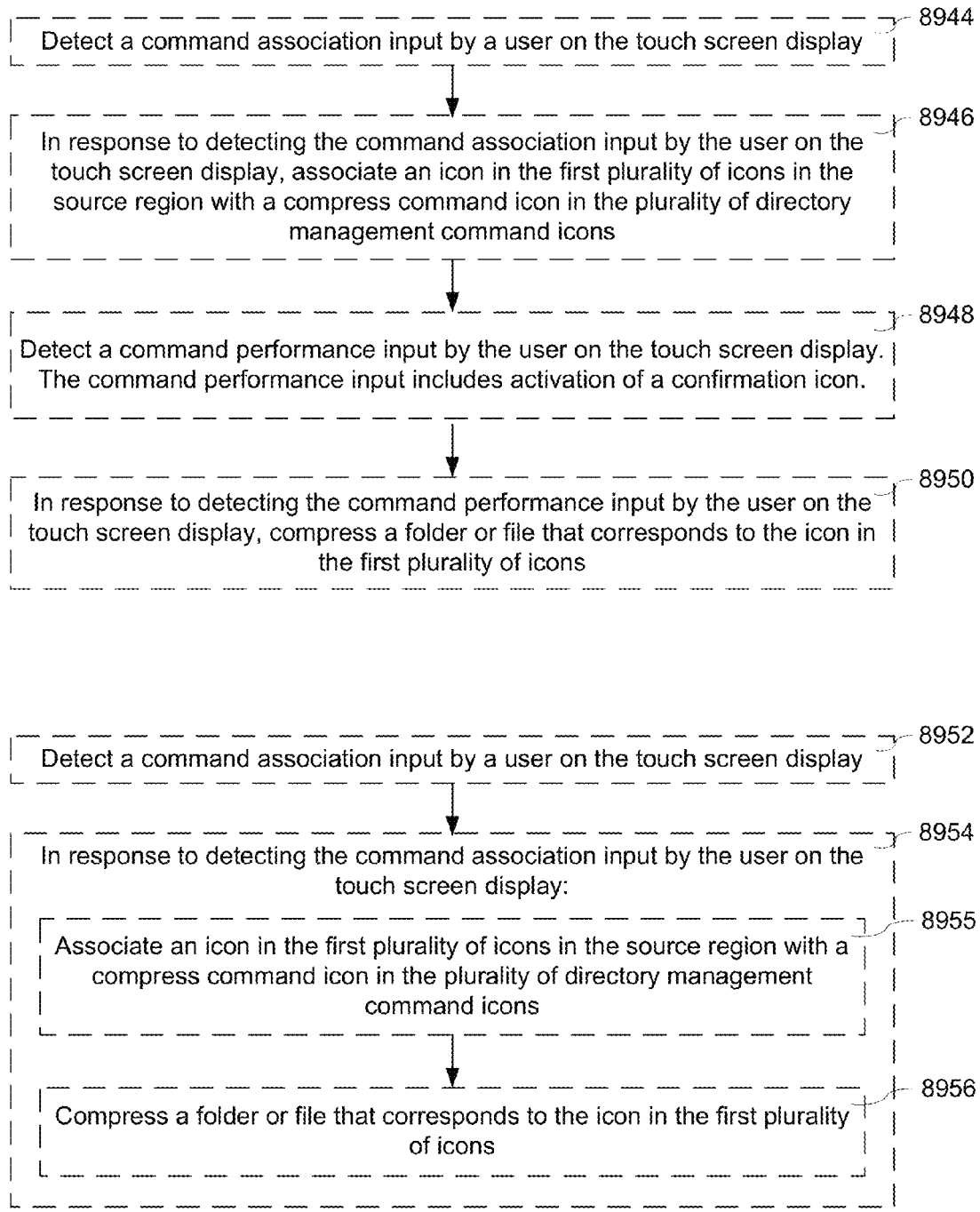
Figure 8T:
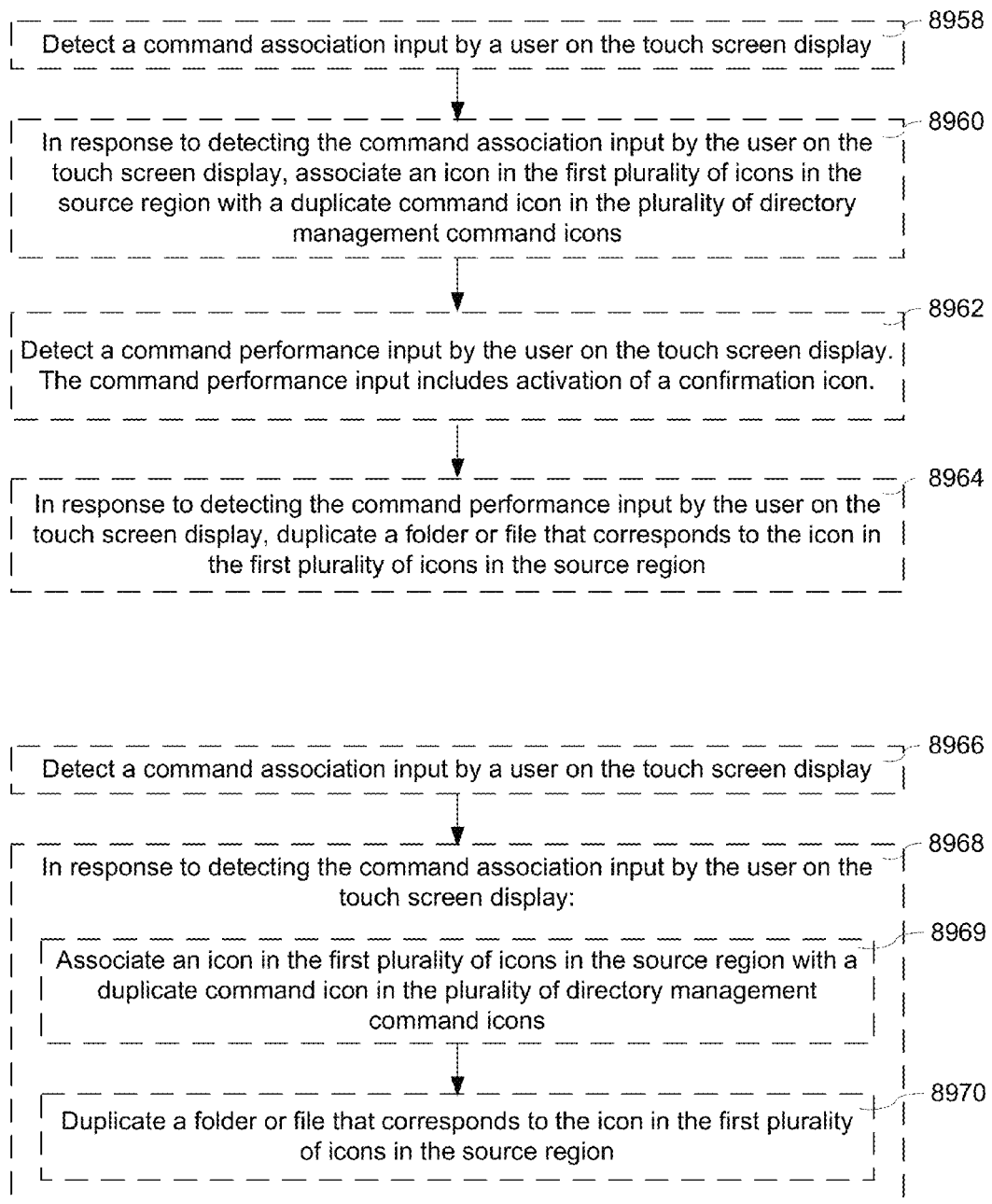
Figure 8U:
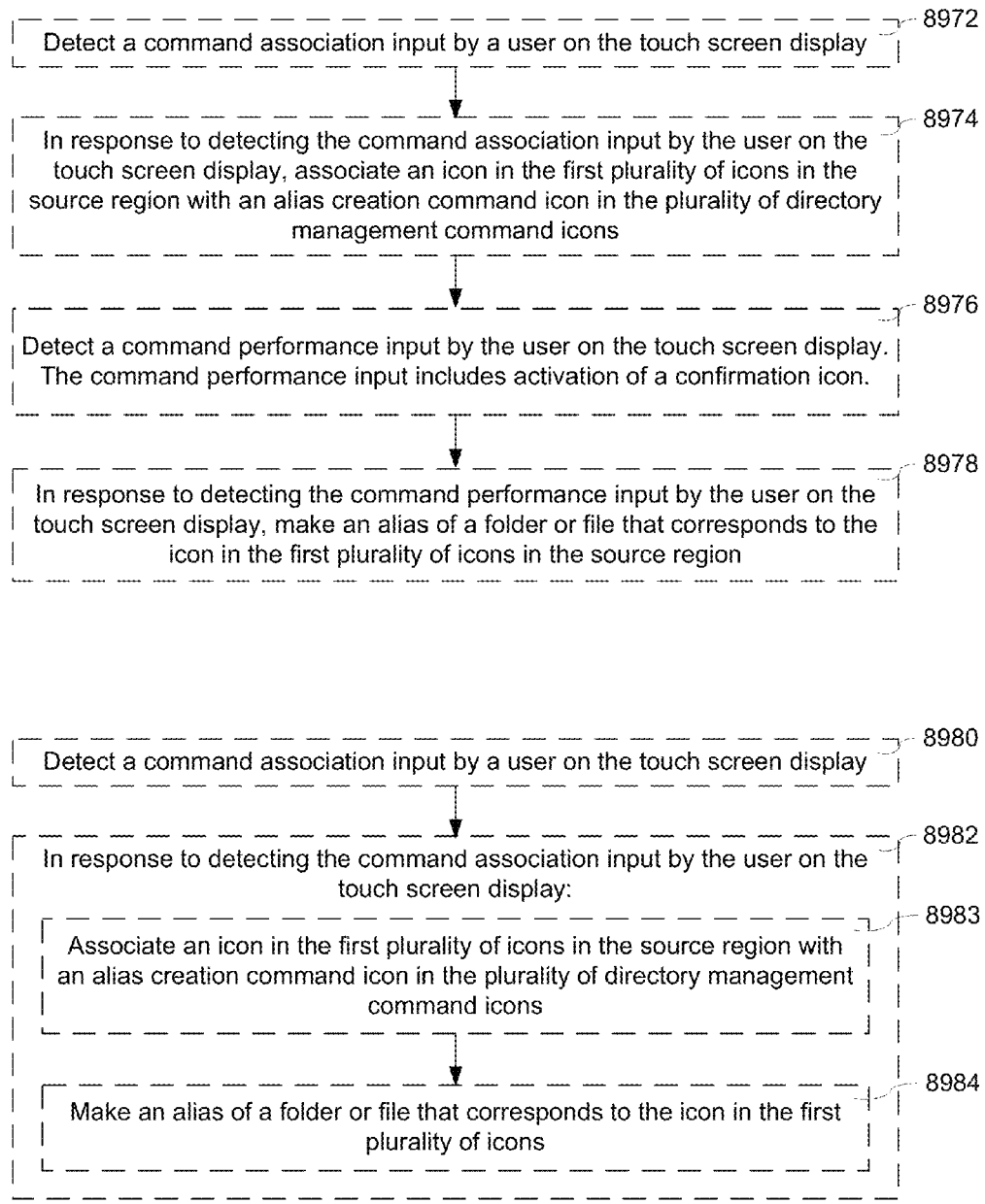
Figure 8V:
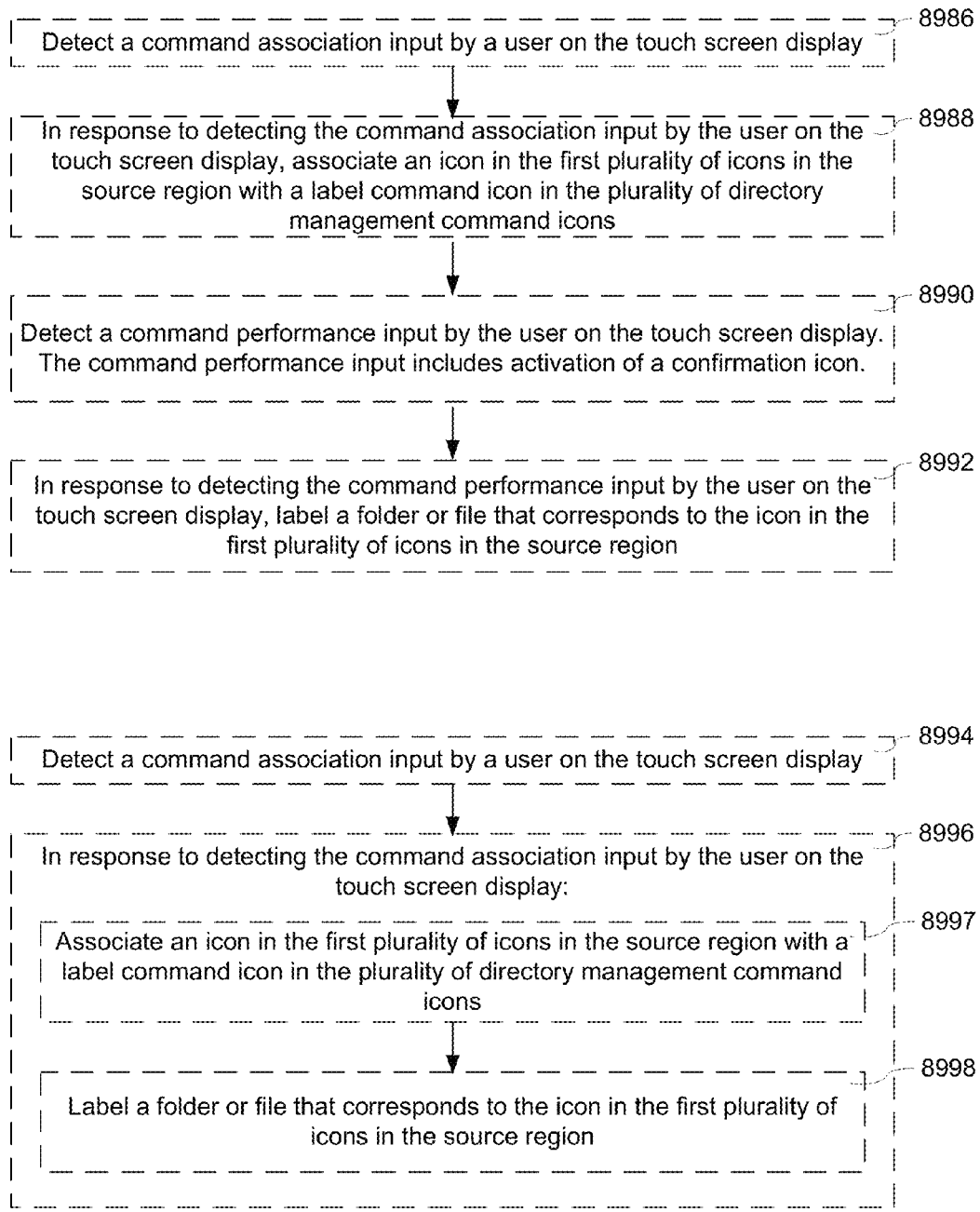

FIGS. 8A-8V are flow diagrams illustrating a method for performing directory management operations in accordance with some embodiments. The method 8000 is performed at a portable electronic device with a touch screen display, such as a portable multifunction device (e.g., 100, FIG. 1). Some operations in method 8000 may be combined and/or the order of some operations may be changed.

As described below, the method 8000 provides an intuitive way to manage files in one or more file systems using a portable multifunction device with a touch screen display. The method reduces the cognitive burden on a user when managing files and folders in a hierarchical directory, thereby creating a more efficient human-machine interface. For battery-operated computing devices, enabling a user to manage files in one or more hierarchical directories faster and more efficiently conserves power and increases the time between battery charges.

FIG. 8A provides an overview of the method 8000. The device concurrently displays (8100) on the touch screen display a plurality of predefined regions. The predefined regions include: a source region (8200), a command region (8300), and a destination region (8400). The device detects (8500) a first command association input by a user on the touch screen display, In response, the device associates (8600) a first icon from the source region with a first directory management command icon in the command region. The device detects (8700) a first command performance input, which includes selecting a first folder icon in the destination region. In response, the device performs (8800) a directory management operation on a folder or file that corresponds to the first icon. The directory management operation is in accordance with the first directory management command icon and the selected first folder. FIGS. 8B-8V describe the method 8000 in greater detail.

The device concurrently displays (8100) on the touch screen display a plurality of predefined regions. The displayed predefined regions include three predefined regions: a first predefined region (e.g., source region 7002 in user interface 7000A, FIG. 7A), a second predefined region (e.g., command region 7004 in user interface 7000A, FIG. 7A), and a third predefined region (e.g., destination region 7006 in user interface 7000A, FIG. 7A). The predefined regions are indicated in FIG. 7A by dotted lines; however, these dotted lines are not typically displayed as a part of the user interface. For example, in FIGS. 7B-7W, the user interface has corresponding predefined regions; however, for simplicity the dotted lines indicating the predefined regions have been omitted from these figures.

The first predefined region is (8200) a source region 7002 that includes a first plurality of icons. It should be understood that a respective icon in the first plurality of icons (e.g., 7008, 7010, 7012 or 7014 in FIG. 7A) represents a folder (e.g., 602 in FIG. 6A) or a file (e.g., 604 in FIG. 6A) in a hierarchical level in a first hierarchical directory (e.g., 127-E-1 in FIG. 6A). In some embodiments, a folder represents another hierarchical level within the hierarchical directory.

In some embodiments the device navigates (8202) in the first hierarchical directory in response to detecting one or more finger gestures on the touch screen display. In some embodiments, the device navigates (8204) up a level in the first hierarchical directory in response to detecting a finger gesture (e.g., tap gesture 7016 in FIG. 7A) on a level navigation icon for the first hierarchical directory. For example when the device detects a tap gesture 7016 on a level up icon 7018, the user interface shifts so that the folders and/or files that are displayed in the current view (e.g., 7008, 7010, 7012 and 7014 in FIG. 7A) are replaced with the folders and/or files in a higher level of the hierarchy (e.g., 7032, 7034, 7036 and 7038 in user interface 7000B in FIG. 7B).

In some embodiments, a set of item-sequence indicia icons 7020 (FIG. 7A) indicate the number of files and folders in the current level of the hierarchy for the first hierarchical directory. Additionally, in some embodiments, a set of item-sequence indicia icons 7022 indicate the number of files and folders in the current level of the hierarchy of a second hierarchical directory. In some embodiments, the item-sequence indicia icons (e.g., 7020 or 7022) are visually differentiated so as to indicate which items in the hierarchy are currently represented by icons (e.g., 7008, 7010, 7012 and 7014) in the predefined region 7002 associated with the item-sequence indicia icons. For example, the darkened item-sequence indicia icons (e.g., 7020-B and 7022-B) indicate items (e.g., folders and files) that are represented by icons which are currently displayed in the corresponding predefined region (e.g., 7002 and 7004, respectively), while non-darkened item-sequence indicia icons (e.g., 7020-A and 7022-A) indicate items (e.g., folders and files) that are in the current hierarchical level, but are not currently represented by icons that are displayed in the predefined region (e.g., 7002 and 7004, respectively).

In some embodiments, the device navigates (8206) down a level in the first hierarchical directory in response to detecting a finger gesture on a folder in the source region. An example of navigating down a level is shown in FIGS. 7B and 7A. A finger tap gesture 7024 on the projects folder 7026 in user interface 7000B (FIG. 7B) results in the display of some of the contents of the projects folder (e.g., the project 1 folder 7008, project 2 folder 7010, project 3 folder 7012 and file 7014) in region 7002 in user interface 7000A (FIG. 7A).

In some embodiments, the device navigates (8208) within a level in the first hierarchical directory in response to detecting a finger gesture (e.g., a tap gesture 7027 in FIG. 7B) on a navigation scrolling icon 7028 for the first hierarchical directory. In some embodiments, the device navigates (8210) within a level in the first hierarchical directory in response to detecting a finger swipe gesture (e.g., a contact 7029 with the touch screen display and subsequent movement 7030 of the contact 7029 on the touch screen display). In some embodiments, the finger swipe gesture is within the source region (as illustrated in FIG. 7B). In some embodiments, the finger swipe gesture is at least partially outside of the source region.

In some embodiments, a respective level in the first hierarchical directory includes (8212) a number of file and/or folder items (e.g., 602-A, 602-B, 602-C, 604-A, 604-B, 604-C, 602-D, 602-E-1, 602-F-1. 602-G-1, 604-D in a first file system 127-E-1 in FIG. 6A). In some embodiments, at least a subset of these file and/or folder items are represented in the source region as icons (e.g., 7032, 7034, 7036 and 7038 in FIG. 7B) where each icon represents a respective one of the file and/or folder items (e.g., icon 7038 in FIG. 7B represents folder 602-E-1 in FIG. 6A). It should be understood that, as described herein, displaying file or folder in a predefined region includes displaying an icon that is representative of the file or folder in the predefined region.

In some embodiments, while navigating within a level of the first hierarchical directory, the device displays (8214) a bar graphic (e.g., 7040-1 in FIG. 7B) in the source region in response to detecting the finger swipe gesture (e.g., contact 7029 and movement 7030). In some embodiments, a length of the bar graphic 7040-1 provides information about a portion of file and/or folder items in the respective level that are currently displayed in the source region. In some embodiments, the position of the bar graphic 7040-1 in the source region provides information about positions of currently displayed file and/or folder items in the respective level. In some embodiments, the bar graphic includes a bar graphic region (e.g., 7042 in FIG. 7B) which indicates the percentage of file and/or folder items in the respective level that are currently displayed in the source region.

In some embodiments, displaying a bar graphic 7040-1 includes updating the bar graphic as the device navigates within a level of the first hierarchical directory. For example, before responding to the swipe gesture, the device displays a first set of files and/or folders (e.g., 7032, 7034, 7036, 7038 in FIG. 7B) in the source region, as illustrated in FIG. 7B. However, after responding to the swipe gesture as illustrated in FIG. 7C the device displays a different set of files and/or folders (e.g., 7034, 7036, 7038, 7044 in FIG. 7C) in the source region. In this example, the folders and files that are displayed in the source region have shifted to the left so that file 7044 is displayed, and location of the bar graphic is updated (e.g., the bar graphic is shifted to the left in the bar graphic region 7042) to location 7040-2 to indicate the files and folders that are currently displayed in the source region. Similarly, in some embodiments, the bar graphic is updated when the device navigates up or down a level in the hierarchical directory.

In some embodiments, after a predefined condition is met (e.g., ceasing to detect a finger contact in the source region 7002 for a predefined time period) the device ceases (8216) to display the bar graphic. For example, the bar graphic 7040 is not displayed in user interface 7000I in FIG. 7I. In some embodiments, the bar graphic is only displayed while the device is detecting gestures for navigating within the hierarchical level.

A hierarchical level in the first hierarchical directory includes (8218) a number of file and/or folder items. The device displays at least some of these files and/or folder items in the source region. In some embodiments, the device displays (8220) and/or updates a set of item-sequence indicia icons (e.g., 7020 in FIG. 7A). In some embodiments, the item-sequence indicia icons provide information about the number of file and/or folder items in a respective level currently displayed in the source region and positions of currently displayed file and/or folder items in the respective level, as described above with reference to FIG. 7A.

A second predefined region is (8300) a command region 7004 (FIG. 7A) that includes a plurality of directory management command icons. In some embodiments, the directory management command icons include (8302) a copy icon and a move icon, as described in greater detail below. In some embodiments, the directory management command icons include (8304) a delete icon (e.g., 7046 in user interface 7000C in FIG. 7C), an open icon (e.g., 7048 in user interface 7000C in FIG. 7C), a print icon (e.g., 7050 in user interface 7000C in FIG. 7C), a send icon (e.g., for sending one or more file and/or folder items via email), a get information icon, a change properties icon (e.g., for changing a name of a file or folder), a compress icon, a duplicate icon, an alias creation icon, and/or a label icon, as described in greater detail below.

In some embodiments, the device scrolls (8306) the directory management command icons in response to detecting a finger gesture (e.g., tap gesture 7052 in FIG. 7C) on a command scrolling icon (e.g., 7054 in FIG. 7C) for the directory management command icons. In some embodiments, the device scrolls (8308) the directory management command icons (e.g., 7046, 7048, 7050 in FIG. 7C) in response to detecting a finger swipe gesture (e.g., contact 7056 followed by movement 7058 of the contact on the touch screen display in FIG. 7C) on or within the command region. For example, when either the finger swipe gesture (e.g., contact 7056 and movement 7058 in FIG. 7C) or a finger tap gesture (e.g., 7052 in FIG. 7C) on a command scrolling icon (e.g., 7054 in FIG. 7C) is detected, the device scrolls the directory management icons (e.g., 7046, 7048, 7050 in FIG. 7C) to the right, so that (as illustrated in graphical user interface 7000D in FIG. 7D) new directory management icons (e.g., move icon 7060 and a copy icon 7062 in FIG. 7D) are visible, while the right-most directory management icons (e.g., the open icon 7048 and the print icon 7050, previously shown in FIG. 7C) are no longer visible.

In some embodiments, the directory management command icons displayed in the command region depend (8310) on context. For example, in one embodiment, a print directory management icon is displayed when one or more of the files in the source region is a printable document (e.g., an image, a text document, a spreadsheet, a pdf etc.).

A third predefined region is (8400) a destination region 7006 (FIG. 7A) that includes a plurality of folder icons that represent folders (e.g., folders in a hierarchical level) in a second hierarchical directory. In some embodiments, a hierarchical level title icon is also an icon (e.g., a folder icon) for a corresponding folder in a next level up in the respective hierarchical directory. For example, title icon 7064 in user interface 7000D in FIG. 7D is an icon for a corresponding folder (e.g., a Pictures folder 7078 in FIG. 7E) in a next level up in the respective hierarchical directory. In some embodiments, at least a subset of these file and/or folder icons (e.g., 7070, 7072, 7074 and 7076 in FIG. 7D) are representative of files and/or folders in a second hierarchical directory (e.g., 127-F-1 in FIG. 6A) where each icon represents a respective one of the file and/or folder items (e.g., icon 7070 in FIG. 7D represents folder 602-L in FIG. 6A; icon 7074 in FIG. 7D represents picture file 604-G in FIG. 6A; and icon 7064 in FIG. 7D represents folder 602-K in FIG. 6A). It should be understood that, as described herein, displaying file or folder in a predefined region includes displaying an icon that is representative of the file or folder in the predefined region.

In some embodiments, the device navigates (8402) in the second hierarchical directory in response to detecting one or more finger gestures on the touch screen display. In some embodiments, the device navigates (8404) up a level in the second hierarchical directory in response to detecting a finger gesture on a level navigation icon for the second hierarchical directory. For example, when the device detects a tap gesture 7066 (FIG. 7D) on a level up icon 7068 (FIG. 7D), the device shifts the user interface so that the folders and/or files that are displayed in the current view (e.g., 7070, 7072, 7074, 7076 in FIG. 7D) are replaced with the folders and files in a higher level of the hierarchy (e.g., 7078, 7080, 7082 and 7084 in user interface 7000E in FIG. 7E).

In some embodiments, the device navigates (8406) down a level in the second hierarchical directory in response to detecting a finger gesture on a folder in the destination region. An example of navigating down a level is shown in FIGS. 7E and 7D. A tap gesture 7086 (FIG. 7E) on the pictures folder 7078 (FIG. 7E) in user interface 7000E results in the display of at least some of the contents of the pictures folder (e.g., folders or files 7070, 7072, 7074, 7076) in the destination region in user interface 7000D (FIG. 7D).

In some embodiments, the device navigates (8408) within a level in the second hierarchical directory in response to detecting a finger gesture (e.g., tap gesture 7088, FIG. 7E) on a navigation scrolling icon (e.g., 7090 in FIG. 7E) for the second hierarchical directory. In some embodiments, the device navigates (8410) within a level in the second hierarchical directory in response to detecting a finger swipe gesture (e.g., contact 7092 and subsequent movement 7094 of the contact 7092 on the touch screen display, FIG. 7E) on or within the destination region.

In some embodiments, a respective level in the second hierarchical directory includes (8412) a number of file and/or folder items (e.g., 7078, 7080, 7082, 7084 in FIG. 7E). In some embodiments, while navigating within a level in the second hierarchical directory, the device displays (8414) a bar graphic (e.g., 7096-1 in FIG. 7E) in the destination region in response to detecting the finger swipe gesture (e.g., contact 7092 and movement 7094). In some embodiments, a length of the bar graphic 7096-1 provides information about a portion of file and/or folder items in the respective level currently displayed in the destination region. In some embodiments, the position of the bar graphic 7096-1 in the destination region provides information about positions of currently displayed file and/or folder items in the respective level. In some embodiments, the bar graphic includes a bar graphic region (e.g., 7098 in FIG. 7E) which indicates the percentage of file and/or folder items in the respective level that are currently displayed in the source region.

In some embodiments, displaying a bar graphic includes updating the bar graphic 7096-1 as the device navigates within a level of the second hierarchy. For example, before responding to the swipe gesture, the device displays a first set of files and/or folders (e.g., 7078, 7080, 7082, 7084) in the destination region, as illustrated in FIG. 7E. However, after responding to the swipe gesture as illustrated in FIG. 7F the device displays a different set of items (e.g., 7078, 7080, 7082, 7100 in FIG. 7F) in the destination region. In this example, the folders and files that are displayed in the destination region have shifted to the right so that folder 7100 is displayed, and location of the bar graphic is updated (e.g., the bar graphic is shifted in the bar graphic region 7098) to location 7096-2 to indicate the files and folders that are currently displayed in the destination region. Similarly, in some embodiments, the bar graphic is updated when the device navigates up or down a level in the hierarchical directory.

In some embodiments, after a predefined condition is met (e.g., ceasing to detect a finger contact in the destination region 7006 for a predefined time period) the device ceases (8416) to display the bar graphic. In some embodiments, the bar graphic is only displayed while the device is detecting gestures for navigating within the hierarchical level. For example, the bar graphic is not displayed in user interface 7000I in FIG. 7I.

A hierarchical level in the second hierarchical directory includes (8418) a number of file and/or folder items. In some embodiments, the device displays (8420) a set of item-sequence indicia icons (e.g., 7022 in FIG. 7A). In some embodiments, the item-sequence indicia icons provide information about the number of file and/or folder items in a respective level currently displayed in the destination region and positions of currently displayed file and/or folder items in the respective level. In some embodiments, displaying a set of item-sequence indicia icons includes updating the set of item-sequence indicia icons, as described above with reference to FIG. 7A.

As discussed in greater detail above with reference to FIGS. 5 and 6A-6C, in some embodiments, either or both the hierarchical directories that are represented in the user interface as a source region and a destination region are located on the portable multifunction device 100 that includes the user interface. Similarly, in some embodiments, either or both of the hierarchical directories that are represented in the user interface as a source region and a destination region are located on a computer system that is remote from the portable multifunction device 100 that includes the user interface.

In some embodiments, the first hierarchical directory is located (8424) (e.g., stored in memory) on the portable multifunction device and the second hierarchical directory is the same as the first hierarchical directory. In these embodiments, the method is used to perform directory management operations on a single hierarchical directory in the portable multifunction device. For example, the first hierarchical directory (e.g., 127-E in FIG. 6A) and the second hierarchical directory (e.g., 127-F in FIG. 6A) are a part of the same file system (e.g., 127-A in FIG. 5).

In some embodiments, the first hierarchical directory is located (8426) (e.g., stored in memory) on the portable multifunction device and the second hierarchical directory is located (e.g., stored in memory) on a separate device. In some embodiments, the separate device is a remote server in electronic communication with the portable multifunction device, or another portable electronic device in electronic communication with the portable multifunction device via a wireless connection (e.g., Bluetooth, WiFi, or infrared). In these embodiments, the method is used perform directory management operations between a hierarchical directory in the portable multifunction device and a hierarchical directory on a separate device. For example, the first hierarchical directory (e.g., 127-E in FIG. 6A) is part of a file system (e.g., 127-A in FIG. 5) on the portable multifunction device 100, while the second hierarchical directory (e.g., 127-F in FIG. 6A) is located on a separate file system (e.g., 127-B, 127-C or 127-D in FIG. 5) on a separate device (e.g., client device 502, server system 506-A or server system 506-N in FIG. 5).

In some embodiments, the first hierarchical directory is located (8428) (e.g., stored in memory) on a device separate from the portable multifunction device and the second hierarchical directory is the same as the first hierarchical directory. In these embodiments, the method is used perform directory management operations on a hierarchical directory in a separate device via the portable multifunction device. In some embodiments, the portable multifunction device is used to manage files on a remote computer, such as a remote server. For example, the first hierarchical directory (e.g., 127-E in FIG. 6A) and the second hierarchical directory (e.g., 127-F in FIG. 6A) are a part of the same file system (e.g., either 127-B, 127-C or 127-D in FIG. 5) on a separate device (e.g., either client device 502, server system 506-A or server system 506-N in FIG. 5).

In some embodiments, the first hierarchical directory is located (8430) (e.g., stored in memory) on a first device that is separate from the portable multifunction device and the second hierarchical directory is located (e.g., stored in memory) on a second device, different from the first device, that is separate from the portable multifunction device. In these embodiments, the method is used perform directory management operations between two respective hierarchical directories in two respective devices via the portable multifunction device. In some embodiments, the portable multifunction device is used to manage files between two remote computers, such as two remote servers, a remote client and a remote server, or two remote clients. For example, the first hierarchical directory (e.g., 127-E in FIG. 6A) is part of a file system (e.g., 127-B in FIG. 5) on a first device (e.g., client device 502 in FIG. 5), while the second hierarchical directory (e.g., 127-F in FIG. 6A) is located on a separate file system (e.g., 127-C in FIG. 5) on a separate device (e.g., server system 506-A in FIG. 5) that is distinct from the first device.

The device detects (8500) a first command association input by a user on the touch screen display. In some embodiments, the device detects the first command association input by the user on the touch screen display by detecting (8502) a contact (e.g., contact 7102 in FIG. 7G) on the first icon (e.g., the projects folder icon 7038 in user interface 7000G in FIG. 7G) in the first plurality of icons in the source region and detecting movement (e.g., 7104 in FIG. 7G) of the contact to the first directory management command icon (e.g., the move icon 7060 in FIG. 7G) in the plurality of directory management command icons. In some embodiments, the contact is a finger contact. In some embodiments, the contact is a stylus contact.

In some embodiments, the device detects the first command association input by the user on the touch screen display by detecting (8504) a gesture (e.g., a tap gesture 7106 in user interface 7000H in FIG. 7H) on the first icon (e.g., 7038 in FIG. 7H) in the first plurality of icons in the source region followed by detecting a gesture (e.g., a tap gesture 7108 in FIG. 7H) on the first directory management command icon (e.g., move icon 7060 in FIG. 7H) in the plurality of directory management command icons. In some embodiments, these gestures (e.g., tap gestures) are detected without detecting an intervening gesture (e.g., two subsequent taps on the touch screen display).

In response to detecting the first command association input by the user on the touch screen display, the device associates (8600) a first icon in the first plurality of icons in the source region with a first directory management command icon in the plurality of directory management command icons. In some embodiments, the device displays (8602) the first icon (or a visually distinguished representation thereof, such as an enlarged representation) in the command region when the first icon is associated with the first directory management command icon. For example, the projects folder icon (e.g., 7110 in FIG. 7I) in the command region of the graphical user interface 7000I in FIG. 7I is a representation of the projects folder icon 7038 in the source region in FIG. 7I. In some embodiments, this display indicates that the first icon has been associated with the first directory management command (e.g., move icon 7060 in FIG. 7I) by the device. In some embodiments, the device displays (8604) an animation of the first icon (or a visually distinguished representation thereof, such as an enlarged representation) moving from the source region to the command region in response to detecting the first command association input by the user on the touch screen display.

In some embodiments, the device displays (8606) the first icon (or a visually distinguished representation thereof, such as an enlarged representation) on the first directory management command icon in the command region when the first icon is associated with the first directory management command icon. For example, the projects folder icon 7110 is on the move command icon 7060 in the command region of the graphical user interface 7000I in FIG. 7I is a representation of the projects folder icon 7038 in the source region in FIG. 7I. In some embodiments, this display indicates that the first icon is associated with the first directory management command. In some embodiments, the device displays (8608) an animation of the first icon (or a visually distinguished representation thereof, such as an enlarged representation) moving from the source region to the first directory management command icon in the command region in response to detecting the first command association input by the user on the touch screen display.

In some embodiments, in response to detecting the first command association input by the user on the touch screen display, the device ceases (8611) to display directory management commands in the command region (e.g., as shown in user interface 7000J in FIG. 7J) other than the first directory management command icon (e.g., 7060 in FIG. 7J) (or a visually distinguished representation of the first directory management command icon, such as an enlarged representation). In some embodiments, a confirmation icon and/or cancellation icon may also be displayed with the first directory management command icon, as described in greater detail below.

In some embodiments, in response to detecting the first command association input, the device displays an indicator of the command that was selected by the user (e.g., a text prompt such as "Move Projects Folder?" 7111 in graphical user interface 7000J in FIG. 7J). In some embodiments, after (or in response to) detecting (8610) the first command association input by the user on the touch screen display, the device displays (8612) a cancellation icon (e.g., icon 7112 in FIG. 7J). In some embodiments, the device detects activation (8614) of the cancellation icon (e.g., by a gesture on the cancellation icon such as tap gesture 7114 in FIG. 7J). In response, the device cancels (8616) the association of the first icon in the first plurality of icons in the source region with the first directory management command icon in the plurality of directory management command icons. In some embodiments, after detecting activation of the cancellation icon (e.g., icon 7112 in user interface 7000J in FIG. 7J), the user interface returns to a user interface that was displayed prior to receiving the first command association input (e.g., user interface 7000F in FIG. 7F). Similarly, the cancellation icon may be used to cancel the association of multiple icons in the first plurality of icons if multiple icons have been associated with the first directory management command icon. In some embodiments, the cancellation icon (e.g., icon 7112 in FIG. 7J) is displayed in response to detecting the first command association input.

In some embodiments, after (or in response to) detecting the first command association input by the user on the touch screen display, the device displays (8618) a confirmation icon (e.g., 7116 in user interface 7000J in FIG. 7J). In some embodiments, the device detects activation (8620) of the confirmation icon (e.g., by a tap gesture on the confirmation icon such as contact 7118 in FIG. 7J). The device confirms (8622) association of the first icon in the first plurality of icons in the source region with the first directory management command icon in the plurality of directory management command icons in response to detecting activation of the confirmation icon. Similarly, the confirmation icon may be used to confirm the association of multiple icons in the first plurality of icons if multiple icons have been associated with the first directory management command icon. In some embodiments, the confirmation icon (e.g., icon 7116 in FIG. 7J) is displayed in response to detecting the first command association input.

In some embodiments, after detecting the first command association input and prior to detecting the first command performance input, the device detects (8624) one or more additional command association inputs by the user on the touch screen display. For example, a gesture that includes a contact (e.g., 7120 in FIG. 7K) on the personal folder icon (e.g., 7036 in FIG. 7K) in the source region and movement (e.g., 7122 in FIG. 7K) of the contact to a command icon (e.g., move icon 7060 in FIG. 7K) is performed after the projects folder has been associated with the command icon. It should be understood that, in this example, the projects folder icon 7110 (which is representative of the projects folder icon 7038 in the source region) was associated with the move icon 7060 in FIG. 7K by a previous command association input from a user, as described in greater detail above. In some embodiments, in response to detecting the one or more additional command association inputs by the user on the touch screen display, the device associates (8626) icons in the first plurality of icons in the source region that correspond to the one or more additional command association inputs with the first directory management command icon (e.g., the device selects multiple folders and/or files to be moved).

In some embodiments, when the device detects one or more additional command association inputs, the device displays (8628) the icons in the first plurality of icons in the source region that correspond to the one or more additional command association inputs (or visually distinguished representations thereof, such as an enlarged representations) in the command region when the icons in the source region that correspond to the one or more additional command association inputs are associated with the first directory management command icon (e.g., move icon 7060 in FIG. 7L). In some embodiments, this display indicates that the icons that correspond to the one or more additional command association inputs are associated with the first directory management command. In some embodiments, the device displays (8630) an animation of respective icons in the first plurality of icons in the source region that correspond to the one or more additional command association inputs (or visually distinguished representations thereof, such as enlarged representations) moving from the source region to the command region in response to detecting respective additional command association inputs by the user on the touch screen display. For example, in FIG. 7L, the projects icon 7110 (which is a representation of the projects 7038 icon in the source region) is displayed in the command region, and the personal icon 7124 (which is a representation of the personal icon 7036 in the source region) is also displayed in the command region because both are associated with the move icon 7060 in user interface 7000L.

In some embodiments, when the device detects one or more additional command association inputs, the device displays (8632) the icons in the first plurality of icons in the source region that correspond to the one or more additional command association inputs (or visually distinguished representations thereof, such as an enlarged representations) on the first directory management command icon in the command region when the icons in the source region that correspond to the one or more additional command association inputs are associated with the first directory management command icon (e.g., move icon 7060 in FIG. 7L). In some embodiments, this display indicates that the icons that correspond to the one or more additional command association inputs are associated with the first directory management command (e.g., the projects folder icon 7110 and the personal folder icon 7124 are shown "on top of" the move directory management command icon 7060 in FIG. 7L). In some embodiments, the device displays (8634) an animation of respective icons in the first plurality of icons in the source region that correspond to the one or more additional command association inputs (or visually distinguished representations thereof, such as an enlarged representations) moving from the source region to the first directory management command icon in the command region in response to detecting respective additional command association inputs by the user on the touch screen display.

The device detects (8700) a first command performance input by the user on the touch screen display. The first command performance input includes selection of a first folder icon (e.g., the documents icon 7100 in user interface 7000M in FIG. 7M) in the plurality of folder icons in the destination region (e.g., documents icon 7100 and pictures icon 7078 in FIG. 7M). In some embodiments, the device detects the first command performance input by the user on the touch screen display by detecting (8702) movement of the contact from the first directory management command icon to the first folder icon in the plurality of folder icons in the destination region.

For example, in user interface 7000M in FIG. 7M, the device detects a gesture that includes a contact 7126 with the move icon 7060, and movement 7128 of the contact to the documents icon 7100 in the destination region. In some embodiments, the gesture that includes the contact 7126 with the move icon and movement 7128 of the contact is part of a larger gesture (e.g., a gesture that includes contact 7102 on a folder or file in the source region and movement 7104 of the contact to the command region, as illustrated in FIG. 7G). For example, the device may move a folder or file from the source region 7002 to a folder in the destination region 7006 when the device detects a contact on folder or file in the source region (e.g., contact 7102 in FIG. 7G), movement (e.g., 7104 in FIG. 7G) of the contact to a directory management command icon in the command region (e.g., move icon 7060 in FIG. 7G or FIG. 7M) and then subsequent movement (e.g., 7128 in FIG. 7M) of the contact from the directory management command icon (e.g., 7060 in FIG. 7M) to a folder icon (e.g., documents folder icon 7100 in FIG. 7M) in the destination region. In other words, in some embodiments, the user performs a single gesture that passes through each of the three regions (e.g., the source region 7002, the command region 7004 and the destination region 7006, as illustrated in FIG. 7A) and, in response, the device performs a directory management operation (e.g., move or copy). In some embodiments, the gesture includes a pause in the command region or a pause on the directory management command icon (e.g., move icon 7060 in FIG. 7M). In some embodiments, the gesture is a single smooth gesture that passes through all three regions (e.g., the source region 7002, the command region 7004, and the destination region 7006, as illustrated in FIG. 7A), without including a pause.

In some embodiments, the device detects the first command performance input by the user on the touch screen display by detecting (8704) a gesture (e.g., a tap gesture) on the first folder icon in the plurality of folder icons in the destination region after detecting the gesture (e.g., a tap gesture) on the first directory management command icon in the plurality of directory management command icons. For example, in user interface 7000N in FIG. 7N, the device detects a tap gesture 7130 on the move icon 7060 and a tap gesture 7132 on documents folder 7100 in the destination region. In some embodiments, the gesture on the first folder is detected without detecting an intervening gesture. For these embodiments, the gesture 7130 on the move icon 7060 in FIG. 7N is the same as the gesture 7108 on the move icon 7060 in FIG. 7H. For example, the device moves a folder or file from the source region to a folder in the destination region in response to detecting a first gesture on a folder or file in the source region (e.g., tap gesture 7106 in FIG. 7H), a second gesture (e.g., gesture 7108 in FIG. 7H/gesture 7130 in FIG. 7N) on a directory management command icon (e.g., move icon 7060 FIG. 7H or FIG. 7N) in the command region, and a third gesture on a folder icon in the destination region (e.g., gesture 7132 in FIG. 7N). In other words, in some embodiments, the user can tap successively in each of the three regions (e.g., the source region 7002, the command region 7004 and the destination region 7006, as illustrated in FIG. 7A) and, in response, the device performs a corresponding directory management operation (e.g., move or copy).

In some embodiments, the device displays (8706) the first icon (or a visually distinguished representation thereof, such as an enlarged representation) in the destination region during detection of the first command performance input. For example, in FIGS. 7O and 7P, projects icon 7110 (which is representative of projects icon 7038 in the source region) is displayed in the destination region. In the exemplary user interface 7000O shown in FIG. 7O, the projects icon 7110 is displayed in the destination region and associated with the documents icon 7100. In some embodiments, the device displays (8708) an animation of the first icon (or a visually distinguished representation thereof, such as an enlarged representation) moving from the command region to the destination region in response to detecting the first command performance input by the user on the touch screen display. In some embodiments, the visually distinguished representation of the first icon includes a representation of the directory management command icon with which the first icon is associated. For example, in FIGS. 7O and 7P, the projects icon 7110 includes a displayed ring 7136 that is representative of the directory management command icon (e.g., move icon 7060 in FIG. 7O) with which the first icon is associated.

In some embodiments, the device displays (8710) the first icon (or a visually distinguished representation thereof, such as an enlarged representation) on the first folder icon (e.g., 7100 in FIG. 7O) in the plurality of folder icons in the destination region during detection of the first command performance input. In some embodiments, the device displays (8712) an animation of the first icon (or a visually distinguished representation thereof, such as an enlarged representation) moving from the command region to the first folder icon (e.g., 7100 in FIG. 7O) in the plurality of folder icons in the destination region during detection of the first command performance input. In some embodiments the visually distinguished representation of the first icon includes a representation of the directory management command icon (e.g., 7060 in FIG. 7O) with which the first icon is associated.

In response to detecting the first command performance input by the user on the touch screen display, the device performs (8800) a directory management operation on a folder or file that corresponds to the first icon in the first plurality of icons. The directory management operation is in accordance with the first directory management command icon and the selected first folder icon in the plurality of folder icons in the destination region. For example, when first icon is the projects icon 7038, the directory management operation is a move operation 7060, and the first folder icon is the documents folder 7100, the projects folder is moved from its current location in the first hierarchical directory to the documents folder in the second hierarchical directory (FIG. 6B).

An exemplary "Copy" directory management operation is illustrated in FIGS. 6A and 6B (e.g., when the projects folder is associated with the "copy" directory management command icon and the documents folder is selected). Before the directory management operation is performed (as shown in FIG. 6A), the projects folder (e.g., 602-E-1) is located in memory on the first file system (e.g. first hierarchical directory) 127-E-1 and the documents folder 602-H in the second file system (e.g., second hierarchical directory) 127-F-1 does not contain the projects folder. After the "Copy" directory management operation is performed (as shown in FIG. 6B), the original projects folder 602-E-1 is still located in memory on the first file system (e.g., first hierarchical directory) 127-E-3, and a copy of the projects folder 602-E-2 is located in memory on the second file system (e.g., second hierarchical directory) 127-F-2 in the documents folder 602-H.

An exemplary "Move" directory management operation is illustrated in FIGS. 6A and 6C (e.g., when the projects folder is associated with the "move" directory management command icon and the documents folder is selected). Before the directory management operation is performed (as shown in FIG. 6A), the projects folder (e.g., 602-E-1) is located in memory on the first file system (e.g. first hierarchical directory) 127-E-1 and the documents folder 602-H in the second file system (e.g., second hierarchical directory) 127-F-1 does not contain the projects folder. After the "Move" directory management operation is performed (as shown in FIG. 6C), the projects folder is not in the first file system (e.g., first hierarchical directory) 127-E-3, and the projects folder 602-E-3 is located in memory on the second file system (e.g., second hierarchical directory) 127-F-3 in the documents folder 602-H.

In some embodiments, the device displays (8804) icons in the first plurality of icons in the source region that correspond to the one or more additional command association inputs (or visually distinguished representations thereof, such as an enlarged representations) in the destination region during detection of the first command performance input. Continuing the example described above with reference to FIG. 7L, in user interface 7000Q (FIG. 7Q), projects icon 7110 (which is a representation of the projects icon 7038 in the source region) and personal icon 7124 (which is a representation of personal icon 7036 in the source region) are displayed in the destination region. In some embodiments, the icons (e.g., 7110 and 7124 in FIG. 7Q) are associated with a representation (e.g., 7140 in FIG. 7Q) of a directory management command icon (e.g., 7060 in FIG. 7Q) indicated by the command association inputs. In some embodiments, the device displays (8806) an animation of icons (e.g., 7110 and 7124 in FIG. 7Q) in the first plurality of icons in the source region that correspond to the one or more additional command association inputs (or visually distinguished representations thereof, such as enlarged representations) moving from the command region to the destination region during detection of the first command performance input.

In some embodiments, the device displays (8808) icons in the first plurality of icons in the source region that correspond to the one or more additional command association inputs (or visually distinguished representations thereof, such as an enlarged representations) on the first folder icon in the destination region during detection of the first command performance input. Continuing the example described above with reference to FIG. 7L, in user interface 7000Q in FIG. 7Q, projects icon 7110 (which is a representation of the projects icon 7038 in the source region) and personal icon 7124 (which is a representation of personal icon 7036 in the source region) are displayed in the destination region on a folder (e.g., documents folder 7060 in FIG. 7Q). In some embodiments, the icons (e.g., 7110 and 7124 in FIG. 7Q) are associated with a representation (e.g., 7140 in FIG. 7Q) of a directory management command icon (e.g., 7060 in FIG. 7Q) indicated by the command association inputs. In some embodiments, the device displays (8810) an animation of icons in the first plurality of icons (e.g., 7110 and 7124 in FIG. 7Q) in the source region that correspond to the one or more additional command association inputs (or visually distinguished representations thereof, such as enlarged representations) moving from the command region to the first folder icon in the destination region during detection of the first command performance input.

In some embodiments, in response to detecting the first command performance input, the device displays an indicator of the command that will be performed (e.g., a text prompt such as "Move Projects Folder to Documents Folder?" 7141 in FIG. 7R). In some embodiments, after (8812) detecting the first command performance input by the user on the touch screen display, the device displays (8814) a cancellation icon (e.g., 7142 in FIG. 7R). In some embodiments, the device detects (8816) activation of the cancellation icon (e.g., by a tap gesture 7144, FIG. 7R) and, in response, the device cancels (8818) performance of the directory management operation. In some embodiments, after detecting activation of the cancellation icon 7142, the user interface returns to a user interface that was displayed prior to receiving the first command performance input (e.g., user interface 7000I in FIG. 7I). Similarly, the cancellation icon may be used to cancel multiple directory management operations if multiple directory management operations will be performed. In some embodiments, the cancellation icon is displayed in response to detecting the first command performance input.

In some embodiments, after (8812) detecting the first command performance input by the user on the touch screen display, the device displays (8820) a confirmation icon (e.g., 7146 in FIG. 7R). In some embodiments, the device detects (8822) activation of the confirmation icon (e.g., by a tap gesture 7148, FIG. 7R) and, in response, the device performs (8824) the directory management operation. In some embodiments, after detecting activation of the confirmation icon 7146, the user interface is changed by the device in accordance with the directory management operation performed (e.g., see user interface 7000S in FIG. 7S, where there is no longer a projects folder in the source region, because the projects folder has been moved to the documents folder 7100). Similarly, the confirmation icon may be used to perform multiple directory management operations if multiple directory management operations will be performed. In some embodiments, a confirmation icon is displayed in response to detecting the first command performance input.

In some embodiments, after performing the directory management operation, the device displays an indicator of the directory management operation that was performed by the device (e.g., a text prompt such as "Projects Folder Moved to Documents Folder." 7150 in FIG. 7S). In some embodiments, after (8812) detecting the first command performance input by the user on the touch screen display, the device displays (8826) an undo icon (e.g., 7152 in FIG. 7S). In some embodiments, performance of the directory management operation is undone (8836) in response to detecting (8828) activation of the undo icon (e.g., by a tap gesture 7154 in FIG. 7S). In some embodiments, after detecting activation of the undo icon 7152, the user interface returns to a user interface that was displayed prior to receiving the first command performance input (e.g., user interface 7000I in FIG. 7I). Similarly, the undo icon may be used to undo multiple directory management operations if multiple directory management operations have been performed. In some embodiments, an undo icon is displayed in response to detecting the first command performance input. In some embodiments, an undo icon (e.g., 7152 in FIG. 7S) is displayed in response to performance of a directory management operation on a file or folder item.

In some embodiments, after detecting the first command performance input, the device detects (8832) one or more additional command performance inputs by the user on the touch screen display. In response to detecting the one or more additional command performance inputs by the user on the touch screen display, the device performs (8834) directory management operations that correspond to the one or more additional command performance inputs. For example, in user interface 7000T (FIG. 7T), if the first command performance input copies a file corresponding to the first icon to a first folder in the destination region, the one or more additional command performance inputs may copy the file corresponding to the first icon to other folders in the destination region that correspond to respective additional command performance inputs, as described in greater detail below. Similarly, if the first command performance input copies multiple files concurrently associated with a copy command icon to a first folder in the destination region, the one or more additional command performance inputs may copy the multiple files concurrently associated with the copy command icon to other folders in the destination region that correspond to respective additional command performance inputs.

In FIG. 7T, an icon 7156 that is representative of the projects icon 7038 has been associated with the copy directory management command icon 7062 in response to a previous command association input. In this example, the device detects a first command performance input (e.g., a first gesture including a contact 7158 and movement 7160 of the contact to a location on the touch screen display that corresponds to one of the folders 7100 in the destination region). In response to the first command performance input, the device performs a directory management operation in accordance with the input (e.g., copying the projects folder 7038 to the documents folder 7100). Continuing the example, in FIG. 7T, the device detects a second command performance input (e.g., a second gesture including a contact 7162 and movement 7164 of the contact to a location on the touch screen display that corresponds to one of the folders 7078 in the destination region). In response to the second command performance input, the device performs a directory management operation in accordance with the input (e.g., copying the projects folder 7038 to the pictures folder 7078 in FIG. 7T). In this example, the user: 1) drags the projects folder to the copy directory management command icon; 2) drags the projects icon to the document folder, causing the device to copy the projects folder in the first hierarchical directory to the documents folder in the second hierarchical directory; and 3) drags the projects icon to the pictures folder, causing the device to copy the projects folder in the first hierarchical directory to the pictures folder in the second hierarchical directory. In other words, the user causes the device to copy the projects folder to two locations in the second hierarchical directory (e.g., inside the documents folder and inside the pictures folder).

While the preceding embodiments have been described for moving files and/or folders from the first hierarchical directory to the second hierarchical directory, it should be understood that the embodiments described above are merely exemplary. The methods described herein can be modified in order to perform directory management operations on files and/or folders from the second hierarchical directory. In some embodiments, operations are performed on files and/or folders in the second hierarchical directory by detecting a command association input in the destination region.

For example, in FIG. 7U, moving a file and/or folder from the destination region to the source region includes detecting a command association input such as a gesture (e.g., contact 7166 and movement 7168 of the contact along the touch screen display) that starts on the documents folder 7100 in the destination region and ends on the move command icon 7060. In this example, moving the folder 7100 further includes detecting a command performance input such as a gesture (e.g., contact 7170 and movement 7172 of the contact along the touch screen display) which starts at the move directory management operation icon 7060 and ends at the work folder icon 7172 in the source region. In this example, the documents folder in the second hierarchical directory is moved to the work folder in the first hierarchical directory.

Additionally, in this embodiment, directory management operations can be performed on a file and/or folder in the source region, as described in greater detail above. For example, in FIG. 7U copying a file and/or folder from the source region to the destination region includes detecting a command association input such as a gesture (e.g., contact 7174 and movement 7176 of the contact along the touch screen display) that starts on a file 7044 in the source region and ends on the copy command icon 7062. In this example, copying the file 7044 further includes detecting a command performance input such as a gesture (e.g., contact 7178 and movement 7180 of the contact along the touch screen display) that starts at the copy directory management operation icon 7062 and ends at the pictures folder icon 7078 in the destination region. In this example, the file 7044 in the first hierarchical directory is copied to the pictures folder in the second hierarchical directory.

In another embodiment, performing directory management operations on files and/or folders in the second hierarchical directory includes representing at least a subset of the files and/or folders in the second hierarchical directory in the source region on the display in response to detecting a source-change input from a user of the device. For example, in FIG. 7V, at least a subset of the files and folders in the first hierarchical directory are represented as icons (e.g., 7034, 7036, 7038, 7044 in FIG. 7V) in the source region, while at least a subset of the files and folders in the second hierarchical directory are represented as icons (e.g., 7100, 7078, 7080, 7082 in FIG. 7V) in the destination region. In some embodiments, the device detects a source-change input (e.g., a tap gesture 7182 on source-change icon 7184). In response to detecting the source-change input, the device displays at least a subset of the files and/or folders in the second hierarchical directory in the source region 7002. For example, in FIG. 7W, after selection of the source-change icon 7184, at least a subset of the files and folders in the second hierarchical directory are represented as icons (e.g., 7100, 7078, 7080, 7082 in FIG. 7W) in the source region, while at least a subset of the files and folders in the first hierarchical directory are represented as icons (e.g., 7034, 7036, 7038, 7044 in FIG. 7W) in the destination region.

While the preceding embodiments have been described primarily with reference to a small number of exemplary directory management operations (e.g., move and copy), it should be understood that a directory management operation may be any operation that is performed to manage, adjust or otherwise modify files or folders in a file system. In particular, one having ordinary skill in the art would appreciate that a directory management operation could include one or more of the following: copy, move, delete, open, print, send, get, change properties, compress, duplicate, create alias, and label, as described in greater detail below.

In some embodiments, (e.g., for a copy command) the device detects (8836) a command association input by a user on the touch screen display. In response to detecting the command association input by the user on the touch screen display, the device associates (8838) an icon in the first plurality of icons in the source region with a copy command icon in the plurality of directory management command icons. The device detects (8840) a command performance input by the user on the touch screen display, which includes selection of a folder icon in the plurality of folder icons in the destination region. In some embodiments, selecting a hierarchical level title icon selects a corresponding folder in a next level up in the respective hierarchical directory, as described in greater detail above with reference to FIG. 7D. In response to detecting the command performance input by the user on the touch screen display, the device copies (8842) a folder or file that corresponds to the icon in the first plurality of icons to the selected folder icon in the plurality of folder icons in the destination region.

In some embodiments, (e.g., for a move command) the device detects (8844) a command association input by a user on the touch screen display. In response to detecting the command association input by the user on the touch screen display, the device associates (8846) an icon in the first plurality of icons in the source region with a move command icon in the plurality of directory management command icons. The device detects (8848) a command performance input by the user on the touch screen display, which includes selection of a folder icon in the plurality of folder icons in the destination region. In some embodiments, selecting a hierarchical level title icon selects a corresponding folder in a next level up in the respective hierarchical directory, as described in greater detail above with reference to FIG. 7D. In response to detecting the command performance input by the user on the touch screen display, the device moves (8850) a folder or file that corresponds to the icon in the first plurality of icons to the selected folder icon in the plurality of folder icons in the destination region.

In some embodiments, (e.g., for a delete command) the device detects (8852) a command association input by a user on the touch screen display. In response to detecting the command association input by the user on the touch screen display, the device associates (8854) an icon in the first plurality of icons in the source region with a delete command icon in the plurality of directory management command icons. The device detects (8856) a command performance input by the user on the touch screen display, which includes activation of a confirmation icon. In response to detecting the command performance input by the user on the touch screen display, the device deletes (8858) a folder or file that corresponds to the icon in the first plurality of icons.

In some embodiments, (e.g., for an open command) the device detects (8860) a command association input by a user on the touch screen display. In response to detecting the command association input by the user on the touch screen display, the device associates (8862) an icon in the first plurality of icons in the source region with an open command icon in the plurality of directory management command icons. The device detects (8864) a command performance input by the user on the touch screen display, which includes activation of a confirmation icon. In response to detecting the command performance input by the user on the touch screen display, the device opens (8866) a folder or file that corresponds to the icon in the first plurality of icons.

In other embodiments, (e.g., for an open command) the device detects (8868) a command association input by a user on the touch screen display. In response (8870) to detecting the command association input by the user on the touch screen display, the device associates (8871) an icon in the first plurality of icons in the source region with an open command icon in the plurality of directory management command icons and opens (8872) a folder or file that corresponds to the icon in the first plurality of icons.

In some embodiments, (e.g., for a print command) the device detects (8888) a command association input by a user on the touch screen display. In response to detecting the command association input by the user on the touch screen display, the device associates (8890) an icon in the first plurality of icons in the source region with a print command icon in the plurality of directory management command icons. The device detects (8892) a command performance input by the user on the touch screen display, which includes activation of a confirmation icon. In response to detecting the command performance input by the user on the touch screen display, the device displays (8894) a print dialog user interface (e.g., for a folder or file that corresponds to the icon in the first plurality of icons). For example, the print dialog user interface may be either a print dialog box or a print screen.

In other embodiments, (e.g., for a print command) the device detects (8896) a command association input by a user on the touch screen display. In response (8898) to detecting the command association input by the user on the touch screen display, the device associates (8899) an icon in the first plurality of icons in the source region with a print command icon in the plurality of directory management command icons and displays (8900) a print dialog user interface (e.g., for a folder or file that corresponds to the icon in the first plurality of icons). For example, the print dialog user interface may be either a print dialog box or a print screen.

In some embodiments, (e.g., for a send command) the device detects (8902) a command association input by a user on the touch screen display. In response to detecting the command association input by the user on the touch screen display, the device associates (8904) an icon in the first plurality of icons in the source region with a send command icon in the plurality of directory management command icons. The device detects (8906) a command performance input by the user on the touch screen display, which includes activation of a confirmation icon. In response to detecting the command performance input by the user on the touch screen display, the device displays (8908) a user interface for sending a folder or file that corresponds to the icon in the first plurality of icons (e.g., for sending an email message with an attached folder or file that corresponds to the icon in the first plurality of icons).

In other embodiments, (e.g., for a send command) the device detects (8910) a command association input by a user on the touch screen display. In response (8912) to detecting the command association input by the user on the touch screen display, the device associates (8913) an icon in the first plurality of icons in the source region with a send command icon in the plurality of directory management command icons and displays (8914) a user interface for sending a folder or file that corresponds to the icon in the first plurality of icons (e.g., for sending an email message with an attached folder or file that corresponds to the icon in the first plurality of icons).

In some embodiments, (e.g., for a get information command) the device detects (8916) a command association input by a user on the touch screen display. In response to detecting the command association input by the user on the touch screen display, the device associates (8918) an icon in the first plurality of icons in the source region with a get information command icon in the plurality of directory management command icons. The device detects (8920) a command performance input by the user on the touch screen display, which includes activation of a confirmation icon. In response to detecting the command performance input by the user on the touch screen display, the device displays (8922) a user interface with information about a folder or file that corresponds to the icon in the first plurality of icons (e.g., information about one or more of: the type, size, location, creation date, and/or modification date of the file or folder).

In other embodiments, (e.g., for a get information command) the device detects (8924) a command association input by a user on the touch screen display. In response (8926) to detecting the command association input by the user on the touch screen display, the device associates (8927) an icon in the first plurality of icons in the source region with a get information command icon in the plurality of directory management command icons and the device displays (8928) a user interface with information about a folder or file that corresponds to the icon in the first plurality of icons (e.g., information about one or more of: the type, size, location, creation date, and/or modification date of the file or folder).

In some embodiments, (e.g., for a change properties command) the device detects (8930) a command association input by a user on the touch screen display. In response to detecting the command association input by the user on the touch screen display, the device associates (8932) an icon in the first plurality of icons in the source region with a change properties command icon in the plurality of directory management command icons. The device detects (8934) a command performance input by the user on the touch screen display, which includes activation of a confirmation icon. In response to detecting the command performance input by the user on the touch screen display, the device displays (8936) a user interface for changing properties of a folder or file that corresponds to the icon in the first plurality of icons (e.g., changing the name of the file or folder).

In other embodiments, (e.g., for a change properties command) the device detects (8938) a command association input by a user on the touch screen display. In response (8940) to detecting the command association input by the user on the touch screen display, the device associates (8941) an icon in the first plurality of icons in the source region with a change properties command icon in the plurality of directory management command icons and the device displays (8942) a user interface for changing properties of a folder or file that corresponds to the icon in the first plurality of icons (e.g., changing the name of the file or folder).

In some embodiments, (e.g., for a compress command) the device detects (8944) a command association input by a user on the touch screen display. In response to detecting the command association input by the user on the touch screen display, the device associates (8946) an icon in the first plurality of icons in the source region with a compress command icon in the plurality of directory management command icons. The device detects (8948) a command performance input by the user on the touch screen display, which includes activation of a confirmation icon. In response to detecting the command performance input by the user on the touch screen display, the device compresses (8950) a folder or file that corresponds to the icon in the first plurality of icons (e.g., creating a ZIP file of the file or folder).

In other embodiments, (e.g., for a compress command) the device detects (8952) a command association input by a user on the touch screen display. In response (8954) to detecting the command association input by the user on the touch screen display, the device associates (8955) an icon in the first plurality of icons in the source region with a compress command icon in the plurality of directory management command icons and the device compresses (8956) a folder or file that corresponds to the icon in the first plurality of icons (e.g., creating a ZIP file of the file or folder).

In some embodiments, (e.g., for a duplicate command) the device detects (8958) a command association input by a user on the touch screen display. In response to detecting the command association input by the user on the touch screen display, the device associates (8960) an icon in the first plurality of icons in the source region with a duplicate command icon in the plurality of directory management command icons. The device detects (8962) a command performance input by the user on the touch screen display, which includes activation of a confirmation icon. In response to detecting the command performance input by the user on the touch screen display, the device duplicates (8964) a folder or file that corresponds to the icon in the first plurality of icons in the source region.

In other embodiments, (e.g., for a duplicate command) the device detects (8966) a command association input by a user on the touch screen display. In response (8968) to detecting the command association input by the user on the touch screen display, the device associates (8969) an icon in the first plurality of icons in the source region with a duplicate command icon in the plurality of directory management command icons and the device duplicates (8970) a folder or file that corresponds to the icon in the first plurality of icons in the source region.

In some embodiments, (e.g., for an alias creation command) the device detects (8972) a command association input by a user on the touch screen display. In response to detecting the command association input by the user on the touch screen display, the device associates (8974) an icon in the first plurality of icons in the source region with an alias creation command icon in the plurality of directory management command icons. The device detects (8976) a command performance input by the user on the touch screen display, which includes activation of a confirmation icon. In response to detecting the command performance input by the user on the touch screen display, the device makes (8978) an alias of a folder or file that corresponds to the icon in the first plurality of icons in the source region.

In other embodiments, (e.g., for an alias creation command) the device detects (8980) a command association input by a user on the touch screen display. In response (8982) to detecting the command association input by the user on the touch screen display, the device associates (8983) an icon in the first plurality of icons in the source region with a alias creation command icon in the plurality of directory management command icons and the device makes (8984) an alias of a folder or file that corresponds to the icon in the first plurality of icons.

In some embodiments, (e.g., for a label command) the device detects (8986) a command association input by a user on the touch screen display. In response to detecting the command association input by the user on the touch screen display, the device associates (8988) an icon in the first plurality of icons in the source region with a label command icon in the plurality of directory management command icons. The device detects (8990) a command performance input by the user on the touch screen display, which includes activation of a confirmation icon. In response to detecting the command performance input by the user on the touch screen display, the device labels (8992) a folder or file that corresponds to the icon in the first plurality of icons in the source region.

In other embodiments, (e.g., for a label command) the device detects (8994) a command association input by a user on the touch screen display. In response (8996) to detecting the command association input by the user on the touch screen display, the device associates (8997) an icon in the first plurality of icons in the source region with a label command icon in the plurality of directory management command icons and the device labels (8998) a folder or file that corresponds to the icon in the first plurality of icons in the source region.

Although the preceding examples have been given with reference to a touch screen display, in some embodiments the display and the touch-sensitive surface are separate. For example, where there is a separate display and touch-sensitive surface (e.g., a trackpad), the graphical user interface elements are displayed on a display, while inputs (e.g., contacts from a finger or a stylus) are received from the touch-sensitive surface. In these embodiments, the device determines a correlation between the inputs on the touch-sensitive surface and elements displayed on the display. In some embodiments, the correlation is an absolute correlation (e.g., contact in location X on the touch sensitive surface corresponds to an icon in location Y on the display), while in other embodiments the correlation is a relative correlation (e.g., a cursor or other graphical indicator is currently at location Y on the display, movement of the cursor from location Y on the display is based on the movement of the contact on the touch sensitive surface). After establishing the correlation between the inputs and the displayed elements, the device performs the operations described above based on the inputs on the touch-sensitive surface. Typically, a pointer, cursor, or similar graphical user interface element is displayed to the user to indicate the location on the display that corresponds to a contact on the touch-sensitive surface.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable multifunction device with a touch screen display:
   concurrently displaying on the touch screen display a plurality of distinct predefined regions, the predefined regions including:
      a source region that includes a first plurality of icons, wherein a respective icon in the first plurality of icons represents a folder or a file in a hierarchical level in a first hierarchical directory,
      a command region that includes a plurality of directory management command icons, and
      a destination region that includes a plurality of folder icons that represent folders in a hierarchical level in a second hierarchical directory;
   detecting a first command association input by a user on the touch screen display, wherein a command association input is distinct from a command performance input, and wherein detecting the first command association input by the user on the touch screen display includes:
      detecting a contact on the first icon in the first plurality of icons in the source region; and
      detecting movement of the contact to the first directory management command icon in the plurality of directory management command icons without breaking contact with the touch screen display;
   in response to detecting the first command association input by the user on the touch screen display, associating a first icon in the first plurality of icons in the source region with a first directory management command icon in the plurality of directory management command icons;
   displaying the first icon in the command region when the first icon is associated with the first directory management command icon;
   after detecting the first command association input, detecting a first command performance input by the user on the touch screen display, wherein the first command performance input includes selection of a first folder icon in the plurality of folder icons in the destination region, and wherein detecting the first command performance input by the user on the touch screen display includes detecting movement of the contact from the first directory management command icon to the first folder icon in the plurality of folder icons in the destination region without breaking contact with the touch screen display; and,
   in response to detecting the first command performance input by the user on the touch screen display, performing a directory management operation on a folder or file that corresponds to the first icon in the first plurality of icons, wherein the directory management operation is in accordance with the first directory management command icon and the selected first folder icon in the plurality of folder icons in the destination region.

2. The method of claim 1, wherein the first hierarchical directory is located in memory on the portable multifunction device and the second hierarchical directory is the same as the first hierarchical directory.

3. The method of claim 1, including:
   in response to detecting the first command association input by the user on the touch screen display, ceasing to display directory management commands in the command region other than the first directory management command icon.

4. The method of claim 1, including:
   detecting a command association input by a user on the touch screen display;
   in response to detecting the command association input by the user on the touch screen display, associating an icon in the first plurality of icons in the source region with a copy command icon in the plurality of directory management command icons;
   detecting a command performance input by the user on the touch screen display, wherein the command performance input includes selection of a folder icon in the plurality of folder icons in the destination region; and,
   in response to detecting the command performance input by the user on the touch screen display, copying a folder or file that corresponds to the icon in the first plurality of icons to the selected folder icon in the plurality of folder icons in the destination region.

5. The method of claim 1, including:
   detecting a command association input by a user on the touch screen display;
   in response to detecting the command association input by the user on the touch screen display, associating an icon in the first plurality of icons in the source region with a move command icon in the plurality of directory management command icons;
   detecting a command performance input by the user on the touch screen display, wherein the command performance input includes selection of a folder icon in the plurality of folder icons in the destination region; and,
   in response to detecting the command performance input by the user on the touch screen display, moving a folder or file that corresponds to the icon in the first plurality of icons to the selected folder icon in the plurality of folder icons in the destination region.

6. The method of claim 1, including:
   displaying the first icon in the destination region during detection of the first command performance input.

7. A portable multifunction device with a touch screen display and a hierarchical directory that contains folders and files, the portable multifunction device including a graphical user interface, the graphical user interface comprising:
a plurality of concurrently displayed distinct predefined regions, the predefined regions including:
a source region that includes a first plurality of icons, wherein a respective icon in the first plurality of icons represents a folder or a file in a hierarchical level in a first hierarchical directory,
a command region that includes a plurality of directory management command icons, and
a destination region that includes a plurality of folder icons that represent folders in a hierarchical level in a second hierarchical directory;
wherein:
a first command association input by a user on the touch screen display is detected, wherein detecting the first command association input includes:
detecting a contact on the first icon in the first plurality of icons in the source region; and
detecting movement of the contact to the first directory management command icon in the plurality of directory management command icons without breaking contact with the touch screen display;
a command association input is distinct from a command performance input;
in response to detecting a first command association input by a user on the touch screen display, a first icon in the first plurality of icons in the source region is associated with a first directory management command icon in the plurality of directory management command icons;
the first icon is displayed in the command region when the first icon is associated with the first directory management command icon;
after detecting the first command association input, a first command performance input by the user is detected on the touch screen display, wherein the first command performance input includes selection of a first folder icon in the plurality of folder icons in the destination region, and wherein detecting the first command performance input by the user on the touch screen display includes detecting movement of the contact from the first directory management command icon to the first folder icon in the plurality of folder icons in the destination region without breaking contact with the touch screen display; and,
in response to detection of the first command performance input by the user on the touch screen display, a directory management operation is performed on a folder or file that corresponds to the first icon in the first plurality of icons, wherein the directory management operation is in accordance with the first directory management command icon and the selected first folder icon in the plurality of folder icons in the destination region.

8. A portable multifunction device, comprising:
a touch screen display;
one or more processors;
memory; and
one or more programs, wherein the one or more programs are stored in the memory and configured to be executed by the one or more processors, the one or more programs including instructions for:
concurrently displaying on the touch screen display a plurality of distinct predefined regions, the predefined regions including:
a source region that includes a first plurality of icons, wherein a respective icon in the first plurality of icons represents a folder or a file in a hierarchical level in a first hierarchical directory,
a command region that includes a plurality of directory management command icons, and
a destination region that includes a plurality of folder icons that represent folders in a hierarchical level in a second hierarchical directory;
detecting a first command association input by a user on the touch screen display, wherein a command association input is distinct from a command performance input, and wherein detecting the first command association input by the user on the touch screen display includes:
detecting a contact on the first icon in the first plurality of icons in the source region; and
detecting movement of the contact to the first directory management command icon in the plurality of directory management command icons without breaking contact with the touch screen display;
responding to detection of the first command association input by the user on the touch screen display by associating a first icon in the first plurality of icons in the source region with a first directory management command icon in the plurality of directory management command icons;
displaying the first icon in the command region when the first icon is associated with the first directory management command icon;
after detecting the first command association input, detecting a first command performance input by the user on the touch screen display, wherein the first command performance input includes selection of a first folder icon in the plurality of folder icons in the destination region, and wherein detecting the first command performance input by the user on the touch screen display includes detecting movement of the contact from the first directory management command icon to the first folder icon in the plurality of folder icons in the destination region without breaking contact with the touch screen display; and,
responding to detection of the first command performance input by the user on the touch screen display by performing a directory management operation on a folder or file that corresponds to the first icon in the first plurality of icons, wherein the directory management operation is in accordance with the first directory management command icon and the selected first folder icon in the plurality of folder icons in the destination region.

9. The device of claim 8, wherein the first hierarchical directory is located in memory on the portable multifunction device and the second hierarchical directory is the same as the first hierarchical directory.

10. The device of claim 8, including instructions for:
in response to detecting the first command association input by the user on the touch screen display, ceasing to display directory management commands in the command region other than the first directory management command icon.

11. The device of claim 8, including instructions for:
detecting a command association input by a user on the touch screen display;
in response to detecting the command association input by the user on the touch screen display, associating an icon in the first plurality of icons in the source region with a copy command icon in the plurality of directory management command icons;

detecting a command performance input by the user on the touch screen display, wherein the command performance input includes selection of a folder icon in the plurality of folder icons in the destination region; and, in response to detecting the command performance input by the user on the touch screen display, copying a folder or file that corresponds to the icon in the first plurality of icons to the selected folder icon in the plurality of folder icons in the destination region.

12. The device of claim 8, including instructions for:

detecting a command association input by a user on the touch screen display;

in response to detecting the command association input by the user on the touch screen display, associating an icon in the first plurality of icons in the source region with a move command icon in the plurality of directory management command icons;

detecting a command performance input by the user on the touch screen display, wherein the command performance input includes selection of a folder icon in the plurality of folder icons in the destination region; and, in response to detecting the command performance input by the user on the touch screen display, moving a folder or file that corresponds to the icon in the first plurality of icons to the selected folder icon in the plurality of folder icons in the destination region.

13. The device of claim 8, including instructions for:

displaying the first icon in the destination region during detection of the first command performance input.

14. A non-transitory computer readable storage medium storing one or more programs, the one or more programs comprising instructions, which when executed by a portable multifunction device with a touch screen display and a hierarchical directory that contains folders and files, cause the device to:

concurrently display on the touch screen display a plurality of distinct predefined regions, the predefined regions including:
- a source region that includes a first plurality of icons, wherein a respective icon in the first plurality of icons represents a folder or a file in a hierarchical level in a first hierarchical directory,
- a command region that includes a plurality of directory management command icons, and
- a destination region that includes a plurality of folder icons that represent folders in a hierarchical level in a second hierarchical directory;

detect a first command association input by a user on the touch screen display, wherein a command association input is distinct from a command performance input, and wherein detecting the first command association input by the user on the touch screen display includes:
- detecting a contact on the first icon in the first plurality of icons in the source region; and
- detecting movement of the contact to the first directory management command icon in the plurality of directory management command icons without breaking contact with the touch screen display;

respond to detection of the first command association input by the user on the touch screen display by associating a first icon in the first plurality of icons in the source region with a first directory management command icon in the plurality of directory management command icons;

display the first icon in the command region when the first icon is associated with the first directory management command icon;

after detecting the first command association input, detect a first command performance input by the user on the touch screen display, wherein the first command performance input includes selection of a first folder icon in the plurality of folder icons in the destination region, and wherein detecting the first command performance input by the user on the touch screen display includes detecting movement of the contact from the first directory management command icon to the first folder icon in the plurality of folder icons in the destination region without breaking contact with the touch screen display; and, respond to detection of the first command performance input by the user on the touch screen display by performing a directory management operation on a folder or file that corresponds to the first icon in the first plurality of icons, wherein the directory management operation is in accordance with the first directory management command icon and the selected first folder icon in the plurality of folder icons in the destination region.

15. The non-transitory computer readable storage medium of claim 14, wherein the first hierarchical directory is located in memory on the portable multifunction device and the second hierarchical directory is the same as the first hierarchical directory.

16. The non-transitory computer readable storage medium of claim 14, including instructions that cause the device to:

in response to detecting the first command association input by the user on the touch screen display, cease to display directory management commands in the command region other than the first directory management command icon.

17. The non-transitory computer readable storage medium of claim 14, including instructions that cause the device to:

detect a command association input by a user on the touch screen display;

in response to detecting the command association input by the user on the touch screen display, associate an icon in the first plurality of icons in the source region with a copy command icon in the plurality of directory management command icons;

detect a command performance input by the user on the touch screen display, wherein the command performance input includes selection of a folder icon in the plurality of folder icons in the destination region; and, in response to detecting the command performance input by the user on the touch screen display, copy a folder or file that corresponds to the icon in the first plurality of icons to the selected folder icon in the plurality of folder icons in the destination region.

18. The non-transitory computer readable storage medium of claim 14, including instructions that cause the device to:

detect a command association input by a user on the touch screen display;

in response to detecting the command association input by the user on the touch screen display, associate an icon in the first plurality of icons in the source region with a move command icon in the plurality of directory management command icons;

detect a command performance input by the user on the touch screen display, wherein the command performance input includes selection of a folder icon in the plurality of folder icons in the destination region; and, in response to detecting the command performance input by the user on the touch screen display, move a folder or file that corresponds to the icon in the first plurality of icons to the selected folder icon in the plurality of folder icons in the destination region.

19. The non-transitory computer readable storage medium of claim 14, including instructions that cause the device to:

display the first icon in the destination region during detection of the first command performance input.

* * * * *